(12) United States Patent
Hasuo

(10) Patent No.: US 6,462,761 B1
(45) Date of Patent: *Oct. 8, 2002

(54) ELECTRONIC FILING SYSTEM HAVING DISPLAYED RETRIEVAL IMAGE CHANGE

(75) Inventor: Kamon Hasuo, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/247,455

(22) Filed: May 23, 1994

Related U.S. Application Data

(63) Continuation of application No. 07/601,445, filed on Oct. 23, 1990, now abandoned.

(30) Foreign Application Priority Data

Oct. 23, 1989 (JP) .............................................. 1-275656

(51) Int. Cl.$^7$ .............................. G09G 5/00; G06F 17/00
(52) U.S. Cl. ..................................... 345/838; 707/104.1
(58) Field of Search ................................. 395/800, 600, 395/275, 425, 159, 161; 358/401; 707/104.1, 6, 1, 102; 345/838, 55, 172

(56) References Cited

U.S. PATENT DOCUMENTS

| 4,808,987 A | * | 2/1989 | Takeda et al. ............... 340/721 |
| 4,859,187 A | * | 8/1989 | Peterson ...................... 434/118 |
| 4,914,568 A | * | 4/1990 | Kodosky et al. ............. 395/275 |
| 5,019,961 A | * | 5/1991 | Addesso et al. ............. 395/161 |
| 5,038,222 A | * | 8/1991 | Saito ........................... 358/401 |
| 5,120,888 A | * | 6/1992 | Kasahava et al. ........... 395/159 |
| 5,134,560 A | * | 7/1992 | Ferriter et al. .............. 364/188 |

FOREIGN PATENT DOCUMENTS

| JP | 61026147 | 5/1986 |
| JP | 62226375 | 5/1987 |
| JP | 63004334 | 9/1988 |
| JP | 64-7263 | * 1/1989 |
| JP | 64-88824 | * 4/1989 |

OTHER PUBLICATIONS

Tsuda et al. "Iconic Browser: An Iconic Retrieval System for Object–Oriented Databases" IEEE Oct. 1989.*
Bordogna et al. "Iconic Queries on Pictorial Data"; Oct. 1989 IEEE.*
Angeloccio et al. QBD: A Fully Visual System for E–R Oriental Databases Oct. 1989.*

* cited by examiner

*Primary Examiner*—Larry D. Donaghue
(74) *Attorney, Agent, or Firm*—Fitzpatrick, Cella, Harper & Scinto

(57) ABSTRACT

An image filing system comprises a display section which can display a plurality of retrieval images indicative of retrieval information to retrieve images stored in a memory medium, a selecting section to select a desired one of the retrieval images displayed on the display section, a retrieving section to retrieve the image associated with the retrieval image from the memory medium on the basis of the retrieval image selected by the selecting section and means for making the image stored in the memory medium which was associated with the first retrieval image selected by the selecting section associate with the second retrieval image selected by the selecting section; and in this system the associating means erases the first retrieval image from the display section.

6 Claims, 63 Drawing Sheets

FIG. 6
PRIOR ART

| 8 8 0 4 0 3 0 8 1 4 | A B C | 0 |
|---|---|---|
| 8 8 0 4 0 3 0 8 1 6 | A B C | 3 |
| 8 9 0 1 1 2 1 4 2 3 | A B C | 5 |
| 8 9 0 2 2 2 2 2 2 2 | A B C | 8 |

FIG. 10
PRIOR ART

| 8 8 0 4 0 3 0 8 1 4 | 1 2 3 | 0 |
|---|---|---|
| 8 8 0 4 0 3 0 8 1 6 | 1 2 3 | 3 |
| 8 9 0 1 1 2 1 4 2 3 | 1 2 3 | 5 |
| 8 9 0 2 2 2 2 2 2 2 | 1 2 3 | 8 |

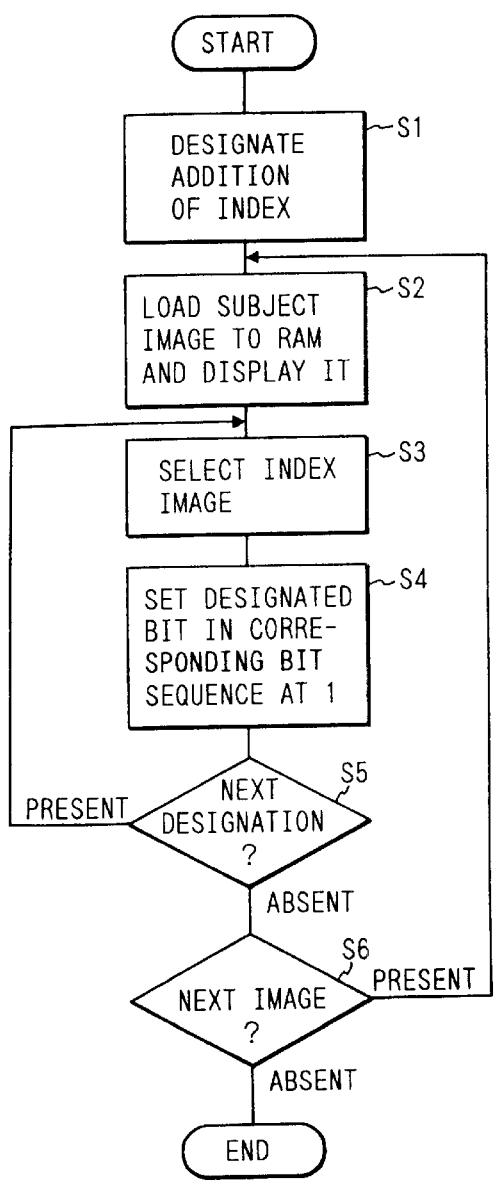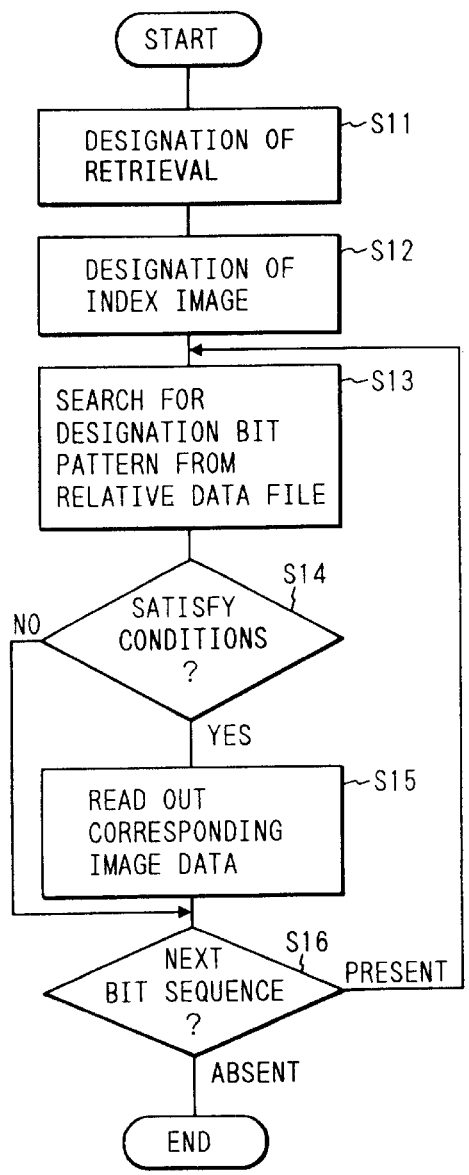

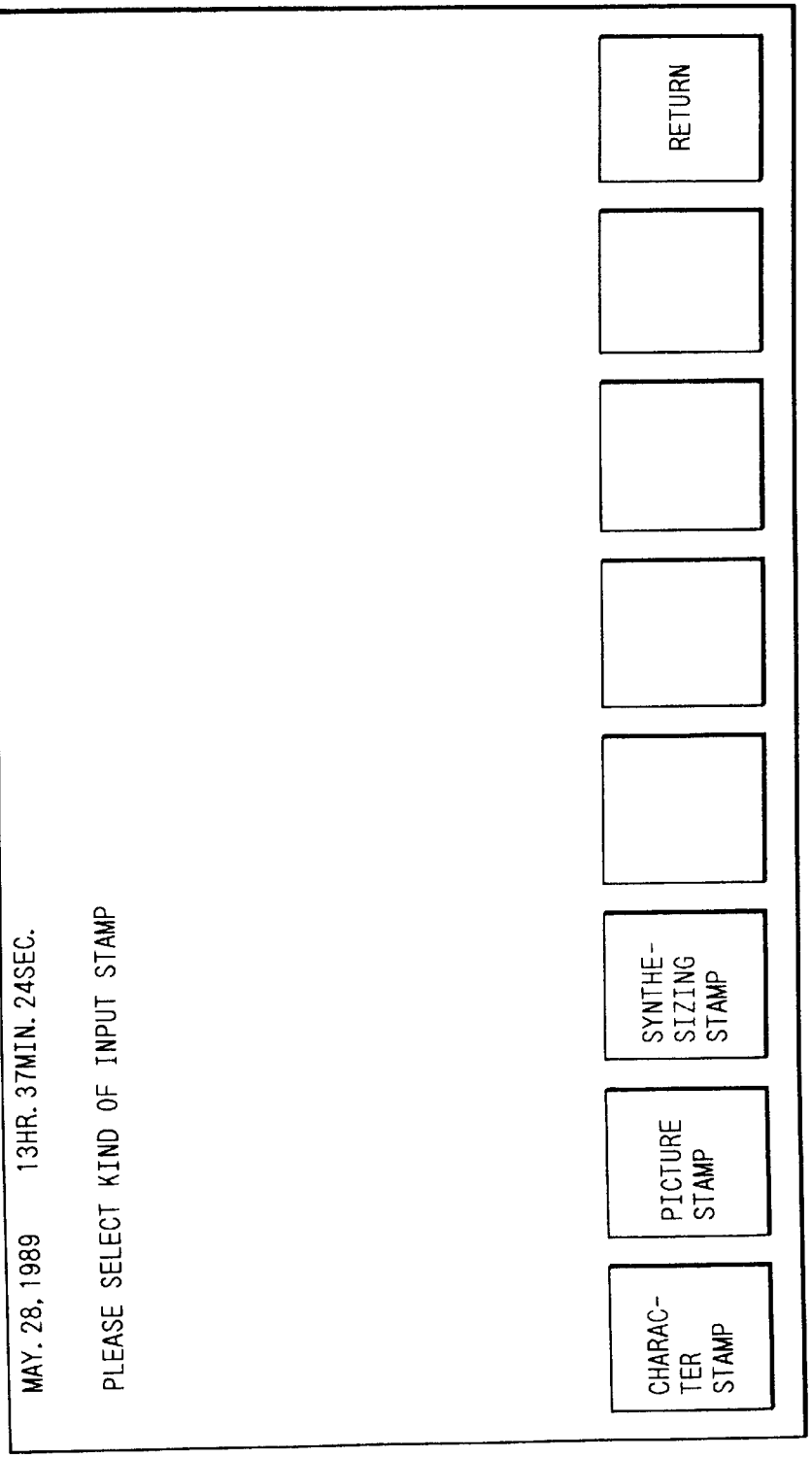

FIG. 30-7 PRIOR ART

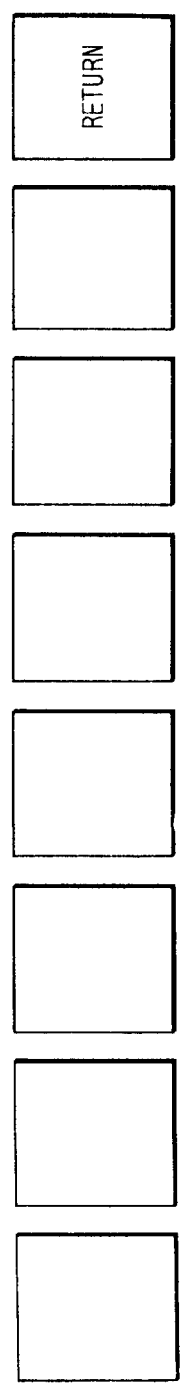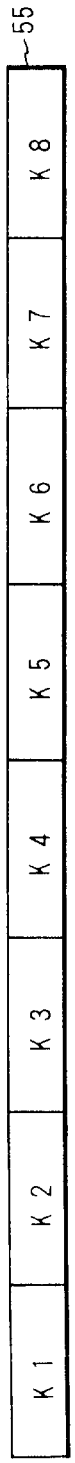
FIG. 36 PRIOR ART

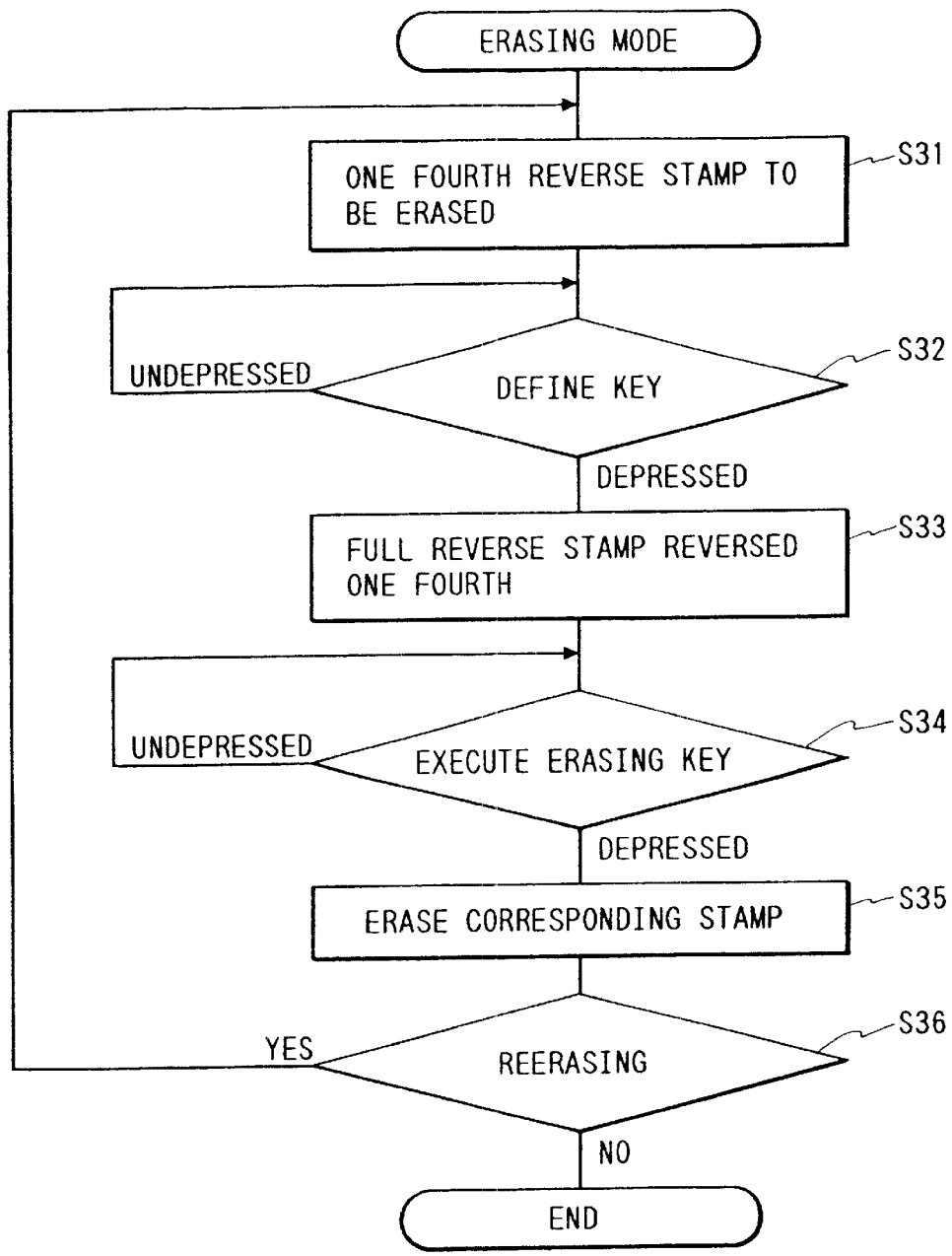

ELECTRONIC FILING SYSTEM HAVING DISPLAYED RETRIEVAL IMAGE CHANGE

This application is continuation, of application Ser. No. 07/601,445 filed Oct. 23, 1990, now abandoned.

BACKGROUND OF THE INVENTION

1. Field of the Invention

The present invention relates to an electronic filing system.

2. Related Background Art

In a conventional information memory device having an information retrieving function, in the case of retrieving information, the information is retrieved by using retrieval information such as file name corresponding to where the information has been stored, a key word corresponding to the storage content, a code number added in accordance with a predetermined rule, and the like. On the other hand, the retrieval information is formed on the basis of the information designated by a keyboard or the like.

In the above conventional device, there is a problem that in the case of retrieving by using a file name, many attributes cannot be provided for one file and a variety of retrieving processes cannot be performed.

There is also a problem that in the case of retrieving by using a key word, it takes much labor to select the proper key word and a number of different words indicative of similar concepts exist, so that it is difficult to designate the proper key word upon retrieval.

There is also a problem that in the case of retrieving by using a code number, as the number of storage items increases, it becomes difficult to store the code number corresponding to the content to be retrieved, and in an actual using state, the proper code number must be selected by always referring to a conversion table.

In both of the above cases, the key operations are executed upon storage and retrieval of information and the file name, key word, and code number must be input, so that there are problems that operation skill is required and it takes a long to operate so that high working efficiency is not obtained.

To solve the above problems, as disclosed in U.S. patent application Ser. No. 417053, now U.S. Pat. No. 5,038,222; U.S. patent application Ser. No. 478250, now U.S. Pat. No. 5,363,504; U.S. patent application Ser. No. 477470, now U.S. Pat. Nos. 5,572,726 and 5,742,808, and the like, there is considered a method whereby retrieval images (stamps) indicative of retrieval information are arranged like a matrix on a CRT display screen, predetermined images are made correspond to the stamps, and the stamp corresponding to a desired image is selected from a plurality of stamps, thereby retrieving the desired image.

U.S. Pat. No. 5,038,222

U.S. Pat. No. 5,038,222 discloses an image processing system that integrates an image display unit, a document feeding path for originals, an image reading unit, and an image recording unit.

U.S. Pat. No. 5,636,504

U.S. Pat. No. 5,363,504 (referred to herein as '504) discloses an electronic filing system that reads index images from an index image memory, displays the read index images on a display that has a plurality of display locations. Each of the index images is an image representative of index information used for retrieving one or more items of image information to be stored in a storage medium. Desired index images are selected from the plurality of index images displayed at the plurality of display locations, and image information to be stored in the storage medium is inputted and stored in a vacant area of the storage medium. An index file is formed indicating a relationship between the index images selected and a storage address of the image information stored in the storage medium.

FIG. 1 is a block diagram showing a construction of an embodiment of the electronic filing system of the '504 patent. The system comprises a central processor 10, a keyboard 15, an opto-magnetic disk memory apparatus 21, a liquid crystal display 23, an image reading apparatus 25, and an image printing apparatus 27.

The central processor 10 includes a CPU 11 as a microprocessor, a ROM 12 in which operation programs of CPU 11 are stored, and a RAM 13 for providing a work area of the CPU 11 and a loading area for various data and programs. The central processor 10 further includes a keyboard interface circuit 14 connecting a keyboard 15 and a system bus 30, a floppy disk device interface circuit 19 connecting a floppy disk device 19 and the system bus 30, a opto-magnetic disk memory apparatus interface circuit 20 connecting the opto-magnetic disk apparatus 21 and the system bus 30, a liquid crystal display interface circuit 22 connecting the liquid crystal display 23 and the system bus 30, an image reading apparatus interface circuit 24 connecting the image reading apparatus 25 and the system bus 30, and an image printing apparatus interface circuit 26 connecting the image printing apparatus 27 and the system bus 30. A clock unit 16 for keeping track of the date and time is also connected to the system bus 30.

FIG. 2 is a schematic view of a memory area configuration of the embodiment of the electronic filing apparatus of the '504 patent shown in FIG. 1. In the electronic filing apparatus, retrieval of an image data file group 5 is executed with directory 3 with retrieval data stored therein and a file allocation table (FAT) 4 for managing data recording addresses in a recording medium. When storing image data, the corresponding date and time are inputted from the clock unit 16, with the date and time data being written in an empty area of the directory 3, as shown in FIG. 3, and used as image identification data.

In operation, when an operator closes a power source switch (not shown), the CPU 11 executes checking of the RAM 13, initializes internal parameters prescribed in the ROM 12, executes initialization of the individual interface circuits, and clears the liquid crystal display 23 according to a program prescribed in the ROM 12 to be ready for operation of the keyboard 15 by the operator. Subsequently, the operator instructs the CPU 11 to read image data for registration from the keyboard 15 and sets an original image on the image reading apparatus 25.

The CPU 11 detects, with a sensor provided in an original setting section of the image reading apparatus 25 and through the image reading apparatus interface circuit 24, that the original is set. Then, it provides a start signal to the image reading apparatus 25 through the image reading apparatus interface circuit 24 for reading image data into the RAM 13. Further, for providing confirmation to the operator, the CPU 11 displays the image data in the RAM 13 on the liquid crystal display 23 through the liquid crystal display interface circuit 23.

Then, the CPU 11 receives an image reading date and time data from the clock unit 16 and stores an image discrimination code in an empty area of the directory 3 in the opto-magnetic disk memory apparatus 21 through the opto-magnetic disk memory apparatus interface circuit 20. Further, it stores image data in an empty area of a data file in the opto-magnetic disk memory apparatus 21. The relationship between image identification codes in the directory 3 and image data is managed by providing the directory 3 with pointers representing FAT numbers corresponding to image data memory areas.

FIG. 4 is a schematic view showing a system for managing the directory 3 when copying data from a storage media. Directories 103 and 203 corresponding to opto-magnetic disk data storage media 100 and 200, on which data is stored. When copying the data on these two media onto a common opto-magnetic disk medium, image identification data after copying and synthesis are synthesized and managed in a directory 303, with a plurality of data storage media being provided with its own image identification codes.

FIG. 5 is a block diagram showing a construction of another embodiment of the electronic filing system of the '504 patent. The electronic filing apparatus includes an identification code setting unit 17, which consists of dip switches or a battery backed-up RAM. Given code data is set as an apparatus identification code by an operator by a switch operation or a keying operation prior to an image reading operation. In this embodiment, like the above embodiment, date and time data from the clock unit 16, at the time of image reading, is stored together with an apparatus identification code of the identification code setting means 17 in an empty area of the directory 3, as shown in FIG. 6. Because an image identification code contains an apparatus identification code, even when images read at identical times with different electronic filing apparatuses are copied on a common electronic filing apparatus or image storing medium, image data of both images can be stored such that they are capable of being retrieved independent from each other. In this case, the directory 3 is managed in a manner as shown in FIG. 7.

Referring to FIG. 7, directories 113 and 213 correspond to opto-magnetic disk data storage media 110 and 210, on which data is stored. When copying data on these two media onto a common opto-magnetic disk medium, image identification data after copying and synthesis are synthesized and managed in a directory 313, with a plurality of data storage media being provided with its own image identification codes. The other construction and operation features are substantially the same as those of the previous embodiment.

FIG. 8 is a block diagram showing a construction of a third embodiment of an electronic filing system of the '504 patent. In this embodiment, the electronic filing system includes an identification code holding medium reading unit 28, for reading identification codes from an identification code holding medium 29, and is provided in lieu of the identification code setting unit 17 in the preceding embodiment. As an example, the identification code holding medium 29 may be a card provided with slits representing an identification code, as shown in FIG. 9.

In the third embodiment of the '504 patent, like the preceding embodiment, date and time data, from the clock unit 16, at the time of image reading, is stored together with an apparatus identification code of the identification code holding medium reading unit 28 in an empty area of directory 3, as shown in FIG. 10. Because an image identification code contains an identification code peculiar to the identification code holding medium 29, even when images read at identical times with different electronic filing apparatuses are copied onto a common electronic filing apparatus or image storing medium, image data of both images can be stored such that they are capable of being independently retrieved from each other. In this case, directory 3 is managed in a manner as shown in FIG. 11.

Referring to FIG. 11, directories 123 and 223 correspond to opto-magnetic disk data storage media 120 and 220, on data is stored. When copying the data on these two media onto a common opto-magnetic disk medium, image identification data after copying and synthesis are synthesized and managed in a directory 323, with a plurality of data storage media being provided with own image identification codes. The other construction and operation features are substantially the same as those of the previous embodiment. The identification code holding medium may be of various forms. FIG. 12 shows an example of the medium, which is card 29a provided with a mark representing an identification code. FIG. 13 shows another example of the medium, which is a card with a magnetic zone representing an identification code.

FIG. 14 is a block diagram showing a construction of a fourth embodiment of the electronic filing apparatus of the '504 patent. In this electronic filing apparatus, a communication line interface 36 connecting a communication line 37 and the system bus 30 is provided for storing data received from an external source. Received image read by an image reading unit on a transmitter side or a retrieval image read by the image reading apparatus 25 is contracted to produce index image data which is stored. In addition, relative data representing a relation between the index image data and data for retrieval is also produced and stored. By selecting the index image data, data retrieval is executed according to relative data.

In this embodiment of the '504 patent, as shown in FIG. 15, an index data file 41, for storing index image data 1-0 to 1-m, and a relative data file 42, for producing and storing the relative data noted above, are provided at a stage preceding the directory 3. On an actual disk, a data sequence as shown in FIG. 16 is stored.

FIG. 17 illustrates a key array on the keyboard 15. Keys 15-0 to 15-8 are provided around the liquid crystal display 23 for displaying index images 23-0 to 23-19 thereon. Individual index images 23-0 to 23-19 can be designated one by one by combinations of the keys 15-0 to 154 arranged horizontally and keys 15-5 to 15-8 arranged vertically.

In operation, after closure of a power source, an operator designates a retrieval index image registration mode from the keyboard 15 and designates a position of a display area for index image registration thereon with a combination of keys 15-0 to 15-4 and 15-5 to 15-8. Then an original with the index images is set on the image reading apparatus 25. The CPU 11 detects through the image reading apparatus interface circuit 24 that the original is set. Consequently, it provides a start signal to the image reading apparatus 25 through the image reading apparatus interface circuit 24 to read index image production image data into an image reading area of the RAM 13. When storing received image data, the received image data is stored in the image reading area of the RAM 13 before registration.

The index image production image data, which is read into the image reading area of the RAM 13, is ordinary-sized image data. However, it is necessary to display a plurality of (practically 8 to 30) index images at a time on the liquid crystal display 23. The number of pixels of the read-out image data and that of the liquid crystal display 23 do not coincide. Therefore, to overcome this, three methods may be used: (1) the original image is contracted (reduced) for reading by limiting its area; (2) the index image data is ordinary-sized image data which is contracted when displayed; and (3) ordinary-sized image data is contracted as index image.

In method (1), a small-sized original has to be produced, which is difficult. In addition, alignment at the time of reading is difficult. In method (2), the index image can be read quickly. However, its data amount is large, thus increasing the occupied storage area of the electronic filing apparatus. Besides, time for a contracting process is necessary when displaying the index image. Accordingly, method (3) is preferable for producing an index image.

More specifically, according to a program stored in the ROM 12, the CPU 11 selects bits corresponding to a given contraction factor among the bits corresponding to the pixels of image data in the RAM 13 and copies the image in a contracted scale in the index image area of the RAM 13. This bit reduction produces an index image by selecting one pixel for every 5 pixels in a case where the contraction factor is ⅕. This is done in both vertical and horizontal directions of the image. In this way, an index image is produced in the index image area of the RAM 13.

Subsequently, the CPU 11 displays the index image data produced in the RAM 13 on a designated area of the liquid crystal display 23, while also storing this index image data in an index image file area of the opto-magnetic disk memory apparatus 21 through the opto-magnetic disk memory apparatus interface circuit 20. In this way, desired index images are registered one after another.

To store data to be registered, the operator instructs the CPU 11 to read image data to be registered, using the keyboard, and sets an original image on the image reading apparatus 25. The CPU 11 detects, through the image reading apparatus interface circuit 24, that the original is set. It then starts the image reading apparatus 25 through the image reading apparatus interface circuit 24 to read image data into the RAM 13. In addition, for confirmation, the CPU 11 displays the image data read into the RAM 13 on the liquid crystal display 23. Further, the CPU 11 stores the image data in an empty data file area of the opto-magnetic disk memory apparatus 21 through the opto-magnetic disk memory apparatus interface circuit 20.

The operator adds an index to the image data stored in the opto-magnetic disk memory apparatus 21 according to steps summarized in the flow chart of FIG. 18. When the operator designates addition of an index using the keyboard 15 (step S1), the CPU 11 loads the subject image with an index to be added thereto in the RAM 13 from the data file area of the opto-magnetic disk memory apparatus 21 and displays it on the liquid crystal display 23 (step S2). Then, the operator selects an index image corresponding to the contents displayed on the liquid crystal display 23 in terms of a combination of keys 15-0 to 15-4 and 15-5 to 15-8 (step S3). The CPU 11 then sets a designated bit position in a bit sequence corresponding to the image being subjected to index addition in a relative data area to "1" (step S4).

The above sequence of operations is repeated (step S5), whereby relative data consisting of a combination of "0"s and "1"s is produced in the bit sequence corresponding to the called image data among bit sequences 0 to n in the relative data file. When the relative data corresponding to the image data is produced, the routine goes back to step S2 for index addition to a next image data (step S6). The above sequence of operations is repeatedly executed for all image data to complete the index addition. The relative data is managed by the CPU 11 such that data in the RAM 13 and data in the opto-magnetic disk memory apparatus 21 or the floppy disk memory apparatus 19 are of the same contents.

FIG. 19 is a flow chart illustrating an operation to retrieve data from the opto-magnetic disk memory apparatus 21. In the retrieval of data that has been subjected to index addition as described above, the operator first designates a retrieval mode using the keyboard 15 (step S11) and then designates an index image related to the image for retrieval among a plurality of index images displayed on the liquid crystal display 23 in terms of a combination of keys 15-0 to 15-4 and 15-5 to 15-8 (step S12). It is possible to designate a plurality of index images at a time. Further, when the opto-magnetic disk is set, the index image is transferred therefrom to the RAM 13. Then, the CPU 11 searches the relative data file for a bit pattern at bit position specified by the designated index data for each bit sequence (step S13). When a pertinent bit pattern is found, image data corresponding to that bit sequence satisfies a retrieval condition (step S14). The CPU 11 the reads the corresponding image data from the opto-magnetic disk memory apparatus 21 and loads it in the RAM 13 (step S15). If there is no pertinent bit pattern, after searching all the bit sequences, the CPU 11 displays a message indicating an absence of a pertinent image, thus bringing an end to the process (step S16).

If there are a plurality of image data satisfying the retrieval condition, there is no problem. In this case, a sequential image display may be executed or, alternatively, a list of the pertinent images may be displayed.

Thus, at the time of registration of an index image an original of the index image may be produced from large drawing or a character drawn by the operator, and the index image may be read without paying particular attention to the reading position, thus improving operability of the electronic filing system.

FIG. 20 is a block diagram showing a fifth embodiment of the electronic filing system of the '504 patent. In this embodiment, an image contraction unit 38 is provided between the image reading apparatus 25 and the image reading apparatus interface circuit 24. The image contraction unit 38 effects image contraction when the index image is read, and it includes a resistor, a counter, an AND gate, and an OR gate. Further, a relative data file 200A of this embodiment, as shown in FIG. 21, has pointer areas 201, 202, . . . corresponding to the respective index images.

In an index image registration operation according to this embodiment, when the CPU 11 detects that an original is set in the image reading apparatus 25 by the operator, it renders the image contraction unit 38 operative and then causes the image reading apparatus 25 to supply image data the to image contraction unit 38. The image contraction unit 38 contracts inputted image data with a predetermined contraction factor to produce index image data, which is supplied to the image reading apparatus interface circuit 24. The image contraction is effected by removing one pixel for every five pixels in one of every five main scanning lines in a case where the contraction factor is ⅕. Subsequently, the index image is displayed and stored in the manner as described above in connection with the fourth embodiment. Further, retrieval data is stored in the same manner as in the fourth embodiment. In the index addition operation of this embodiment, when an index image of a retrieval image is designated by a combination of keys-15-0 to 15-4 and 15-5 to 15-8, the CPU 11 sets a pointer of the image to the directory in a pointer area of a relative data file 200A corresponding to the designated index image. The retrieval is carried out in the manner as in the fourth embodiment.

FIG. 22 is a schematic view of a memory area used for data retrieval in a sixth embodiment of the '504 patent. In the electronic filing apparatus of this embodiment, an index data identification data area 6 is provided between an index image data file 41 and a relative data file 42, as shown in FIG. 15. The remainder of this electronic filing apparatus is the same as that shown in FIG. 1, and this apparatus is provided with the same keyboard as shown in FIG. 17.

When registering index image with this electronic filing apparatus, an index image is stored in an index image file area of the opto-magnetic disk memory apparatus 21 in the same procedure as in the fourth embodiment described before in connection with FIG. 15. When reading this index data, the CPU 11 receives date and time data of that data and the time from the clock unit 16, and it stores this data as index image identification data in an address of an index image identification data area 6 of the opto-magnetic disk memory apparatus 21 that corresponds to the index image stored this time. FIG. 23 is a schematic view showing a specific example of an index image identification data area 6. Storing of retrieval data, addition of an index, and retrieval are performed in the same manner as in the fourth embodiment of the '504 patent discussed above.

Copying of data onto more than one data storage medium and management of index data according to the '504 patent occurs as follows. Referring to FIG. 24, directories 107 and 207 correspond to the opto-magnetic disk data storage media 100*a* and 200*a*, on which data is stored. When copying the data on these two media onto a common opto-magnetic disk medium, image identification data after copying and synthesis are synthesized and managed in a directory 307, with a plurality of data storage media being provided with its own image identification codes.

FIG. 25 is a schematic view of a memory area for data retrieval in a seventh embodiment of the '504 patent. In this electronic filing apparatus, a relative data file 9 having pointer areas 91, 92, ... corresponding to respective index data identification data is provided in lieu of the relative data file 41 shown in FIG. 22. The rest of this electronic filing apparatus is the same as that shown in FIG. 5. Also, this electronic filing apparatus is provided with the same keyboard as shown in FIG. 17. In this electronic filing apparatus, registration of index data, storing of retrieval data, and retrieval are performed in the same manner as in the sixth embodiment of the '504 patent discussed above. Further, in the index addition operation of this embodiment, when an index image of a retrieval image is designated using the keys 15-0 to 15-8, the CPU 11 sets a pointer of the image to the directory in a pointer area of a relative data file 9 that corresponds to the designated index image. FIG. 26 is a schematic view showing a specific example of the index image identification data area 6.

Referring to FIG. 27, directories 117 and 217 correspond to opto-magnetic disk data storage media 110*a* and 210*a*, on which data is stored. When copying the data on these two media onto a common opto-magnetic disk medium, image identification data after copying and synthesis are synthesized and managed in a directory 317, with a plurality of data storing media being provided with its own image identification codes. As has been shown in the fourth and following embodiments of the '504 patent, it is possible to designate a character of retrieval data based on an image, so that a retrieval operation can be executed based on the operator's understanding. In addition, the operator can easily register index data, thus facilitating management of the retrieval apparatus and permitting a retrieval system based on the operator's creative sense to be readily built. Further, it is possible to reduce memory usage for storing the relation between index data and retrieval data, thereby greatly improving retrieval speed.

Stamp registration using display screen, according to the '504 patent, occurs as follows. FIG. 28 is a perspective view showing an embodiment of the '504 patent. This embodiment comprises a keyboard 52 for providing operation commands to control an electronic data filing apparatus 1 and for receiving character and numeral data, a signal line 52*a* connecting the electronic data filing apparatus 1 and the keyboard 52, a plate-like display 54, such as an electroluminescence, plasma, or fluorescent display tube, a key group 55, side plates 56*a* and 56*b* provided on an original document table 7 for transverse displacement relative thereto to restrict an original document 53 (original) to transverse directions, a switch knob 58 for switching between automatic feeding of a plurality of originals 53 and one-by-one manual feeding of originals 53, a tray 59 for supporting originals 53, and a discharging tray 50. One side of the electronic filing apparatus 1 is provided with an opto-magnetic disk inlet 21*a*.

FIG. 29 is a block diagram showing an inner construction of the electronic filing apparatus 1 according to the embodiment of FIG. 8. The electronic filing apparatus 1 includes a CPU 11 for controlling the entire electronic filing apparatus 1, a ROM 12 in which programs for the processes shown in the flow charts of FIGS. 31 to 34 are stored, a RAM 13 used as a work memory or the like, a keyboard interface 14 for the keyboard 52, a clock unit 16 for counting data and time, a key interface 18 for the key group 55, an opto-magnetic disk memory apparatus 21 for storing image data or the like on an opto-magnetic disk, an opto-magnetic disk memory apparatus interface 20, a LCD as an example of a display 54, a LCD interface 22, an image reading apparatus 25, an image reading apparatus interface 24, and a printing apparatus interface 26. The electronic filing apparatus 1 is connected to the keyboard 52 and an image printing apparatus 27.

FIGS. 30-1 to 30-6 are views showing examples of various states of the display 54. After closure of the power source of the electronic data filing apparatus 1, by confirming the present date displayed on the display 54 and setting disk, an initial display is provided. By selecting a stamp registration mode in the initial display, a display as shown in FIG. 30-1 is produced, ready for selection of a kind of input stamp. In this embodiment of the '504 patent, the term "stamp" means a retrieval image that represents retrieval data, and it is possible to provide a plurality of stamps as retrieval data for one image. A stamp may be a car mark, a mountain mark, book mark, pencil mark, etc. A kind of stamp, from among character stamps constituted by sole characters, drawing stamps constituted by sole drawings, and compound stamps constituted by combinations of characters and drawings, is selected by using keys K1 to K3.

FIG. 30-2 shows a state, which occurs by selecting a drawing stamp in the display of FIG. 30-1 using the key K1, and in which an example of a drawing stamp candidate is displayed in a finder 541 of the display 54. In FIG. 30-2, a stamp is displayed only in the stamp display area K(3,2) and nothing is displayed in the other stamp display areas. The stamp display areas K(1, 1) to K(4, 5) of the display 54 are set in a matrix form. For displaying a stamp in a stamp display area, one of the stamp display areas K(1, 1) to K(4, 5) has to be selected by depressing a corresponding key, K1 to K5.

FIG. 30-3 shows a state with stamp display area K(1, 2) selected by depressing the key K2 once. This stamp display area K(1, 2) is inverted (the inverted display state being shown shaded in FIG. 30-3). By depressing a decision key K6 in the state shown in FIG. 30-3, the selected stamp display area K(1, 2) is designated, and the stamp candidate displayed in the finder 541 is displayed in the designated stamp display area K(1, 2). This state is shown in FIG. 30-4. Then, by depressing the key K2 in the state with a stamp display area K(4, 2) selected, the stamp selection state of this column is canceled.

FIG. 31 is a flow chart illustrating an operation of newly registering a stamp. First a stamp candidate original is set in the image reading apparatus 25, or a stamp candidate is input as key-input from the keyboard 52 (step S1). The inputted stamp candidate is displayed in equal or reduced scale in the finder 541 of the display 54 (step S2). Then a stamp display area displaying the stamp candidate is selected with the keys K1 to K5, and the stamp candidate is registered in the selected stamp display area (step S3). By repeating this operation, stamps are displayed in all or part of the stamp display areas K(1, 1) to K(4, 5) shown in FIG. 30-2.

FIG. 32 is a flow chart illustrating an example of a stamp candidate input operation in which three different stamps can be registered: character stamps, consisting of sole characters; drawing stamps, consisting of sole drawings; and combination stamps, consisting of combinations of characters and drawings. When a character stamp is selected with the key K1 in FIG. 30-1 (step S11), a desired character or character row is input (step S12). When a drawing stamp is selected with the key K2 in FIG. 30-1, a picture of a given original is taken with the image reading apparatus 25 (step S13). This picture (i.e., image) is used as stamp. When a combination stamp is selected with the key K3 in FIG. 30-1, a picture of an original is taken by the image reading apparatus 25 (step S14), and a desired character is input from the keyboard 52 (step S15). The CPU 11 synthesizes the character and the picture (or drawing) (step S16).

The finder 541 of the display 54, as shown in FIG. 30-5, has a drawing display area 542 and a character display area 543. In the drawing display area 542 a drawing (or image) taken by the image reading apparatus 25 is displayed, and in the character display area 543 a character inputted from the keyboard 52 is displayed. When a drawing/character synthesis mode for synthesizing a drawing and a character is selected (step S11), a picture of a given original is taken by the image reading apparatus 25, and this drawing (i.e., image thereof) is displayed in the drawing display area 542. Together with the drawing, a cursor 544 is displayed under the finder 541. By displacing the cursor 544 in a predetermined portion and depressing a space key on the keyboard 52, a blank, as shown in FIGS. 3–5 (shown by a dashed rectangle) is provided. This blank portion is used as the character display area 543. By inputting a character in the blank portion from the keyboard 52, the inputted character, for instance "ABC", as shown in FIG. 30-6, is displayed in the character display area 543. In this way, a desired drawing/character synthesis stamp is displayed in the finder 541.

In the drawing/character synthesis mode, the inputted character, such as "ABC", is stored in terms of codes in the RAM 13. When the character is displayed in the finder 541 or the stamp display areas K(1, 1) to K(4, 5), its code is displayed after conversion to a character font by a font memory provided in ROM 12. Where characters are stored in terms of codes in this way, these characters may be used in the same way as other retrieval data. Where a drawing and a character are stored as an image, stamp management can be facilitated, and there is no need of providing any font memory for stamps.

A stamp prepared in the above way is displayed as a stamp candidate in the finder 541 of the display 54. If a stamp candidate is found to be satisfactory by the operator, step S3 for stamp display area selection and stamp registration is executed. If the stamp candidate is unsatisfactory, the routine goes back to the stamp candidate input step S1 for preparing a new stamp candidate. Since the prepared stamp candidate is displayed once in the finder 541 before it is displayed in an actual stamp display area, the prepared stamp candidate can be readily altered, and a desired stamp can be readily produced.

FIG. 33 is a flow chart illustrating a stamp display area selection operation and a stamp candidate registration operation (step S3). First, it is assumed that a stamp candidate finder display screen, as shown in FIG. 30-2, is produced on the display 54, and a stamp candidate consisting of three triangles is displayed. In this case, variables m, n, . . . are initialized to zero (step S31). Then, if the display area selection key K1 is depressed (step S33), the variable m is incremented, and a stamp display area is selected and displayed with inverted display of only stamp the display area K(m, 1) (step S36). If the decision key K6 is depressed at this time (step S32), the selected stamp display area is designated, and the stamp candidate shown in the finder 54 is displayed in the designated stamp display area (step S57) and registered in the stamp display area. This stamp image is recorded in the retrieval data memory area by the optomagnetic disk memory apparatus 21 (step S58). A skipping process (step S35) will be described later. When the display area selection key K2 is depressed (step S43), the variable n is incremented by one (step S44), and the stamp display area K(n, 2) is inverted (step S46).

FIG. 30-3 is a view showing a state in which the stamp display area K(1, 2) is selected by depressing the display area selection key K2 once. When the stamp display area K(1, 2) is selected, it is inverted (as shown shaded in FIG. 30-3). When the decision key K6 is depressed (step S32), the selected stamp display area is designated, and the stamp candidate is displayed in the designated stamp display area (step S57).

FIG. 30-4 is a view showing an example of display of a stamp candidate in the stamp display area K(1, 2). Variables m, n refer to rows in the stamp display area matrix of FIGS. 30-2 to 30-4. Represented by p, q and r are variables representing rows of the matrix corresponding to the display area selection keys K3 to K5. The display area selection keys K3 to K5 are the same as described above, and whether they are depressed is checked (steps S47 to S49). If they are depressed, variables p, q and r, representing rows, are each incremented by one, and the selection display of stamp display areas belonging to the respective display area keys is shifted down by one row. If the decision key K6 is depressed, the stamp is displayed in the selected position. With the provision of the display area selection keys for one row, it is possible to ensure reliable display area selection key selection, and thus it is possible to reduced the number of display area selection keys and facilitate the stamp area selection operation.

FIG. 34 is a flow chart illustrating a process of skipping a stamp display area selection. When selecting a stamp display area, whenever a display area selection key is depressed once, a selection display of the stamp display area is shifted down by one row. If the stamp is already registered (i.e., displayed) in the stamp display area determined as a result of the display shift (step S35a), this display area is skipped. That is, the variable m is incremented by one further (step S35b), thereby selectively displaying a next following stamp display area. If the display area selection key K2 is depressed once with the stamp display area K(2, 2) in the selection display, the next stamp display area is K(3, 2). In this area a spade stamp has already been registered (i.e., displayed), as is seen with reference to the index area of the RAM 13. Thus, the next display area K(4, 2) is displayed as the selection display. If the next stamp is displayed, the next following stamp display area is selected for selection display. When the variable m becomes 5 greater than its maximum number (step S35c), it is initialized to zero (step S35d), and the routine returns to step S32.

While FIG. 34 illustrates a skipping process mainly with respect to the stamp display areas K(1, 4) to K(4, 1), the same operation applies to the stamp display areas K(1, 2) to K(4, 2) as well. That is, the skipping step S45 is the same as step S35, except that the variable n is used instead of the variable m in step S35. Also, the operation that occurs when the stamp display area selection keys K3 to K5 are depressed is the same as that illustrated in FIG. 34. Further, it is possible to omit operation of the stamp candidate display in the finder 541 (step S2) in the embodiment. The registered stamp is provided as an index to the image data in the manner as described before.

FIG. 30-7 shows a retrieval mode display with a plurality of stamps displayed. A desired one of these stamps is selected. These stamps are transferred from an opto-magnetic disk to the RAM 13 when the disk is set. For the selection, one of the keys K1 to K5 is depressed. As a result, one of the stamps belonging to the depressed key (i.e., five stamps displayed above the depressed key) is turned by one-third turn, so as to be tentatively selected. Every time the same key is depressed once, the one-third turn display position of the stamps belonging to that key is shifted down by one row. When the decision key K6 is depressed in this process, the stamp having been turned by one-third turn is selected and completely turned. The image corresponding to the selected stamp is retrieved and read from the opto-magnetic disk by the opto-magnetic disk memory apparatus 21 is displayed on the display 54 and printed by the image printing apparatus 27 under control of a printing command.

U.S. Pat. No. 5,572,726

In U.S. Pat. No. 5,572,726 (referred to herein as '726), FIGS. 1-29 are the same as in the '504 patent discussed above. FIGS. 35 to 39 show examples of views displayed on the display 54 in different states of the embodiments of the '726 patent.

When the power source of the electronic filing apparatus 1 is closed, a display as shown in FIG. 35 appears. When the present date is confirmed (i.e., when the key K1 in the key group 55 is depressed), a display as shown in FIG. 36 appears. When a disk is set in this state, an initial image display appears, as shown in FIG. 37. For correcting the date, the key K8 in the key group 55 is depressed in the state shown in FIG. 35, and the date is corrected by operating the keyboard 2.

It is assumed that the present date and time is displayed in the initial display in an upper portion thereof and the stamps K(1, 1) to K(4, 5) are already displayed. In this embodiment, by the term "stamp" refers to a retrieval image representing retrieval data, and a plurality of stamps are provided as retrieval data for one image. Subsequently, by depressing the key K2 corresponding to a retrieval mode, a retrieval mode display, as shown in FIG. 38, is produced. Then by executing a stamp selection in a manner to be described later, a retrieval list, as shown in FIG. 39, is displayed on the display 54.

FIG. 40 is a flow chart illustrating an operation of registering an original 53 in the electronic data filing apparatus 1 of the '726 patent. As is shown, originals 53 are exposed one by one so that their pictures are taken by the image reading apparatus 25 (step S1), and the resultant images obtained are registered on a disk (step S2). Then, a machine number of the electronic filing apparatus 1 (an apparatus identification code), the date and time of exposure, and a file index (including stamps) are registered (steps S3 to S5). Actually, the image, the machine number, the data and time, and the index are registered substantially simultaneously.

FIG. 32 is a flow chart illustrating an operation of selecting retrieval data. First, in the state when the initial display is shown, as in FIG. 35, a retrieval mode key K2 is depressed to provide a retrieval mode display (step S11), as shown in FIG. 38, for confirming usage of a stamp, a keyword, a key number, or a date ID as retrieval data.

Using a stamp to select retrieval data (S12) is executed in an operation shown by the flow chart of FIG. 42 (step S13). When using a keyword and a key number (steps S14 and S16), a given keyword and a given key number are supplied from the keyboard 52 to keyword and key number entry positions in an upper-right portion of the retrieval mode display shown in FIG. 38 for retrieval data selection (steps S15 and S17). When using a date ID for retrieval data selection (step S18), the range of the date ID is entered in a date ID position in a right portion of the retrieval mode display from the keyboard 52 (step S19).

FIG. 38 shows an example of retrieval mode display when using a stamp for retrieval data selection. In this retrieval mode display, the stamps K(1, 2) to K(4, 5) are displayed in a four-row by five-column matrix, as an example of a stamp display. In parentheses, the left hand figures represent rows, and the right hand figures represent columns. The stamp selection keys K1 to K5 are provided for each of the stamp columns. The keys K5, K7, and K8 are, respectively, a decision key, a retrieval execution key and a return key. Every time one of the stamp selection keys K1 to K5 is depressed once, a tentative selection display, i.e., a display indicative of the fact that a stamp is tentatively selected (which is shown as a turning-down of a stamp by one-third turn) is provided with step-by-step shift of the stamp belonging to the depressed stamp selection key. That is, the tentative selection display is shifted by one row after another in the stamp column belonging to the depressed stamp selection key. When the decision key K6 is depressed, the tentatively selected stamp is designated as selected, whereupon the tentative selection display is changed to a regular selection display (i.e., shown as complete turning of the stamp).

FIG. 42 is a flow chart showing a retrieval data selection operation using a stamp. In a state in which the retrieval mode display is provided and variables m, n, . . . are reset to zero (step S13a), with depression of stamp the selection key K1 (step S20), the variable m is incremented by one, and only the stamp K(m, 1) is turned down by one-third turn showing a tentative selection display (step S22). If the decision key K6 is depressed at this time (step S13b), the stamp of the tentative selection display is completely turned for a regular selection display (step S13c), and the image corresponding to the stamp in the regular selection display is registered in a retrieval list (step S13d). Then, the next stamp is selected. For canceling a stamp in a tentative selection display, the selection key K1 is depressed with the stamp K(4, 1) being in tentative selection display. For canceling a stamp in a regular selection display, the selection key K1 is depressed several times. When a regularly selected stamp is selected again, it is turned up by two-third turn to make the lower one-third white. By depressing the decision key K6 in this state, the regular selection of this stamp is canceled.

When the stamp selection key K2 is depressed (step S30), the variable n is incremented by one (step S31), and the stamp K(n, 2) is turned down by one-third turn for a tentative selection display (step S32). If the decision key K6 has been depressed at this time (step S13b), the tentatively selected stamp is changed to a designated (regular) selection display in the manner as described above, and the image corresponding to this regularly selected stamp is registered in the retrieval list. Then, the next stamp is selected and, if the decision key K6 has not been depressed, the routine returns to step S20. The variables m and n represent rows in the stamp matrix shown in FIG. 38. The variables p, q, and r represent rows of the matrix represented by the stamp selection keys K3 to K5.

A check as to whether the stamp selection keys K3 to K5 have been depressed is also executed (steps S33 to S35). If the keys have been depressed, the variables p, q, and r, representing respective rows, are each incremented by one, and a tentative selection display of the stamp belonging to a stamp selection key in question is shifted down by one row. If stamp selection is not completed (step S23), the routine returns to step S13b, as noted above. If the decision key K6 is depressed, a change to a regular selection display is effected in the manner as described above. In this way, stamp selection is effected by providing a stamp selection key only for one row, and this means that the number of stamp selection keys can be reduced, while also facilitating the operation of stamp selection.

It is possible to set a combination condition for stamp selection with an OR condition for stamp rows of the matrix and with an AND condition for stamp columns of the matrix. This arrangement permits selection of practical data combinations. As an example, by setting order slits for stamps belonging to the stamp selection key K1, setting manufacturers for stamps belonging on the stamp selection key K2, and setting areas or regions for stamps belonging to the stamp selection key K3, it is possible to combine images of areas for each order slit and also each manufacture.

FIG. 43 is a flow chart illustrating a date ID range designation operation according to the '726 patent. The screen shown on the display 54, as illustrated in FIG. 38, has a date ID entry position in a right portion. A given date ID (i.e., date and time) is entered in left- and right-hand columns of this display zone from the keyboard 2. If a date ID designation is on the left-hand column (step S41), a date IR designation is on the right-hand column (step S42), and the decision key K6 is depressed at this time (step S43), an image corresponding to the date ID in a range specified by the left- and right-hand columns of the date ID is registered in a retrieval list (step S44). If the decision key K6 is depressed in the absence of any designation in the right-hand column, even though there is a designation in the left-hand column (step S45), images corresponding to date IDs subsequent to the date ID specified by the left-hand column are registered in the retrieval list (step S46). Further, if the decision key is depressed (step S48) in the presence of a designation in the right-hand column (step S47), even though there is no designation in the left-hand column, images corresponding to date IDs before the date ID specified by the right-hand column are registered in the retrieval list (step S49).

FIG. 39 shows an example of a retrieval list with a date ID range designated and decided in the above way. By permitting designation of retrieval data with the date ID designated in the above way, the freedom in designating retrieval data is increased, thus permitting readier retrieval data selection.

In the above embodiment of the '726 patent, the date and time are made to correspond to the date ID, but it is possible to make the date or the to correspond to the date ID. Further, it is possible to permit the designation of the range of the date ID and the designation of retrieval data with use of a stamp to be executed in advance, and let these designations be used in combination for retrieval. Further, besides the designation of the date ID, the designation of a keyword, a key number, etc., may be used in combination with the designation of retrieval data with use of a stamp. Furthermore, it is possible to have an arrangement such that keys other than the decision key (steps 543, S45 and S48), for instance the return key on the keyboard 2, may be depressed to the same end.

Despite the above, in the case where a plurality of retrieval images are displayed like a matrix on the CRT display screen, by using the above method, there is a case where it would be easier to use if a plurality of retrieval images are combined into one retrieval image, a case where another retrieval image is more suitable to a certain image than the retrieval image which has already been given, or a case where as an arrangement of the retrieval images, it would be easier to use the retrieval images having another arrangement than the existing arrangement.

As mentioned above, in the case of using the retrieval images, there is a drawback in that the efficiency of using the prior art electronic filing systems is poor.

SUMMARY OF THE INVENTION

It is an object of the invention to provide an electronic filing system having a good using efficiency which can solve the above drawbacks.

It is another object of the invention to provide an electronic filing system which can improve using efficiency by combining one of two images for retrieval displayed into the other image.

It is still another object of the invention to provide an electronic filing system which can improve using efficiency by replacing an image for retrieval displayed with another image.

It is a further object of the invention to provide an electronic filing system which can improve using efficiency by changing the position of an image for retrieval displayed.

The above and other objects and features of the present invention will become apparent from the following detailed description and the appended claims with reference to the accompanying drawings.

BRIEF DESCRIPTION OF THE DRAWINGS

FIG. 6 is a schematic view showing specific contents of a directory in the same embodiment;

FIG. 10 is a schematic view showing specific contents of a directory in the same embodiment;

FIG. 18 is a flow chart illustrating an operation of index addition in the same embodiment;

FIG. 19 is a flow chart illustrating an operation of retrieval of images in an opto-magnetic disk memory apparatus in the same embodiment;

FIG. 23 is a schematic view showing specific contents in an index image identification data area in the same embodiment;

FIG. 26 is a schematic view showing specific contents of an index image identification data area in the same embodiment;

FIGS. 30-1 to 30-7 are views showing examples of display on a display in the same embodiment;

FIGS. 35–39 are views showing examples of displays according to the '726 patent;

FIG. 66 is a flowchart showing the stamp erasing operation.

DETAILED DESCRIPTION OF THE PREFERRED EMBODIMENT

Figure 1:
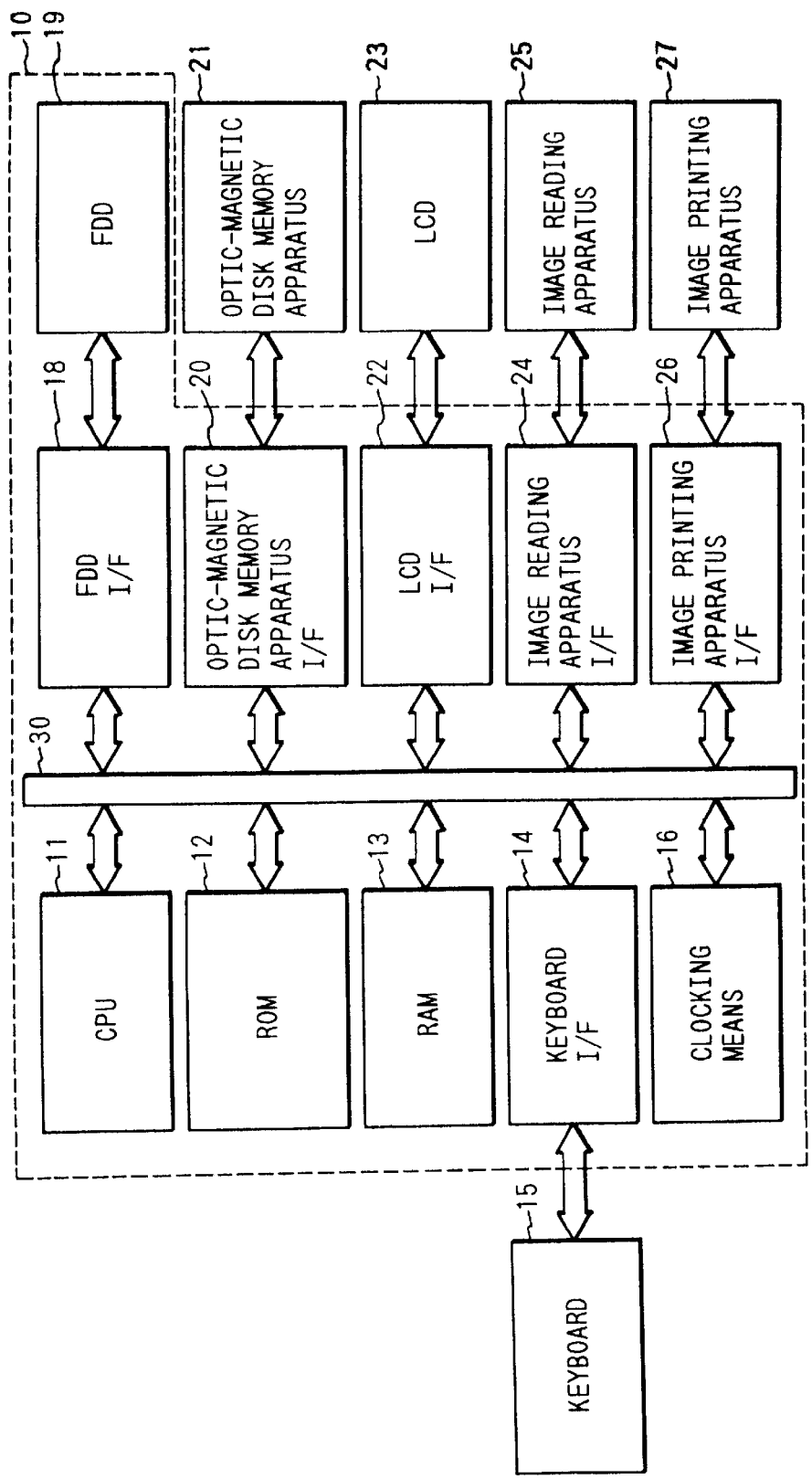
FIG. 1 is a block diagram showing the construction of a first embodiment of the electronic filing apparatus of the '504 patent.
Figure 2:
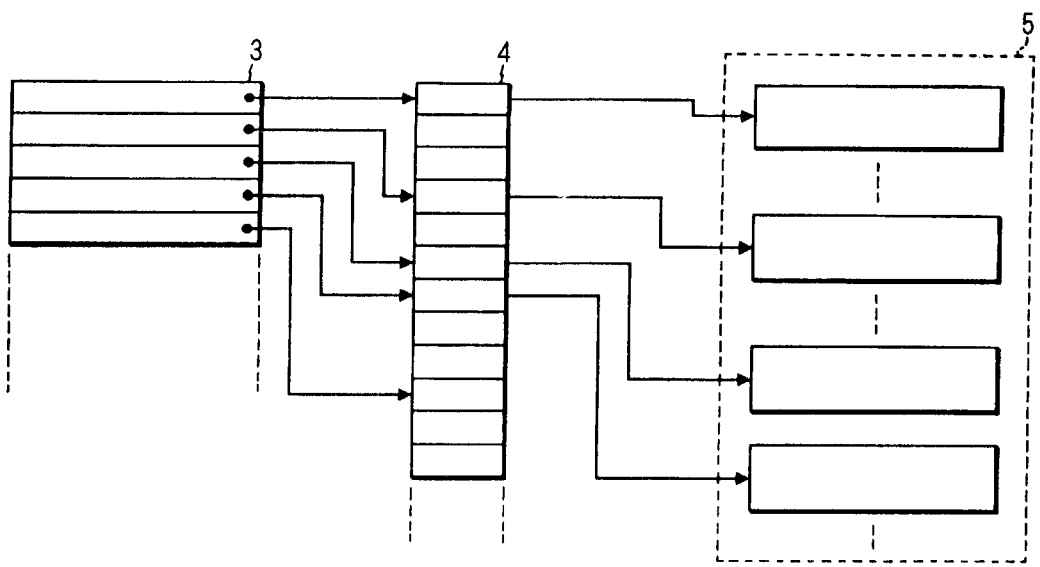
FIG. 2 is a schematic view showing memory area construction for data-retrieval in the embodiment.
Figure 3:
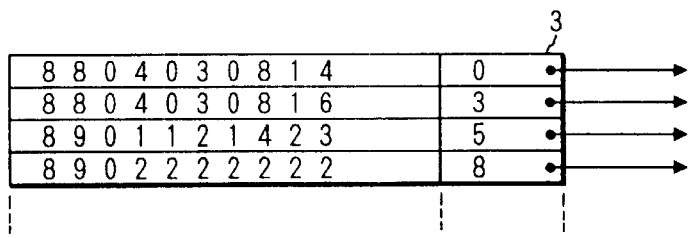
FIG. 3 is a schematic view showing specific contents of a directory in the same embodiment.
Figure 4:
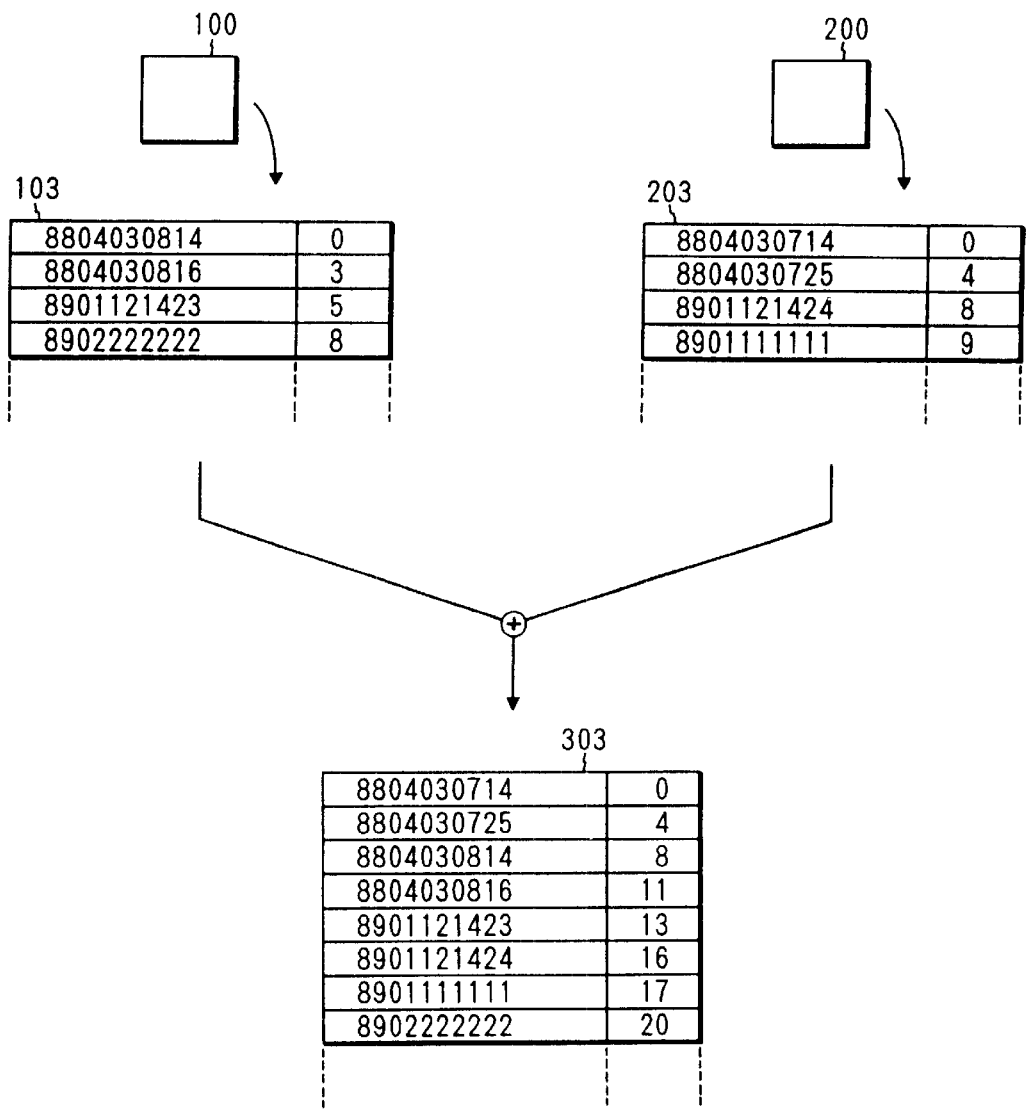
FIG. 4 is a schematic view showing a directory management system when copying data on more than one data storing media in the same embodiment.
Figure 5:
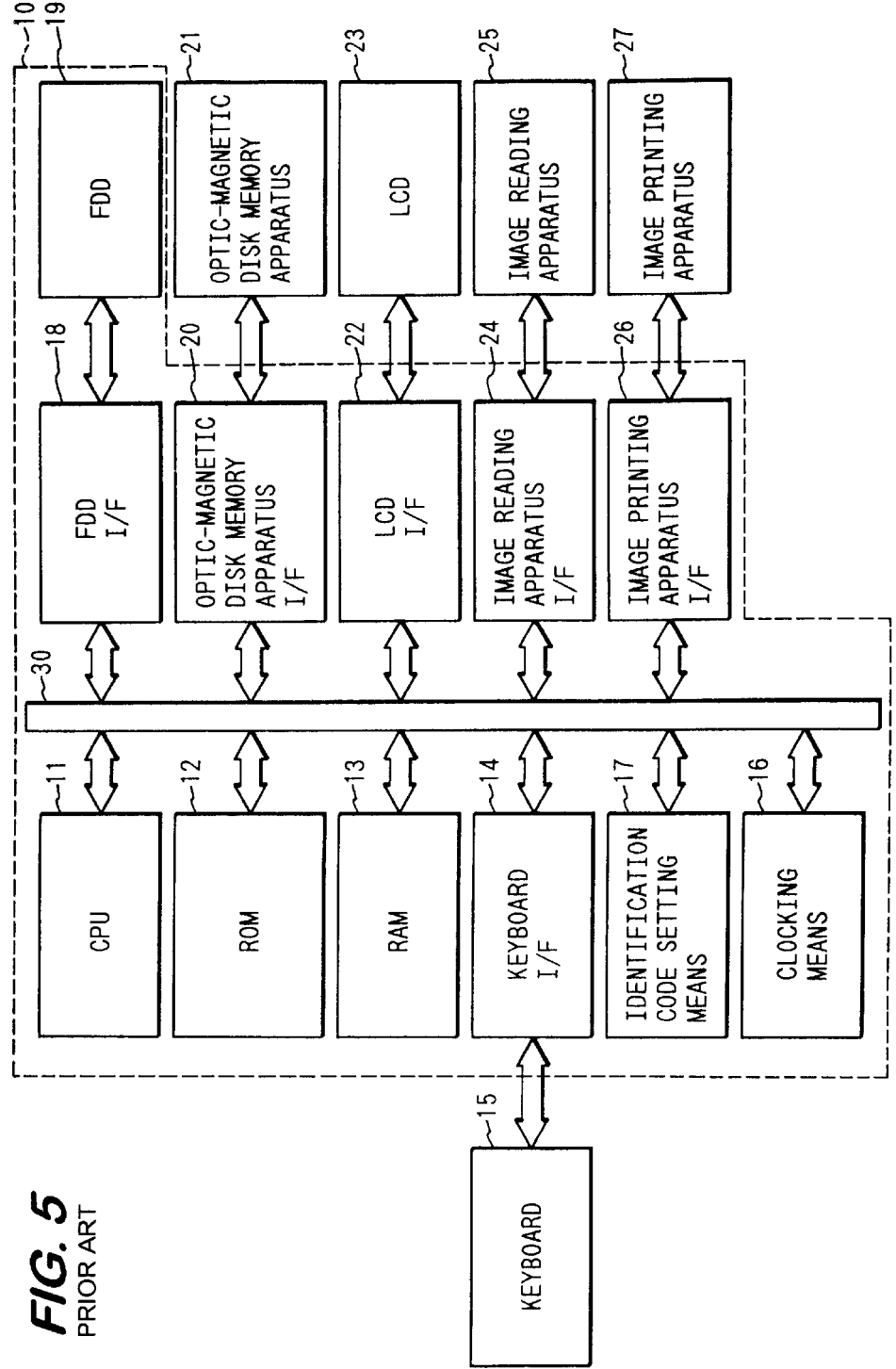
FIG. 5 is a block diagram showing the construction of a second embodiment of the electronic filing apparatus of the '504 patent.
Figure 7:
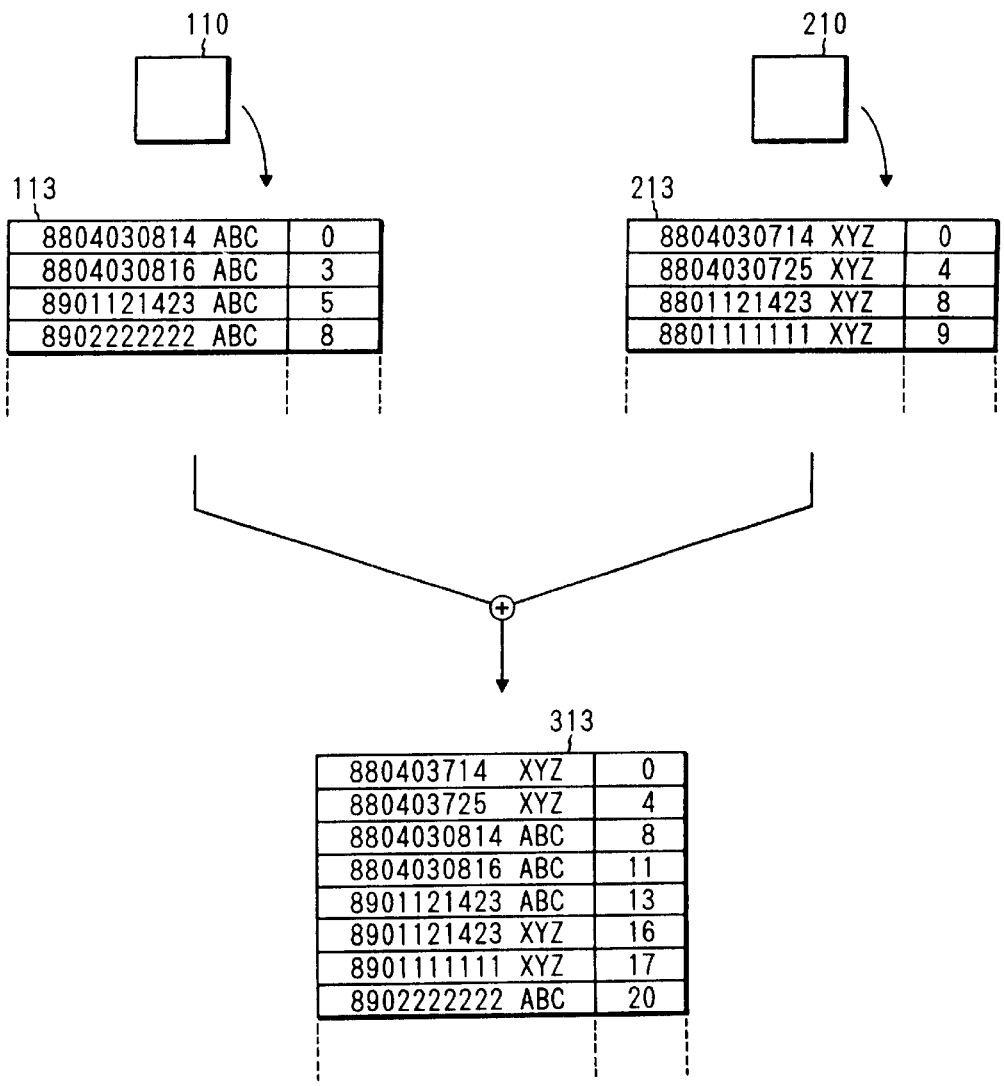
FIG. 7 is a schematic view showing a directory management system when copying data on more than one data storage medium in the same embodiment.
Figure 8:
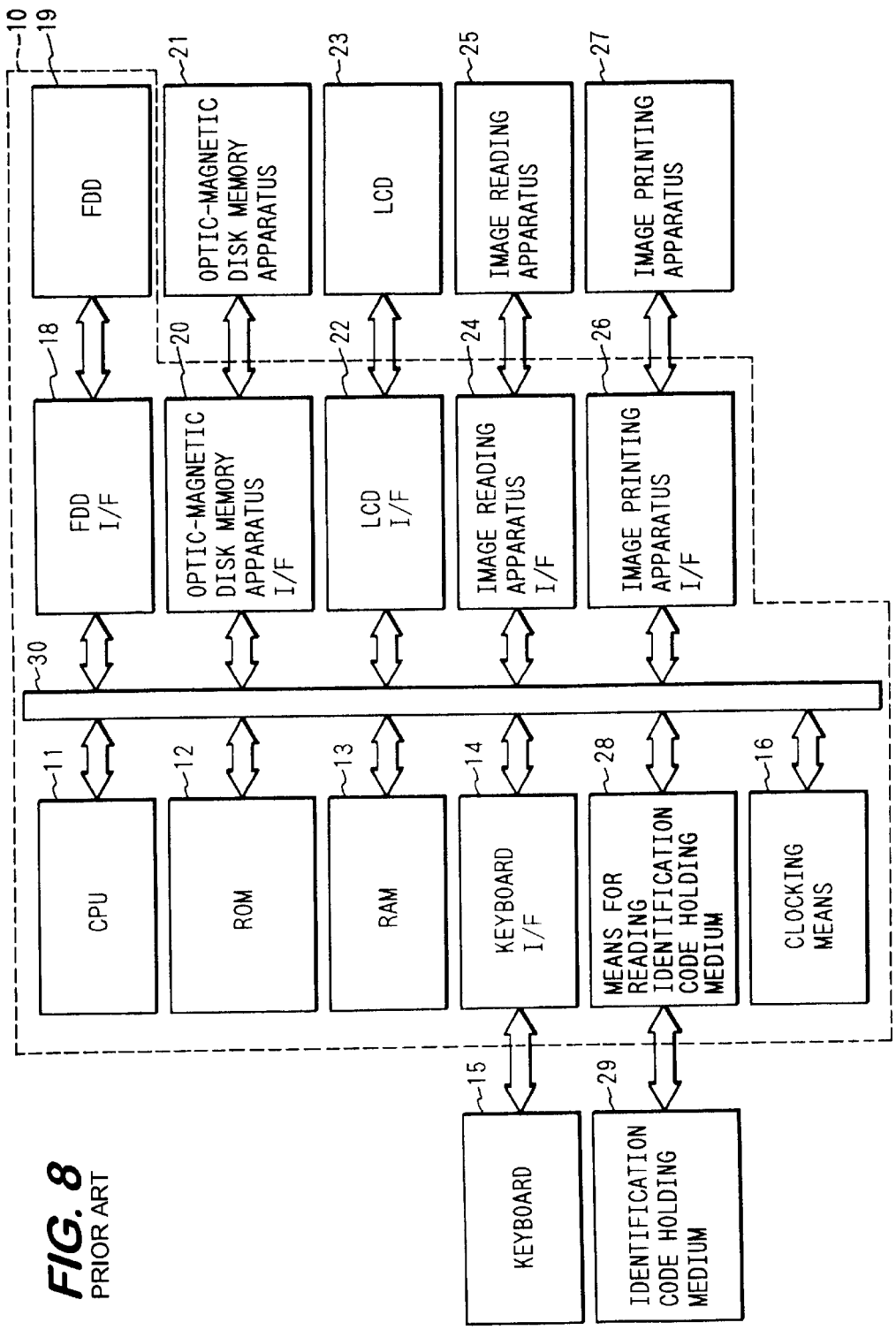
FIG. 8 is a block diagram showing the construction of a third embodiment of the electronic filing apparatus of the '504 patent.
Figure 9:
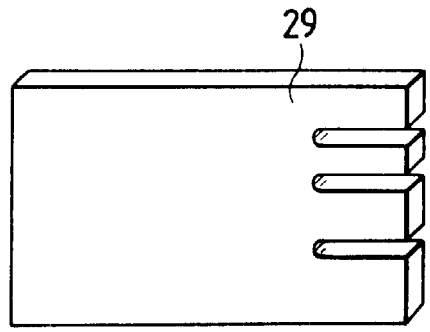
FIG. 9 is a plan view showing an identification code holding medium used in the same embodiment.
Figure 12:
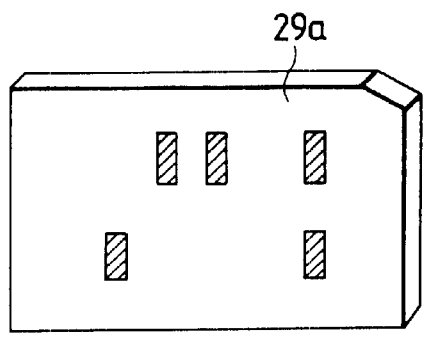
FIG. 12 is a plan view showing a different example of identification code holding medium.
Figure 13:
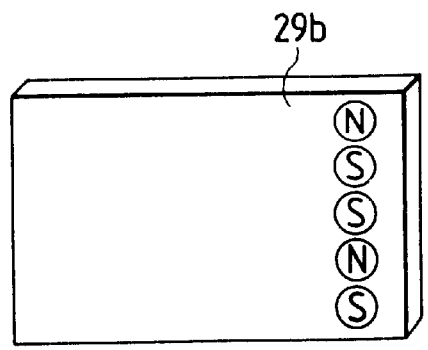
FIG. 13 is a plan view showing a further example of identification code holding medium.
Figure 11:
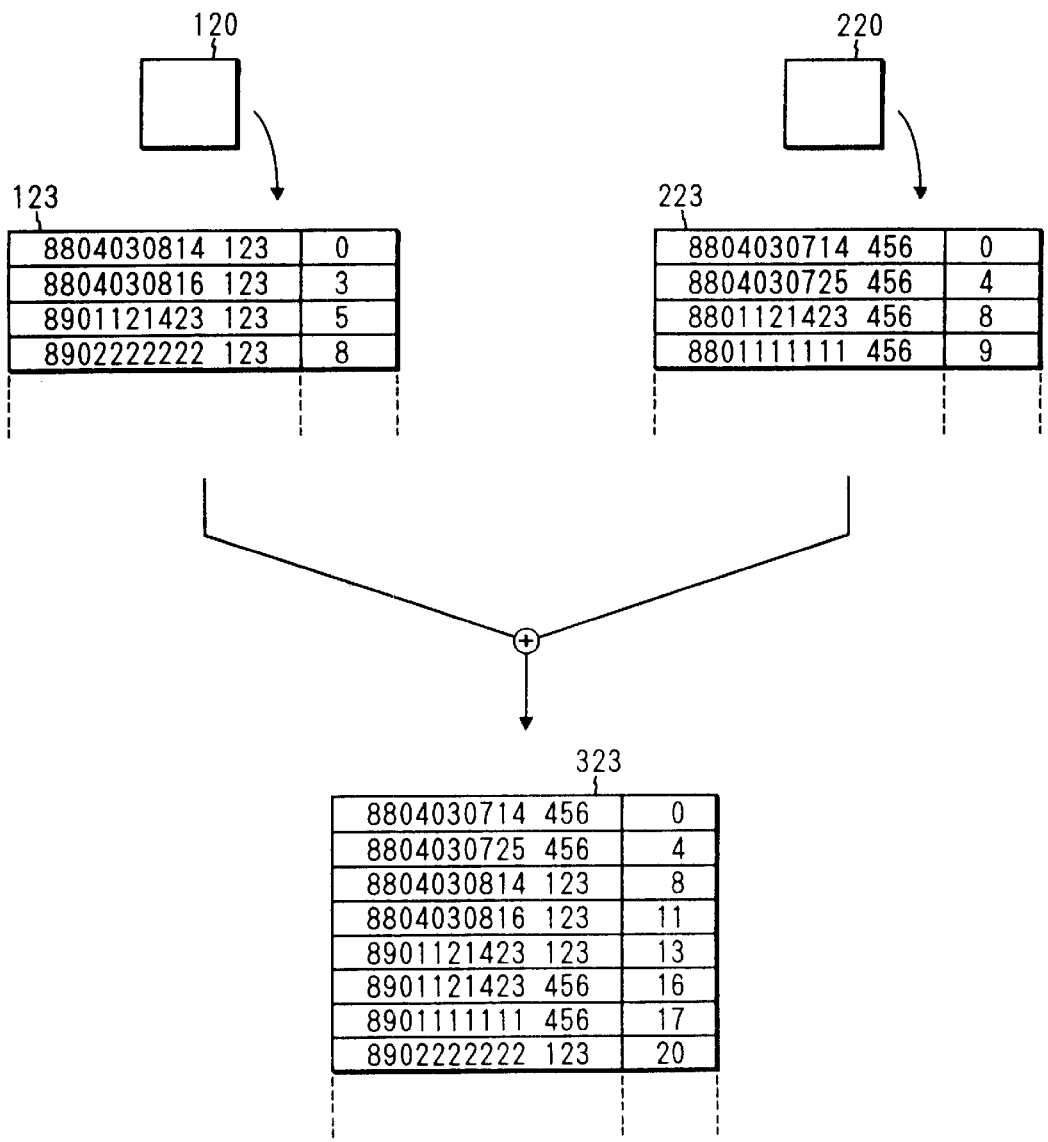
FIG. 11 is a schematic view showing a directory management system when copying data on more than one data storage medium in the same embodiment.
Figure 14:
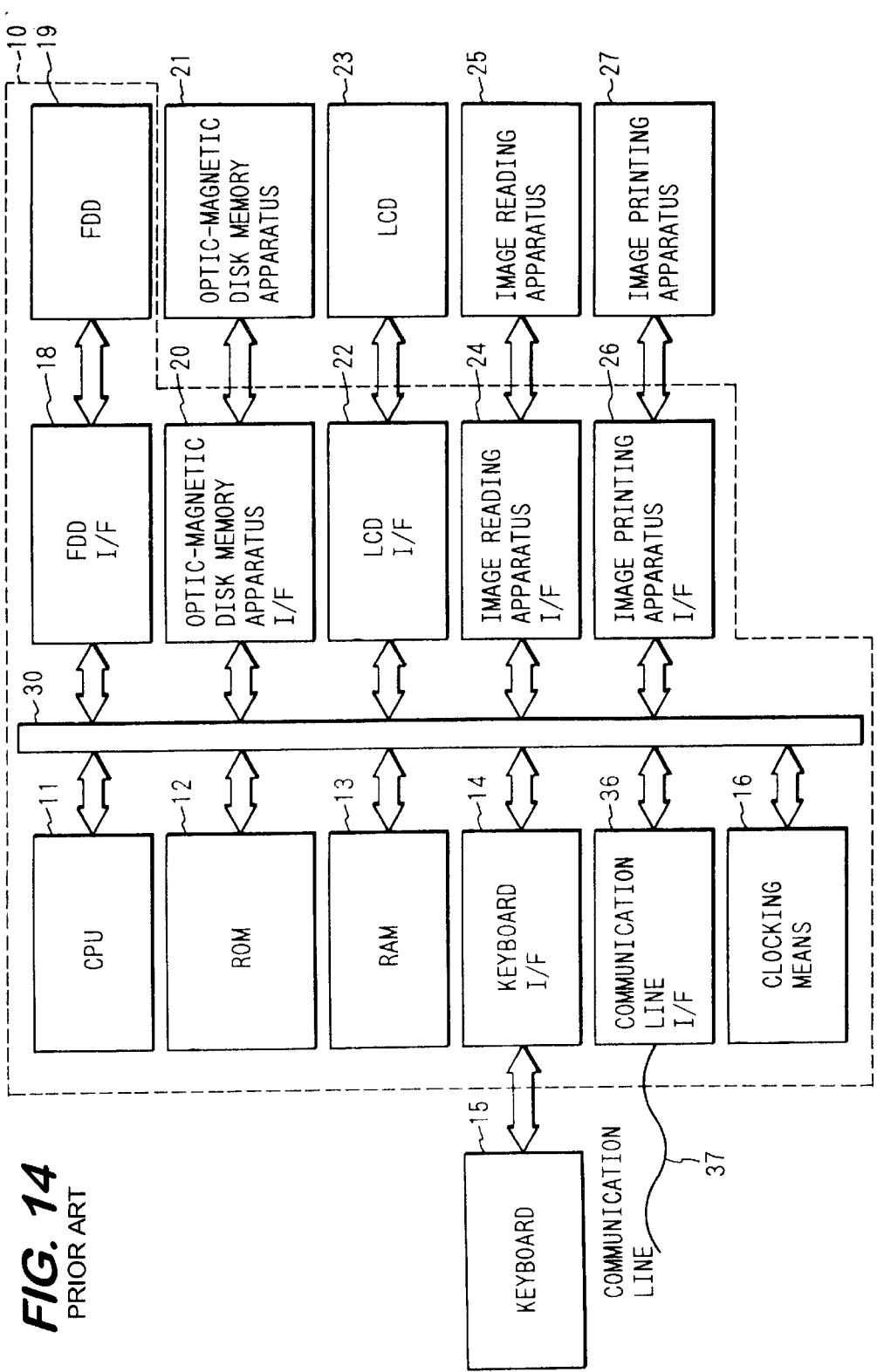
FIG. 14 is a block diagram showing the construction of a fourth embodiment of the electronic filing apparatus of the '504 patent.
Figure 15:
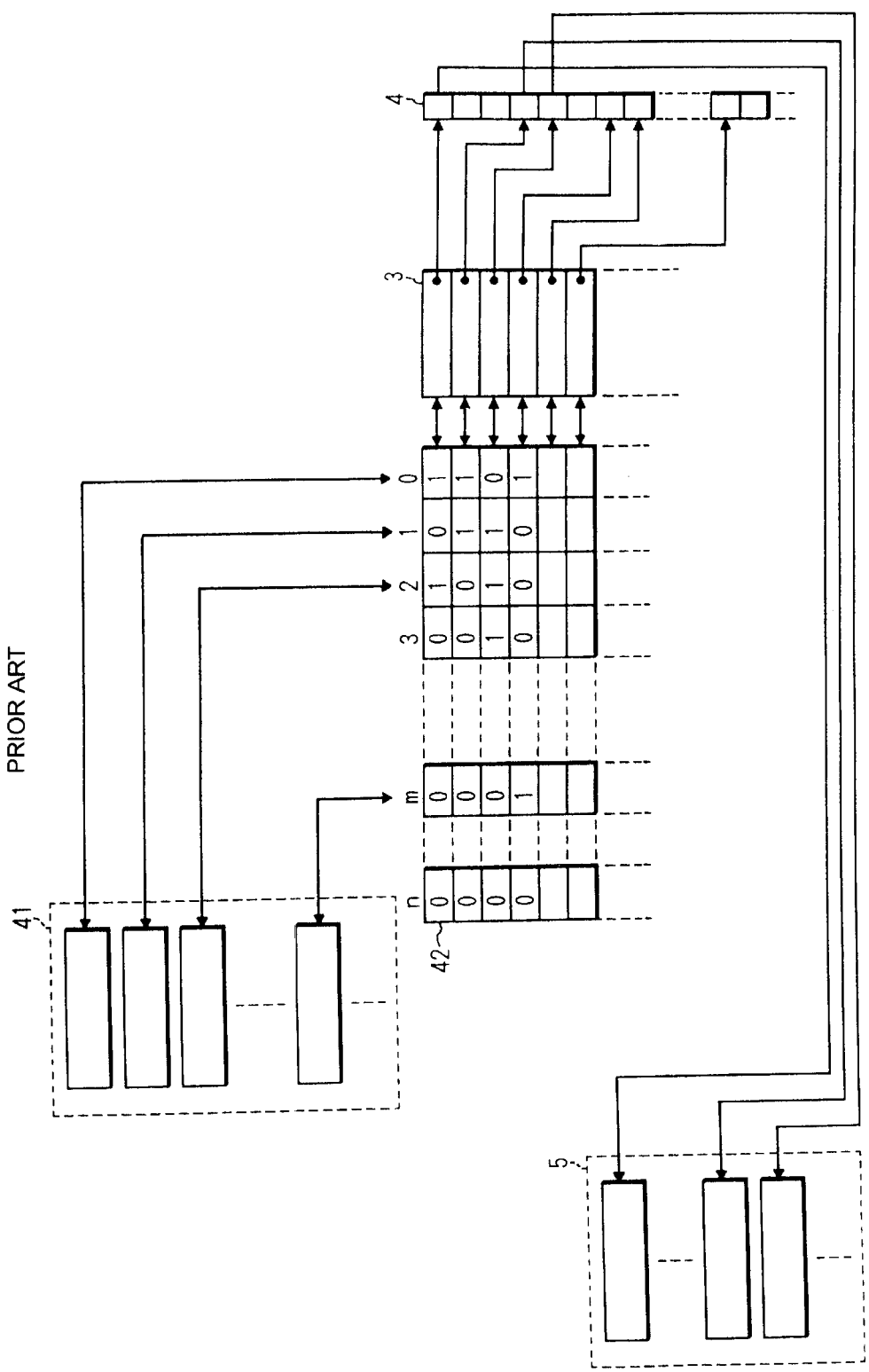
FIG. 15 is a schematic view showing memory area construction for data retrieval in the same embodiment.
Figure 16:
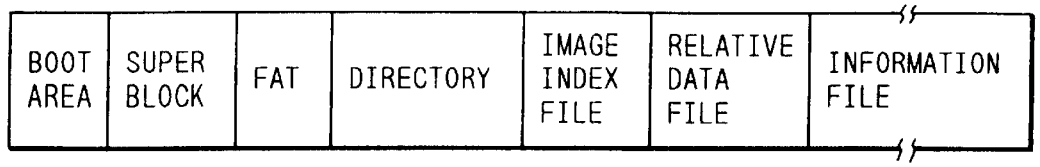
FIG. 16 is a schematic view showing data arrangement on a disk in the same embodiment.
Figure 17:
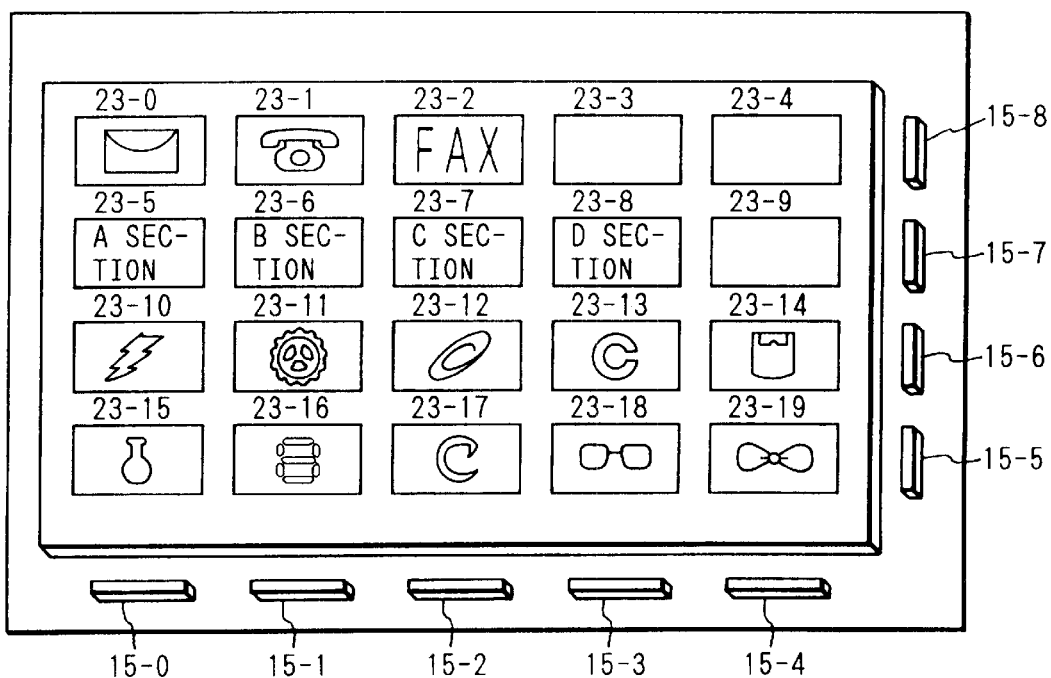
FIG. 17 is a front view showing a key arrangement of a keyboard in the same embodiment.
Figure 20:
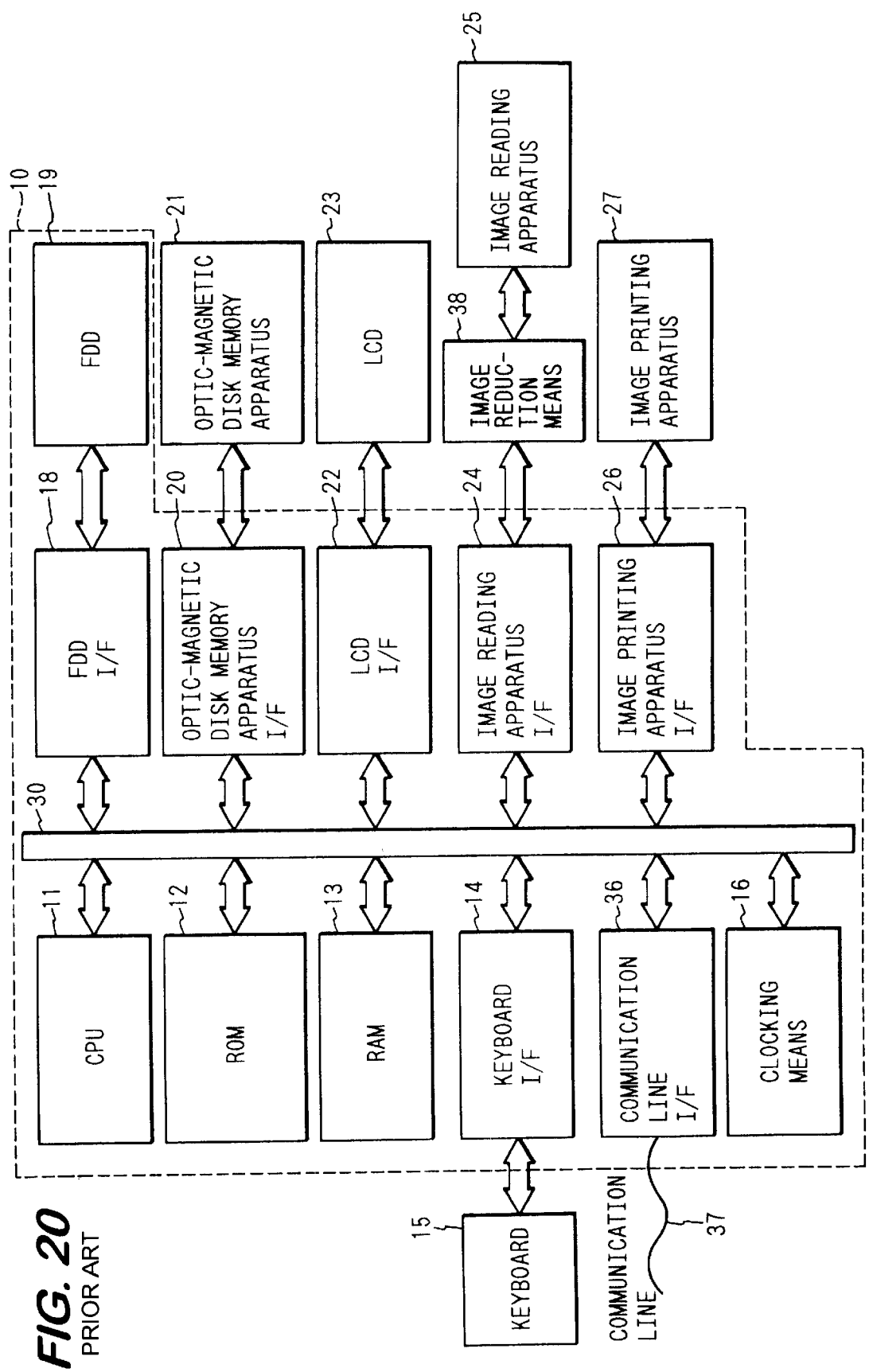
FIG. 20 is a block diagram showing a fifth embodiment of the electronic filing apparatus of the '504 patent.
Figure 21:
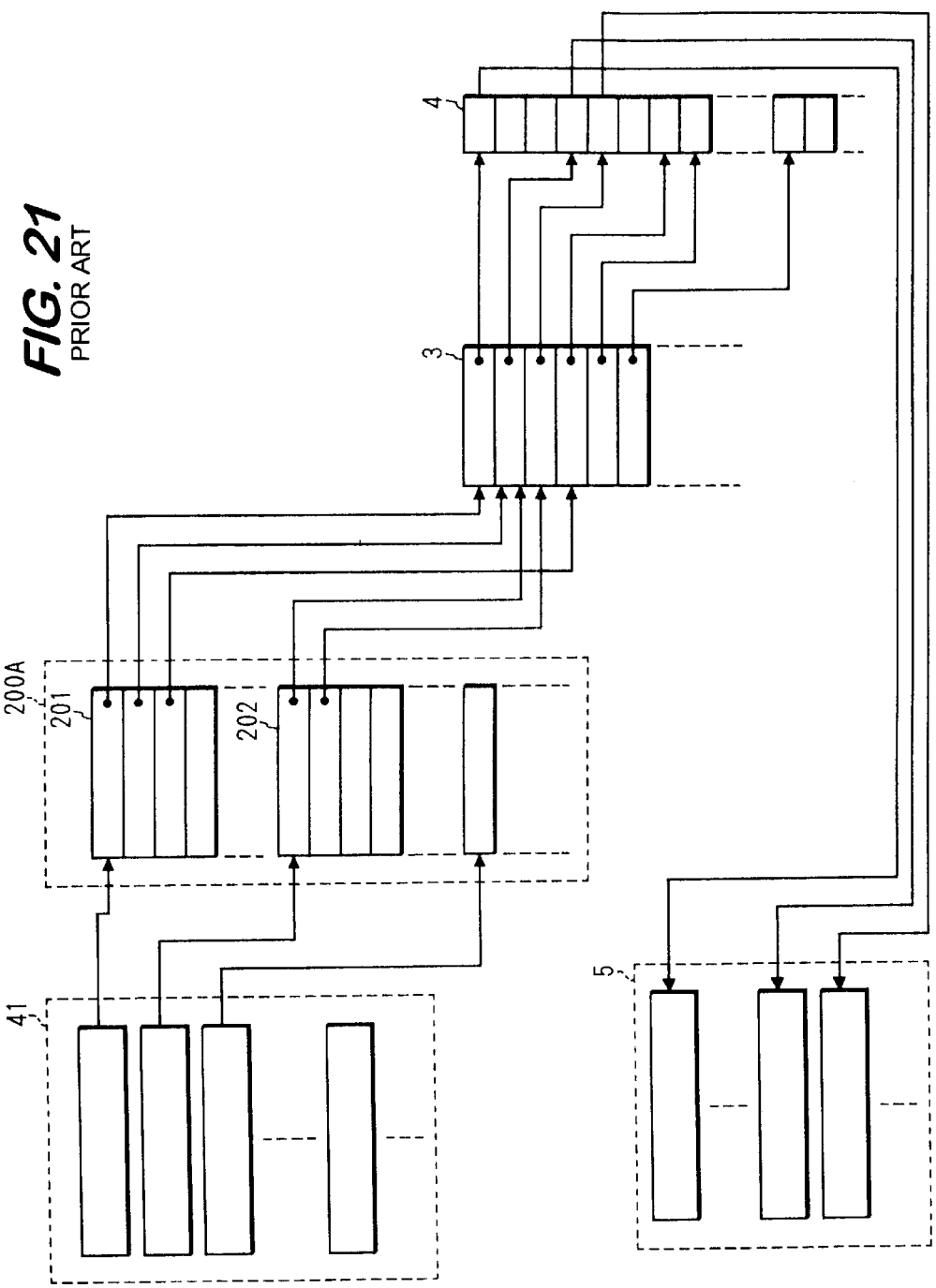
FIG. 21 is a schematic view showing memory area construction for data retrieval in the same embodiment.
Figure 22:
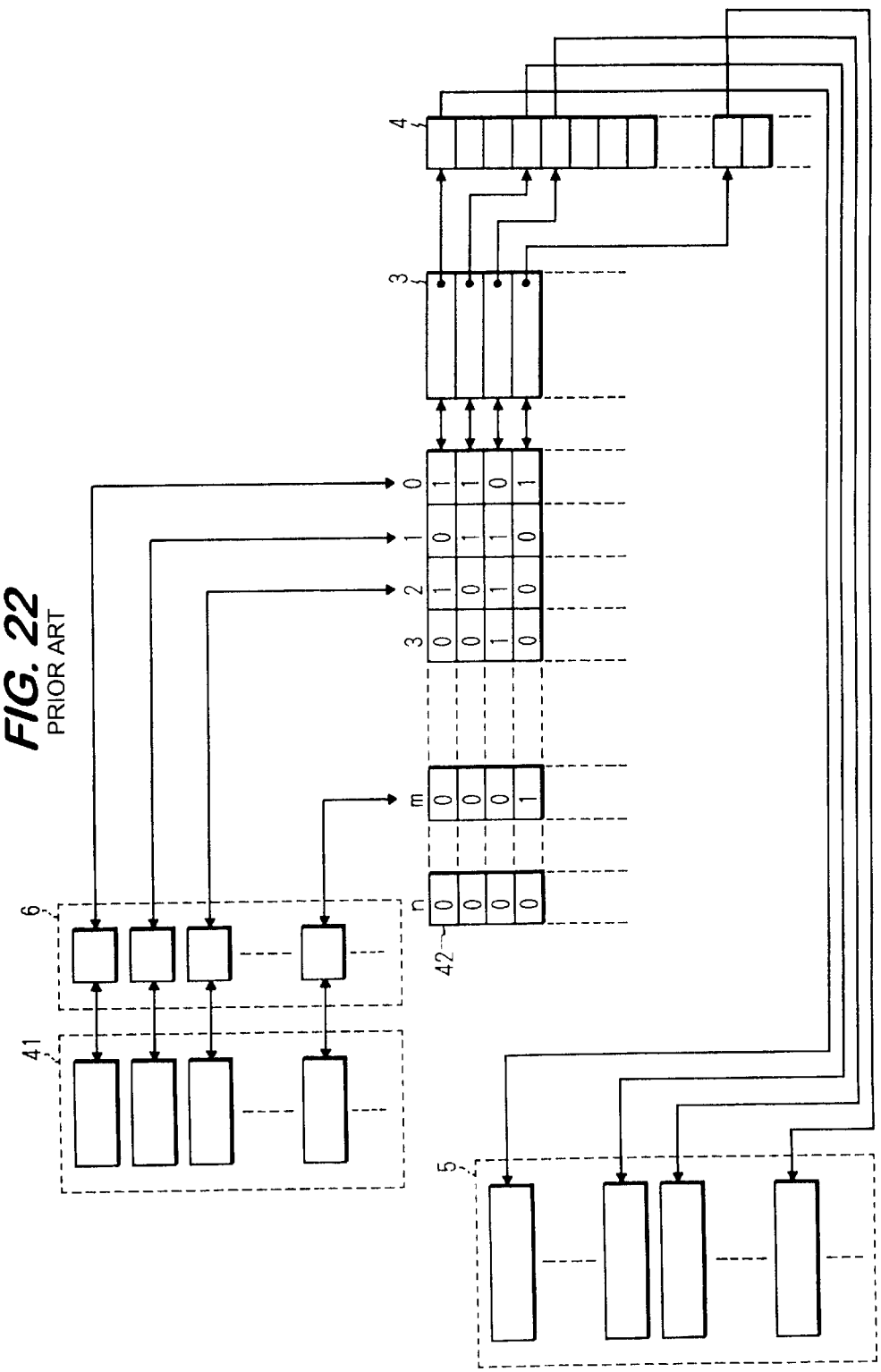
FIG. 22 is a schematic view showing memory area construction for data retrieval in a sixth embodiment of the electronic filing apparatus of the '504 patent.
Figure 24:
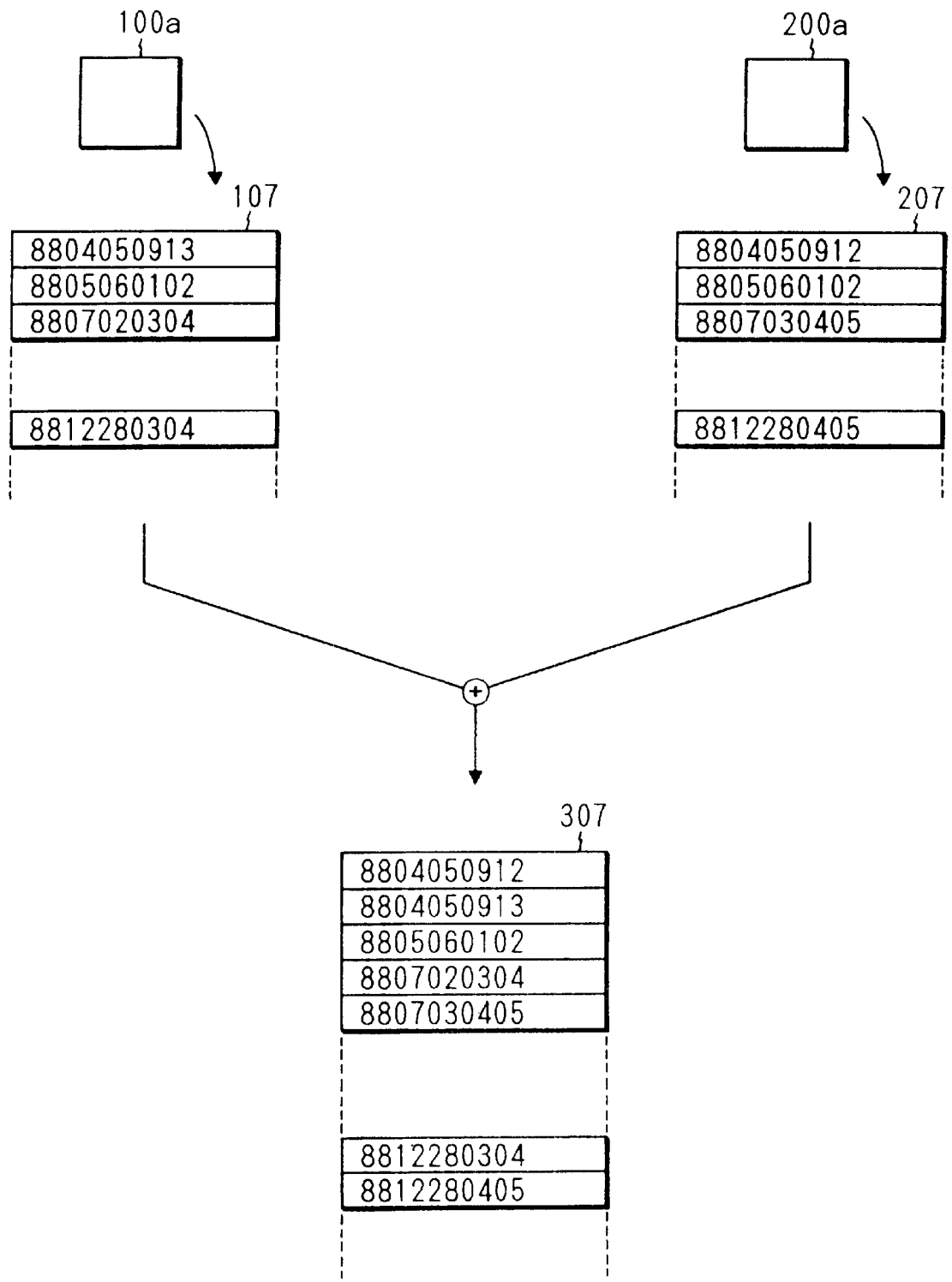
FIG. 24 is a schematic view showing a directory management system when copying data on more than one data storing medium in the same embodiment.
Figure 25:
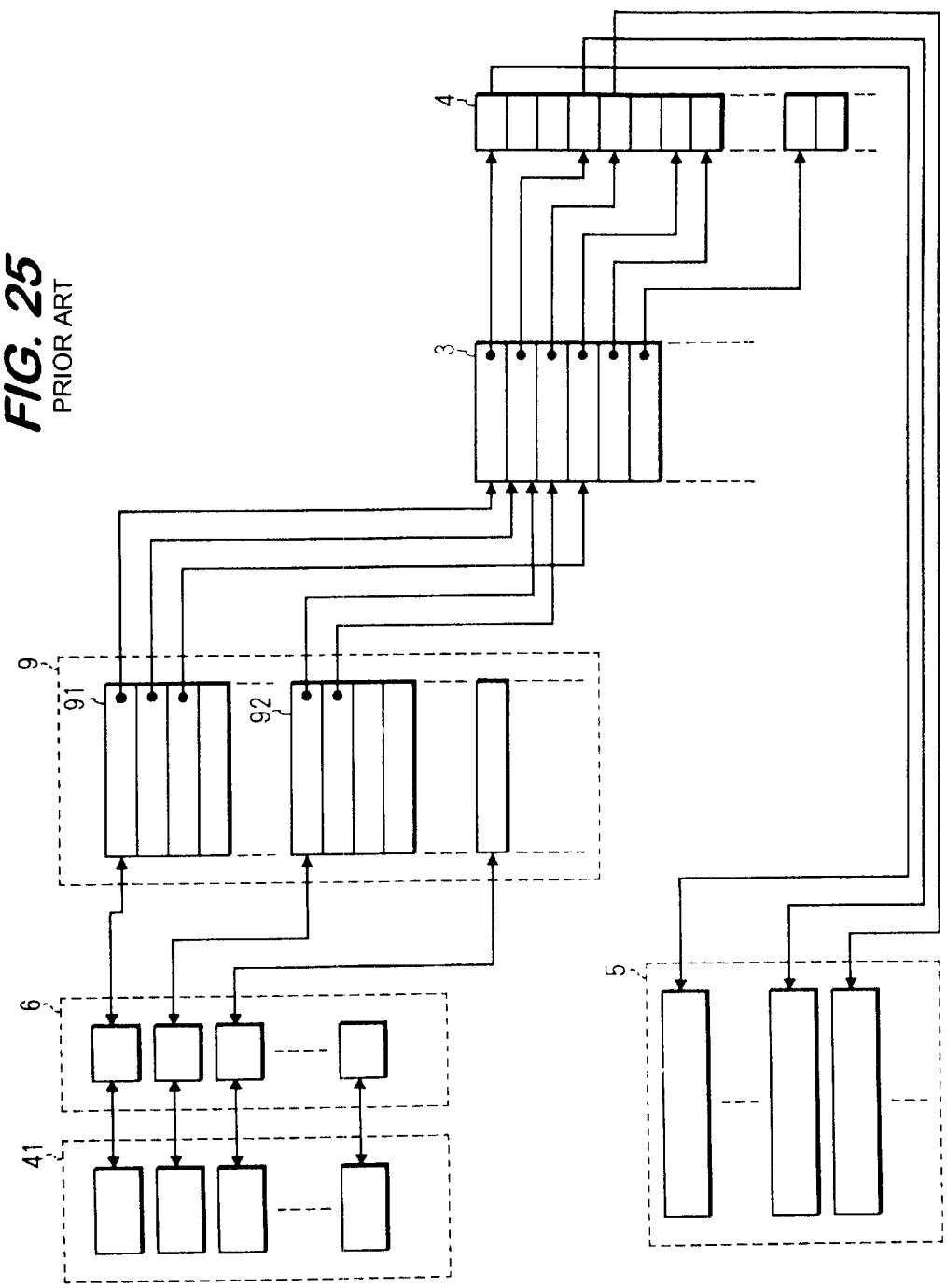
FIG. 25 is a schematic view showing memory area construction for data retrieval in a seventh embodiment of the electronic filing apparatus of the '504 patent.
Figure 27:
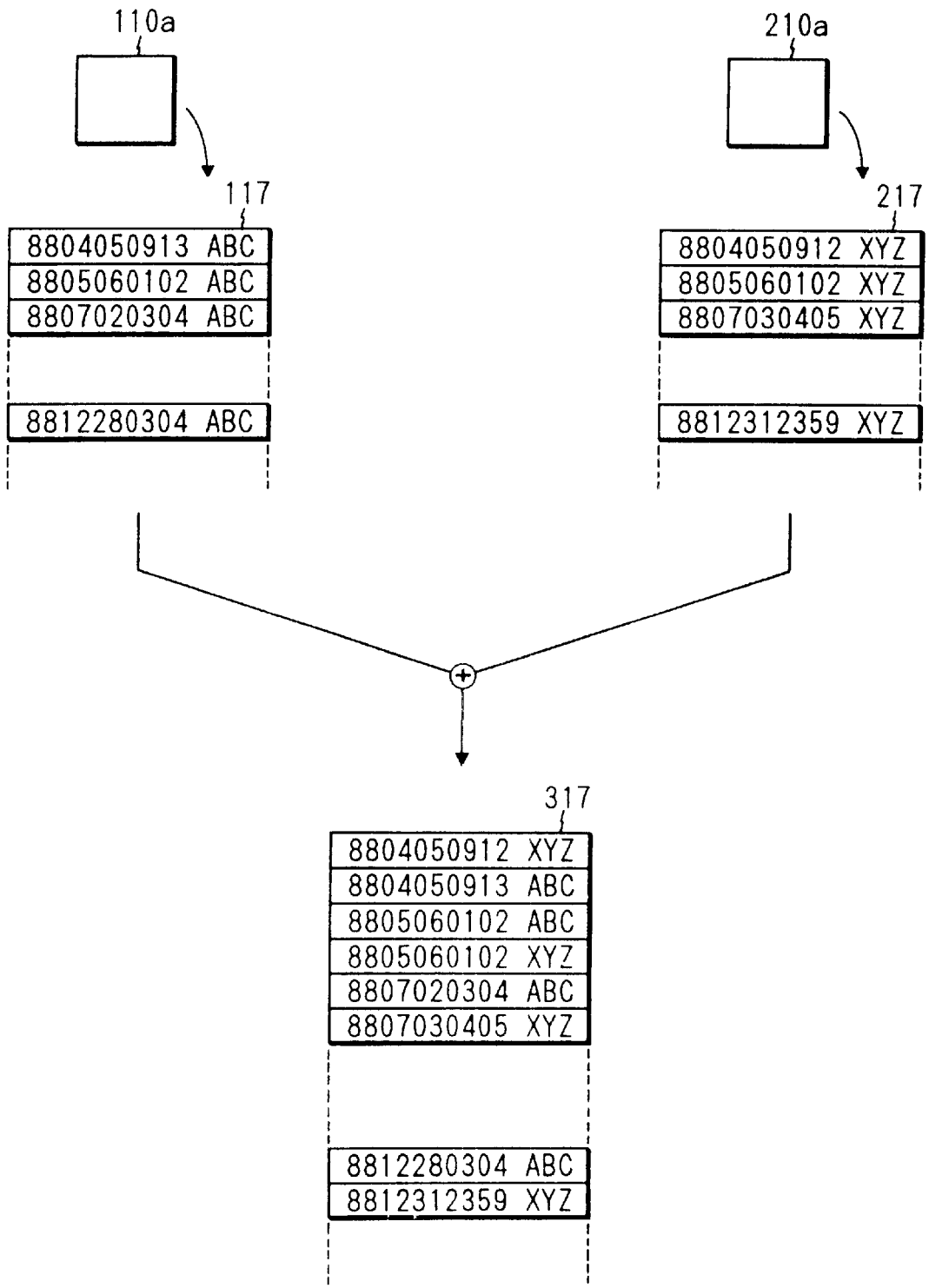
FIG. 27 is a schematic view showing a directory management system when copying data on more than one data storing medium in the same embodiment.
Figure 28:
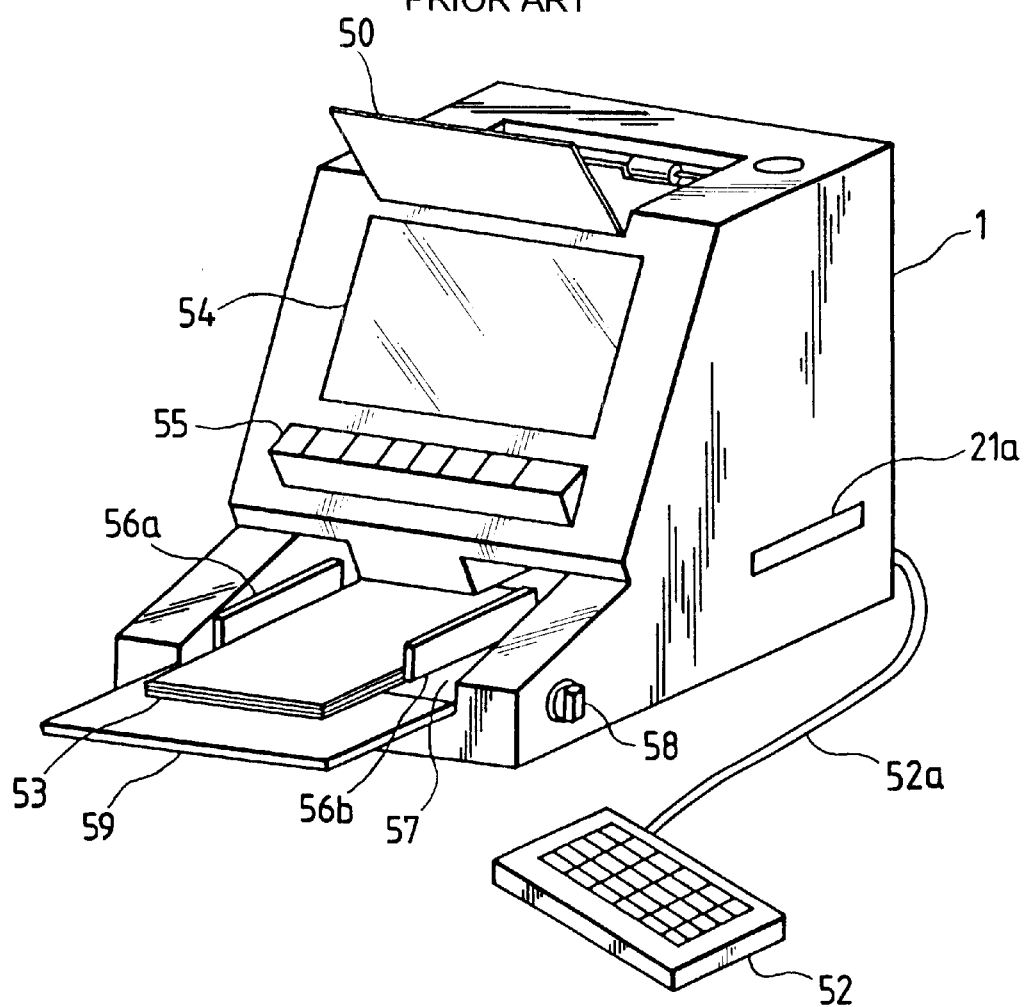
FIG. 28 is a perspective view showing an electronic data filing apparatus of the '504 patent.
Figure 29:
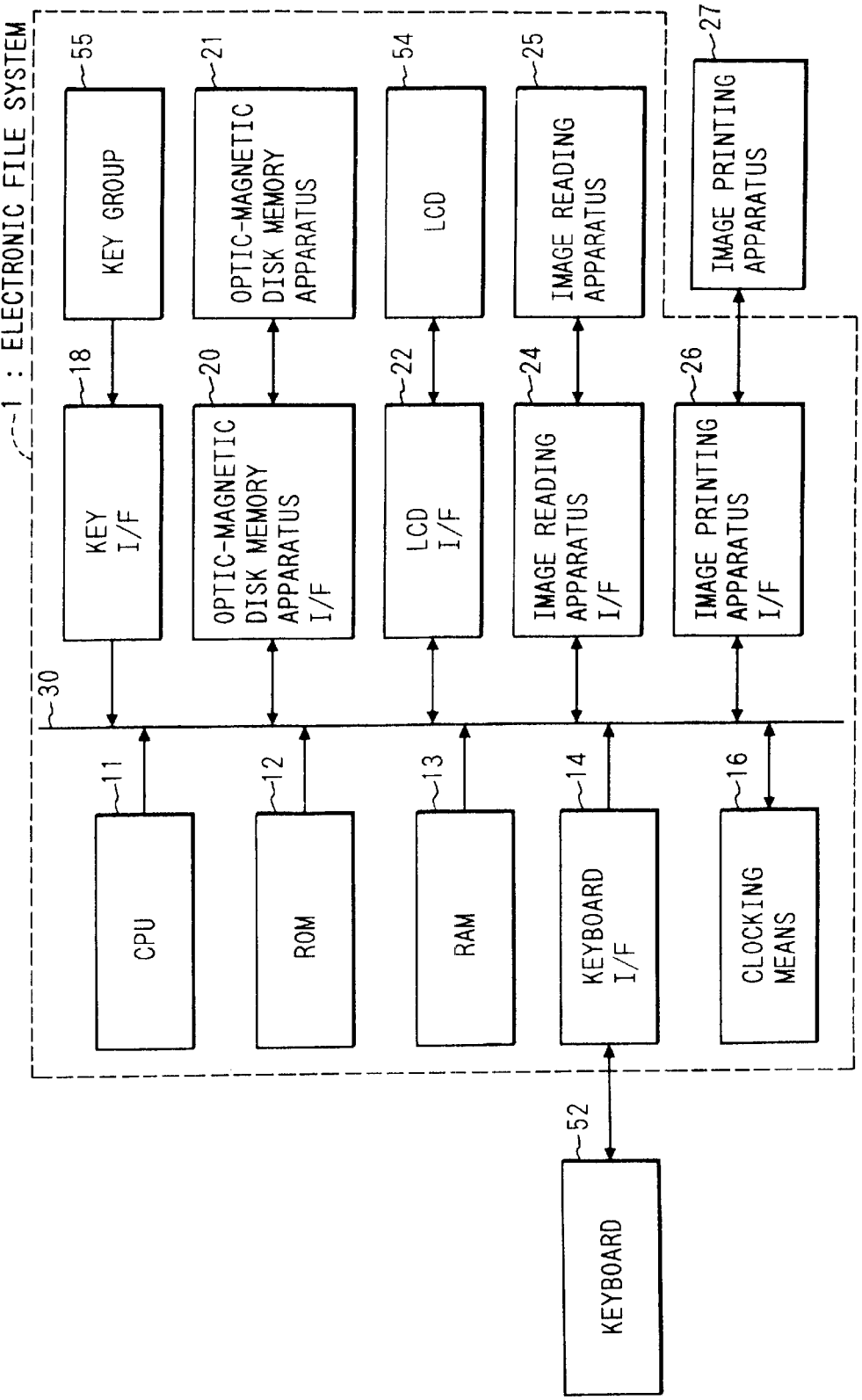
FIG. 29 is a block diagram showing the construction of an electronic data filing apparatus of the same embodiment.
Figures 2, 30:
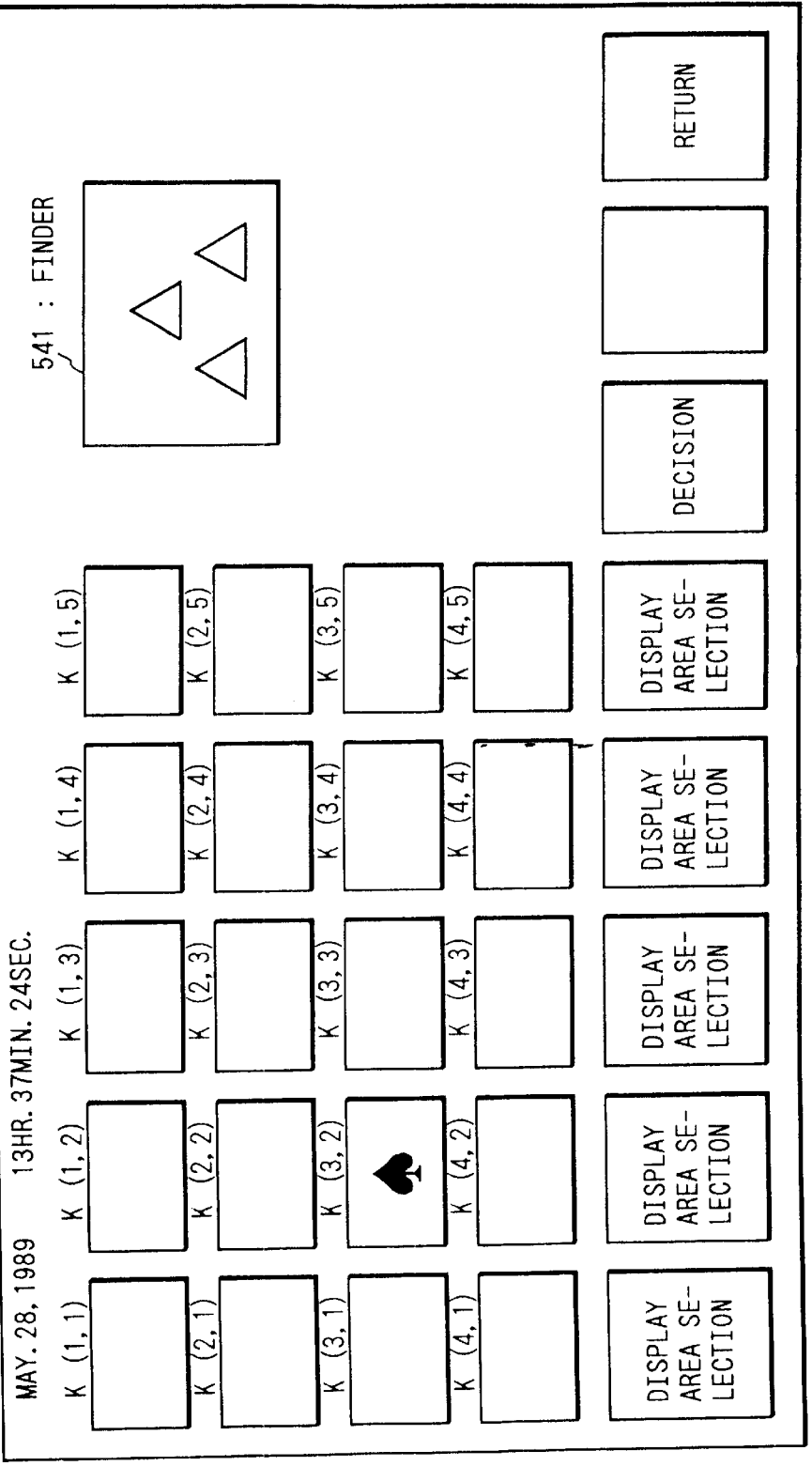
Figures 3, 30:
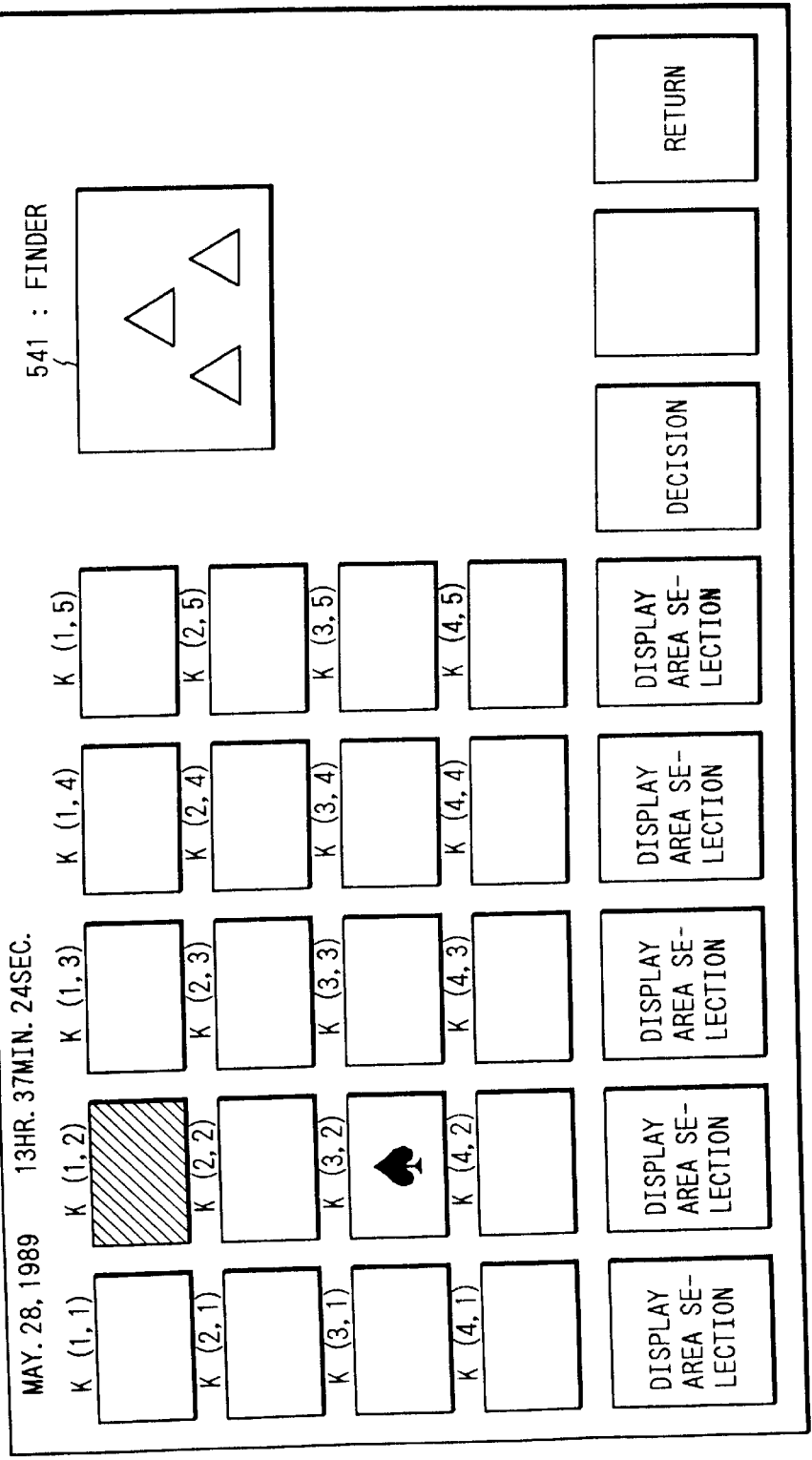
Figures 4, 30:
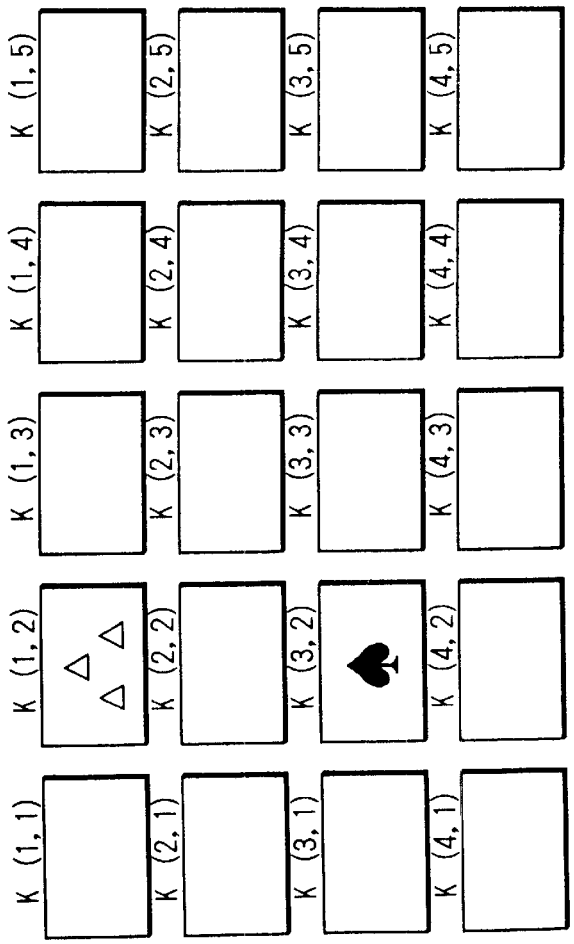
Figures 5, 30:
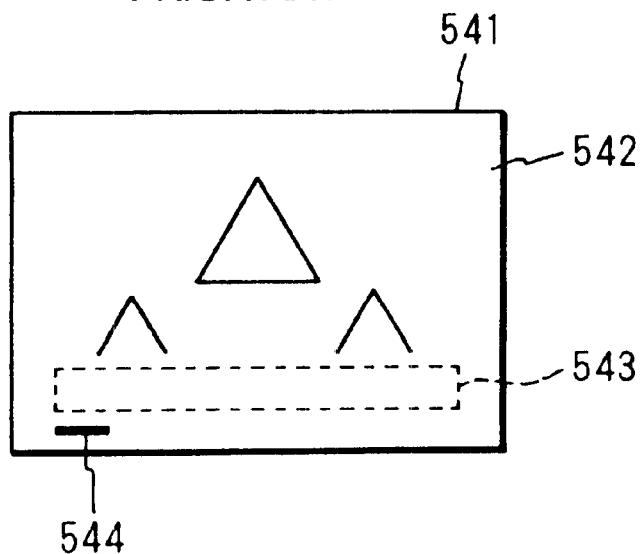
Figures 6, 30:
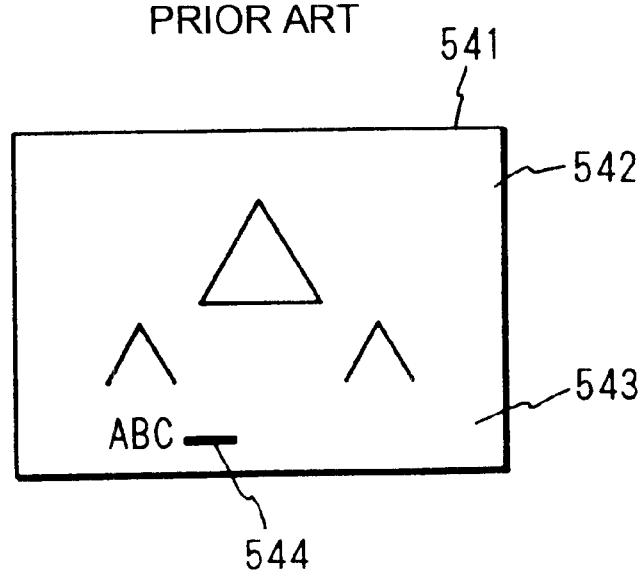
Figure 31:
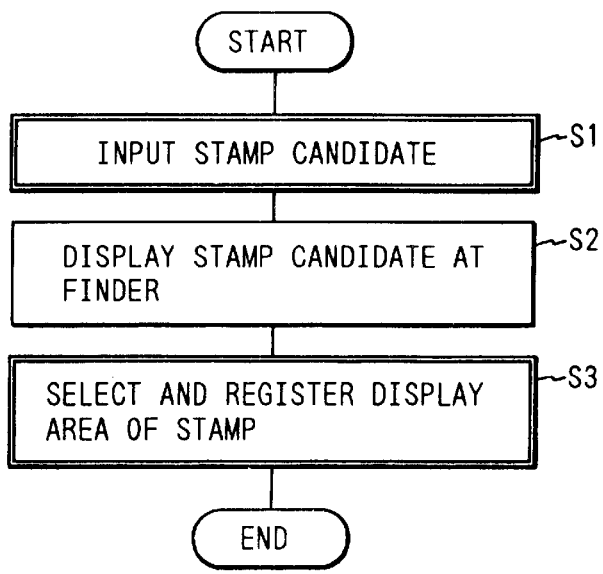
FIG. 31 is a flow chart illustrating a basic operation of stamp registration in the same embodiment.
Figure 32:
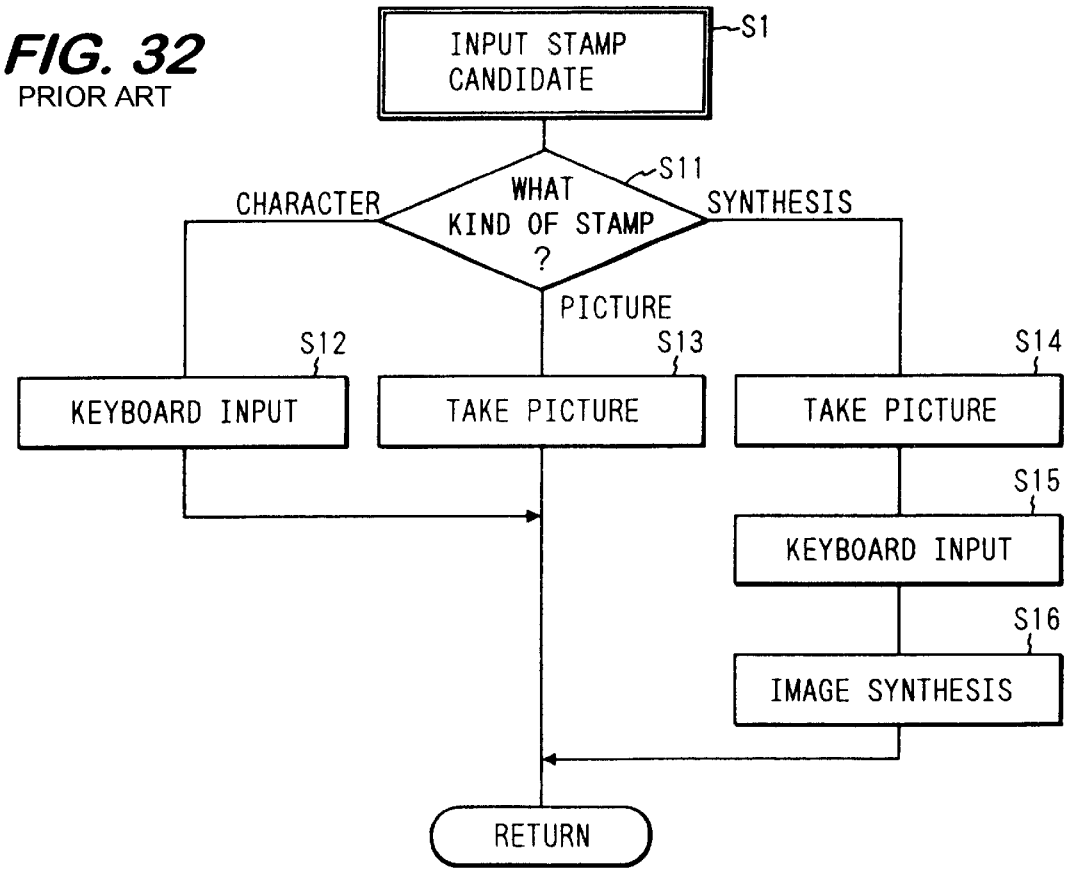
FIG. 32 is a flow chart illustrating a stamp candidate input operation in the same embodiment.
Figure 33:
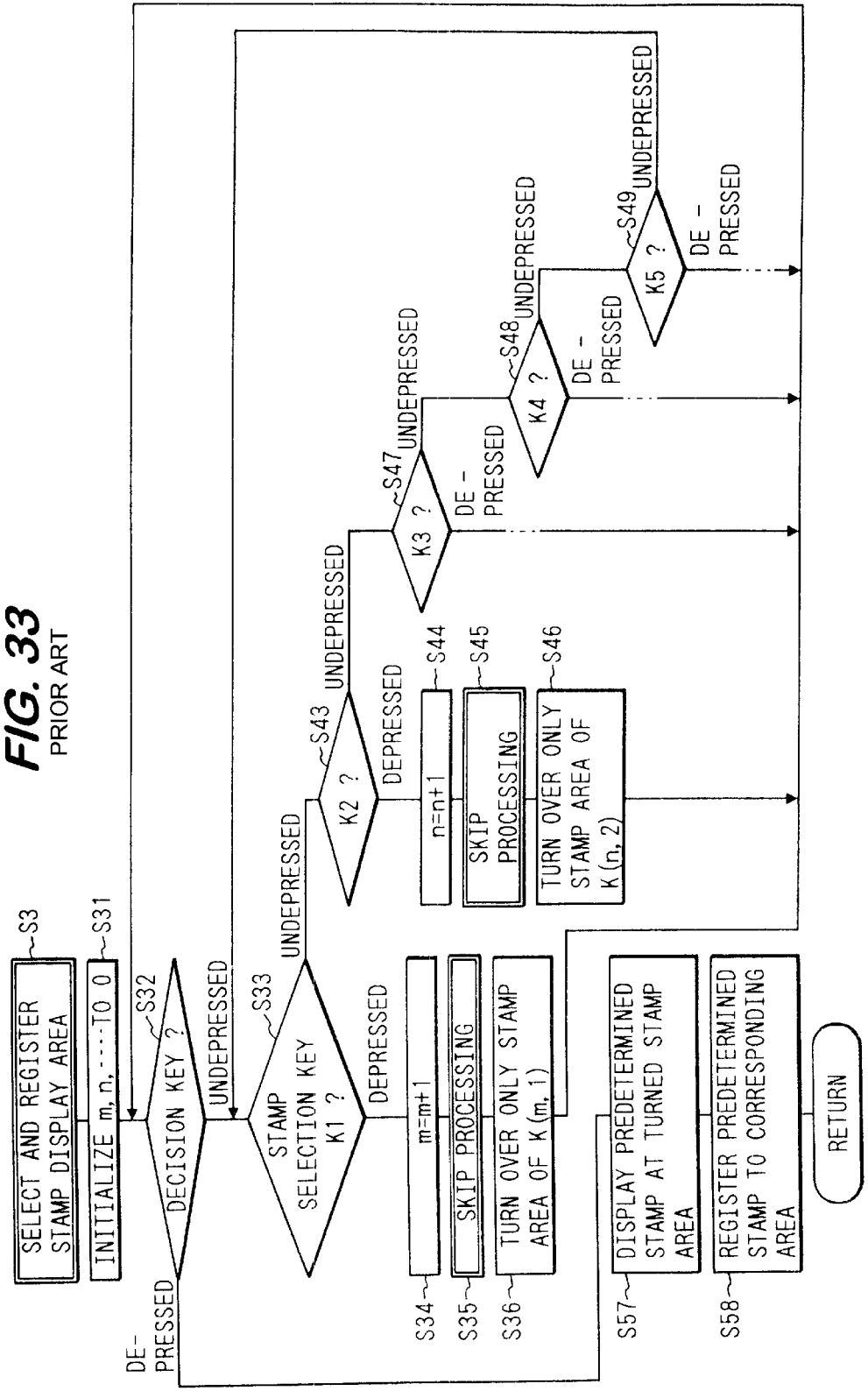
FIG. 33 is a flow chart illustrating a stamp display area selection operation and a stamp registration operation in the same embodiment.
Figure 34:
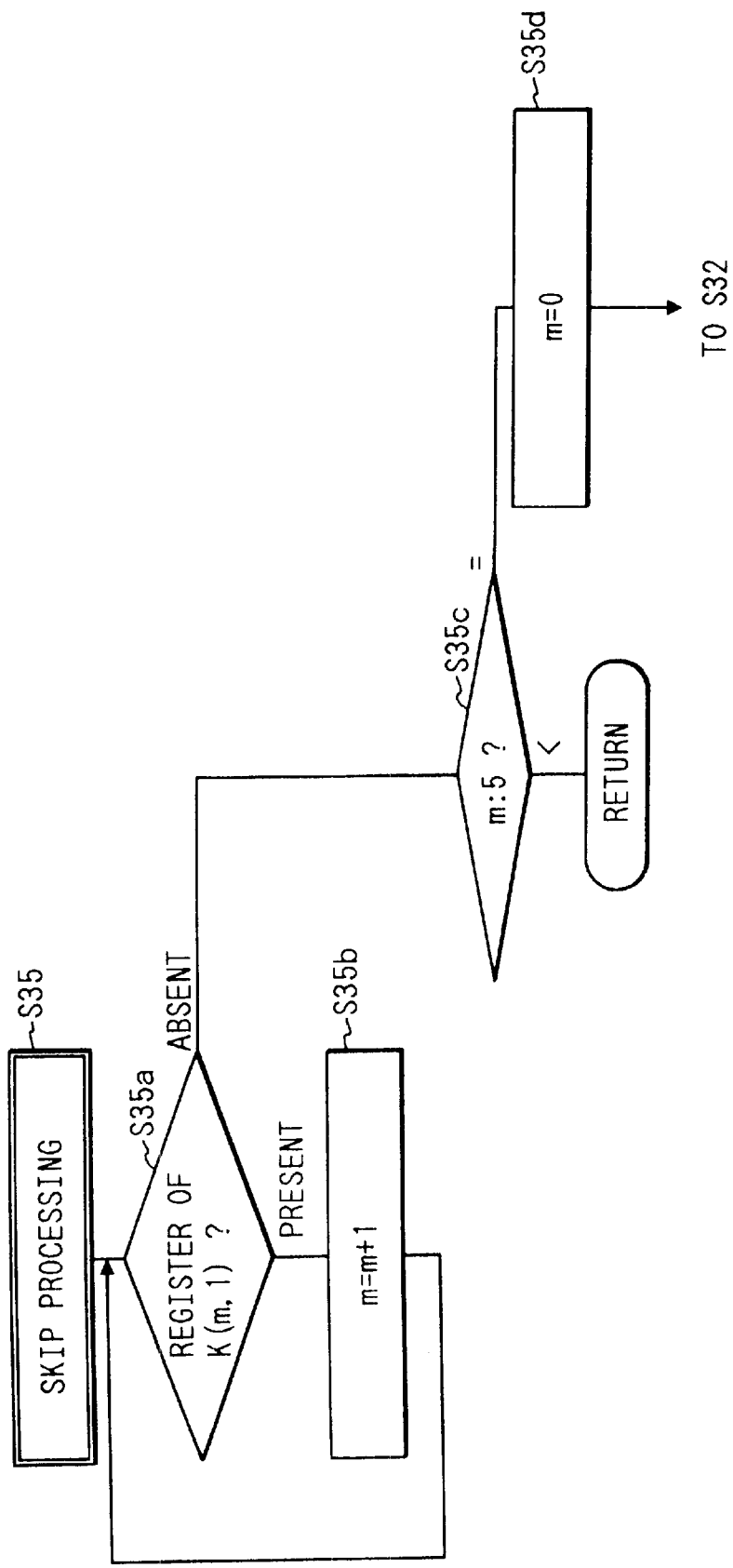
FIG. 34 is a flow chart illustrating a skipping operation in the same embodiment.
Figure 35:
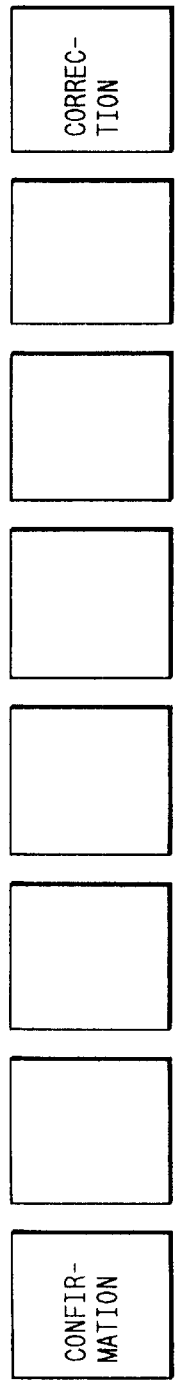
Figure 37:
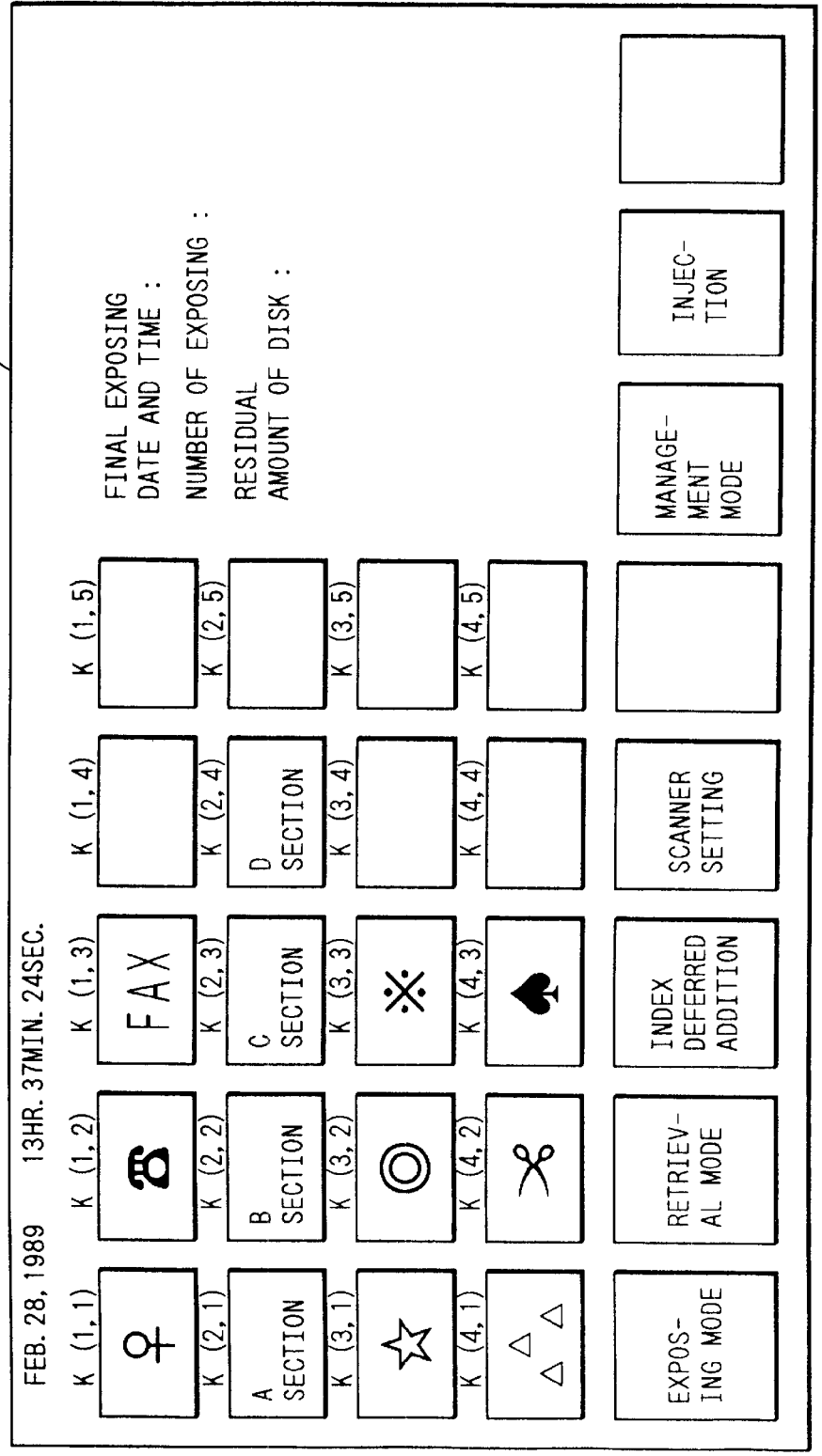
Figure 38:
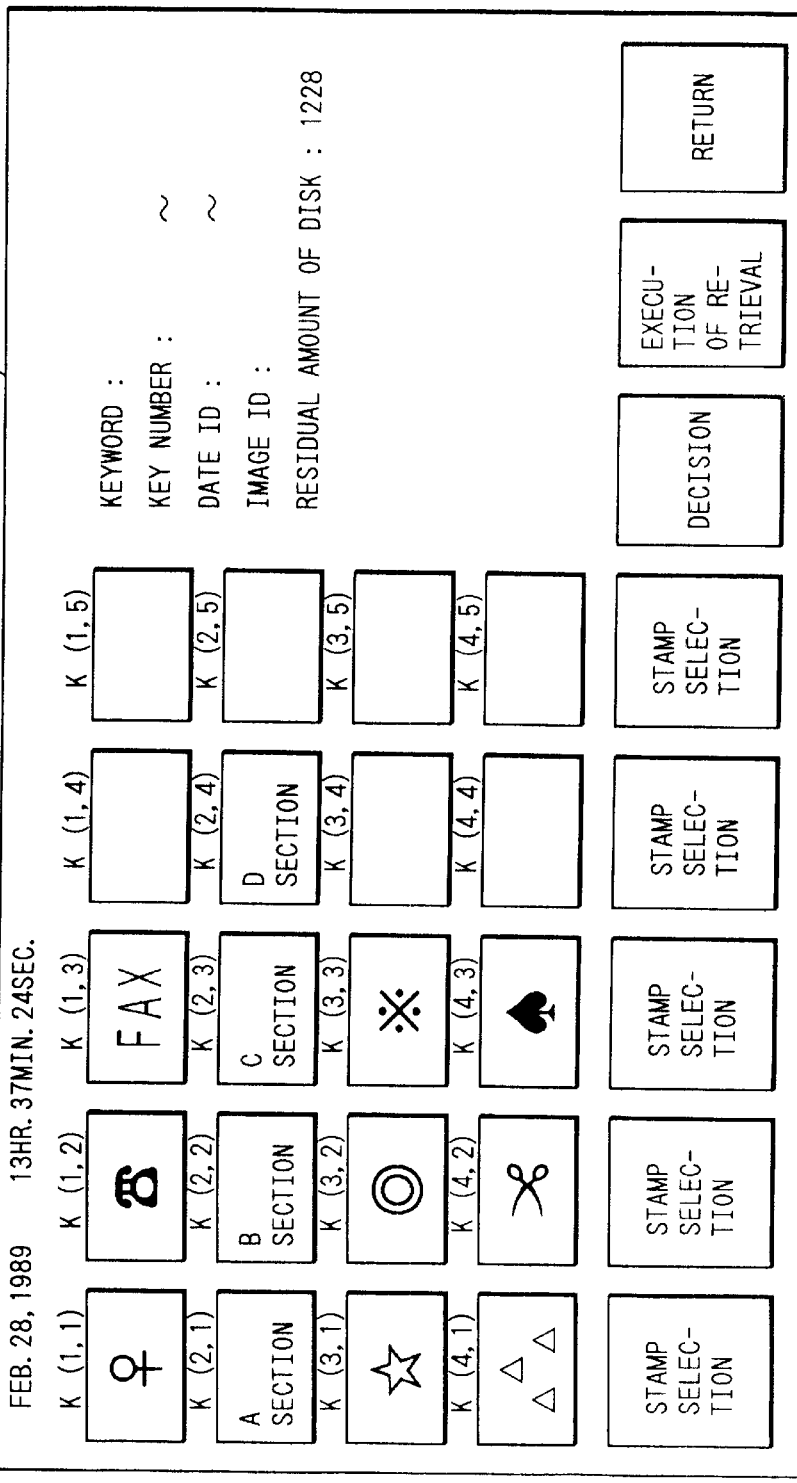
Figure 39:
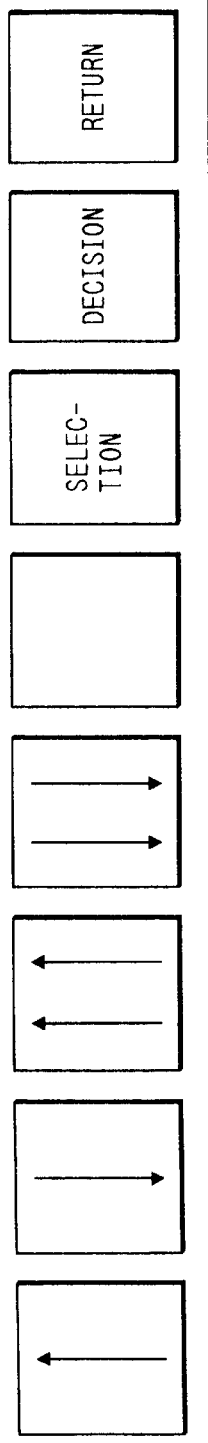
Figure 40:
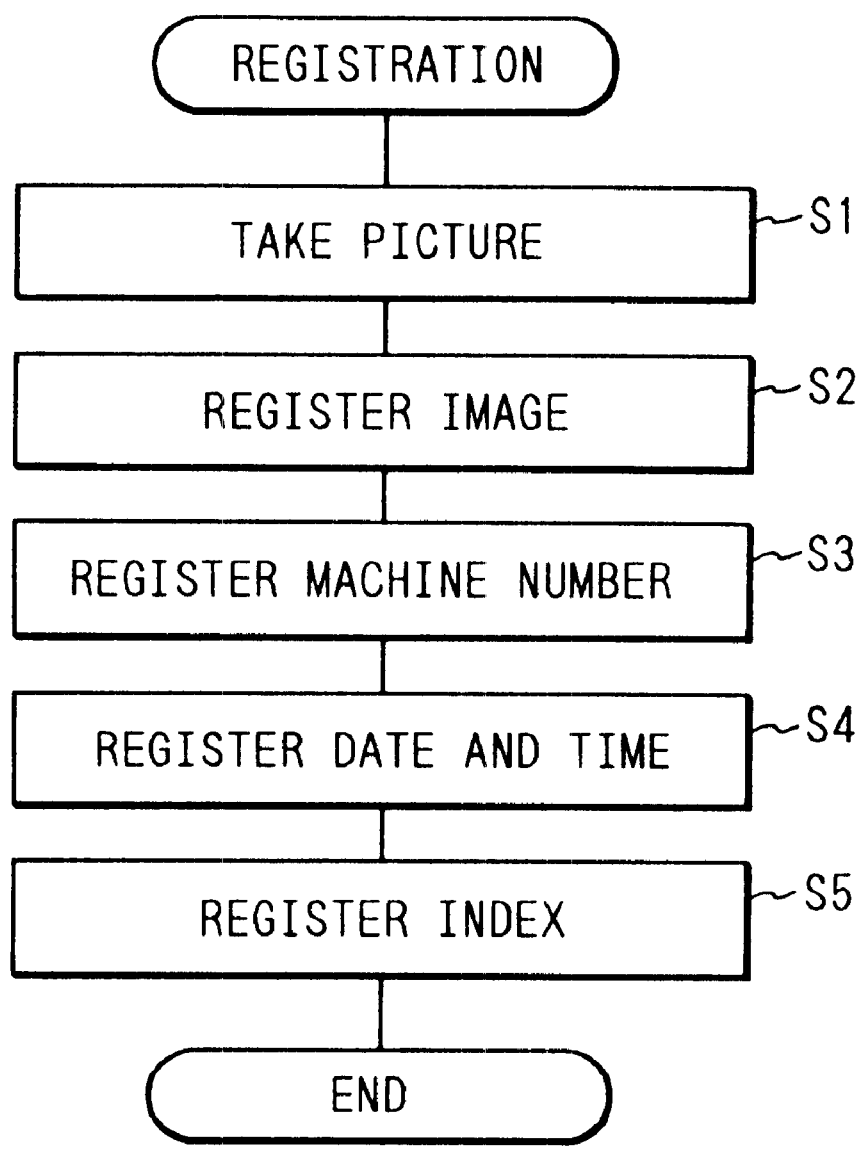
FIG. 40 is a flow chart illustrating a basic operation of registration according to the '726 patent.
Figure 41:
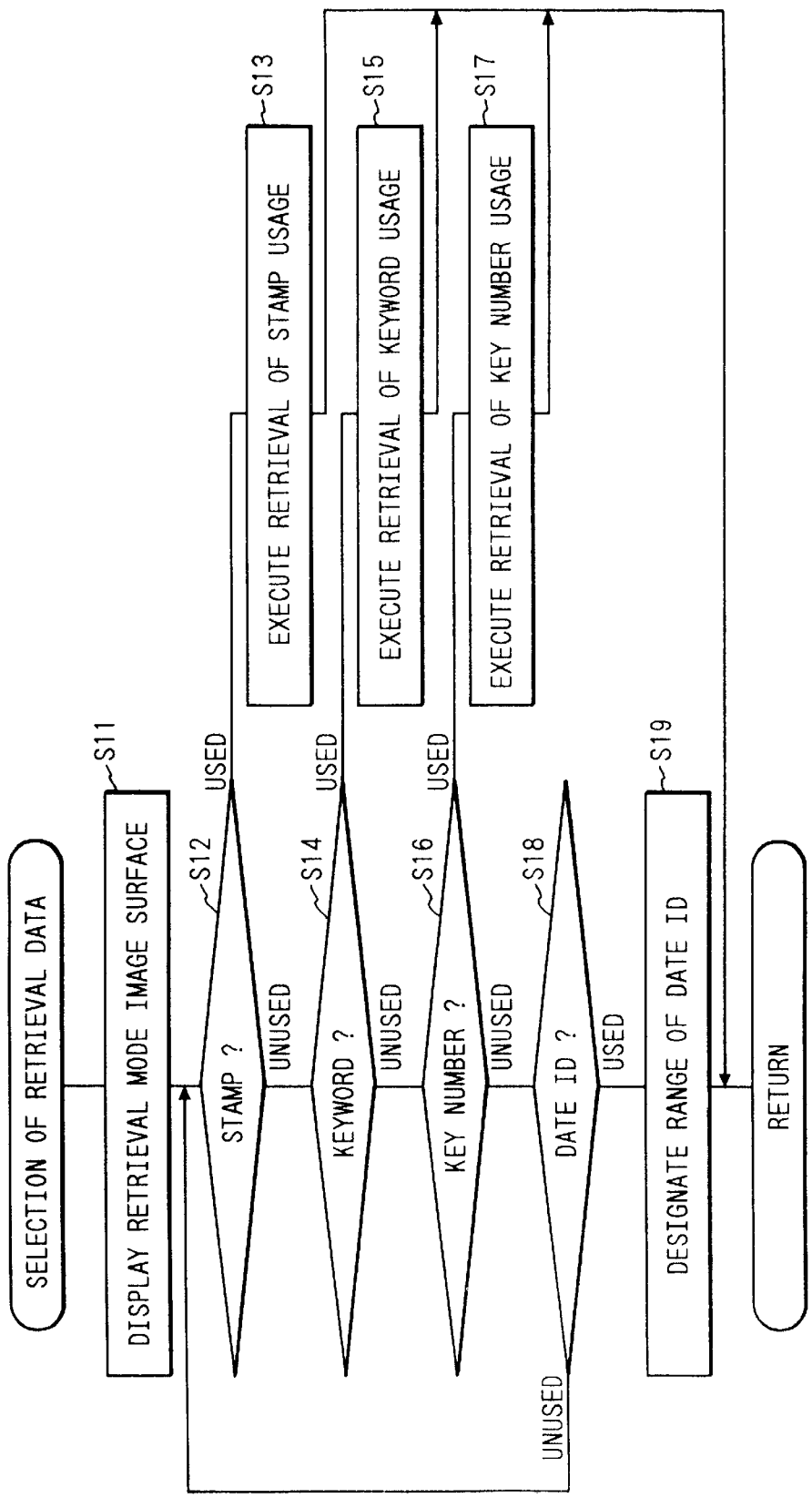
FIG. 41 is a flow chart illustrating an operation of retrieval data selection according to the '726 patent.
Figure 42:
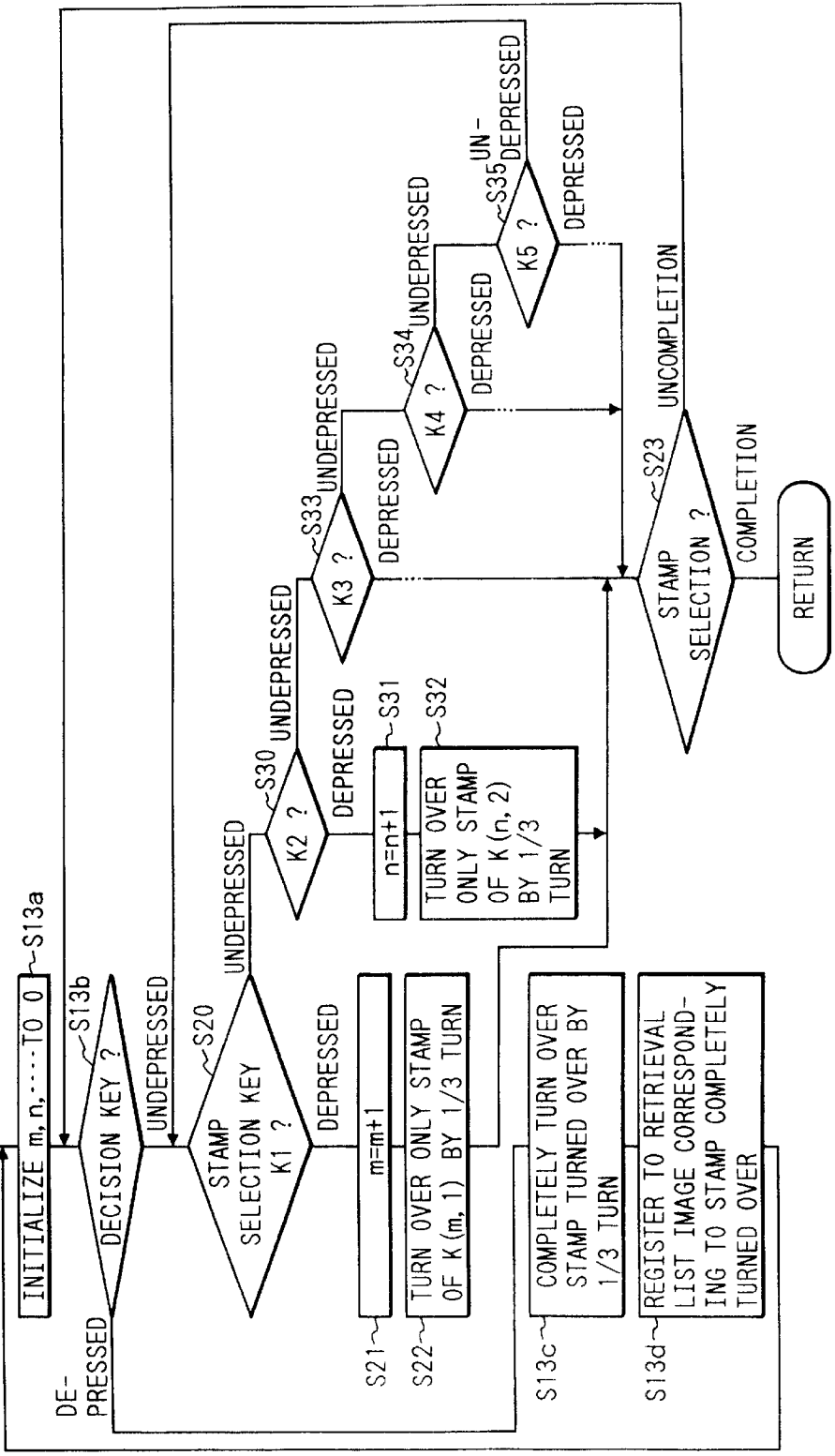
FIG. 42 is a flow chart illustrating an operation of retrieval data selection using a stamp according to the '726 patent.
Figure 43:
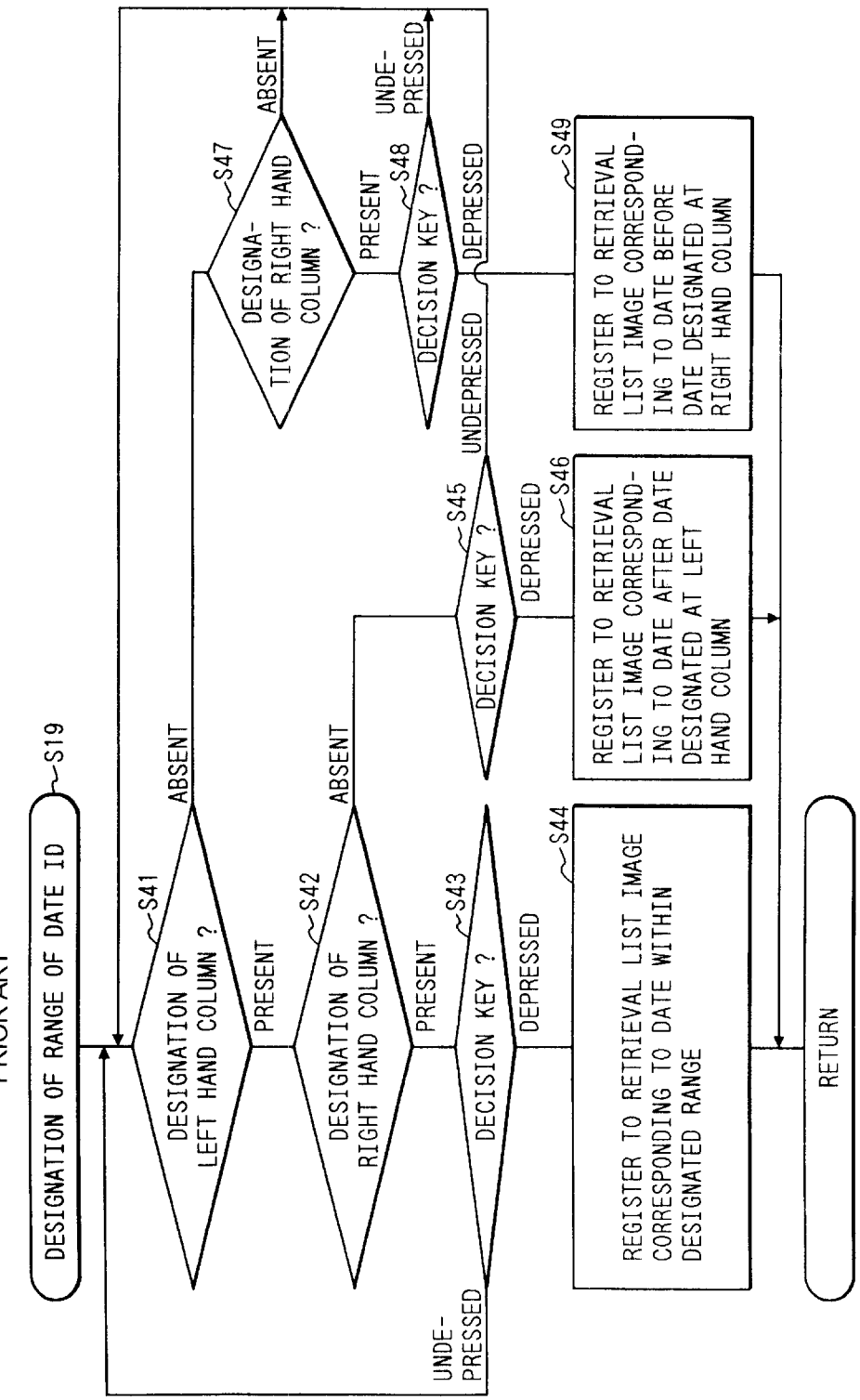
FIG. 43 is a flow chart illustrating an operation of date ID range specification according to the '726 patent.
Figure 44:
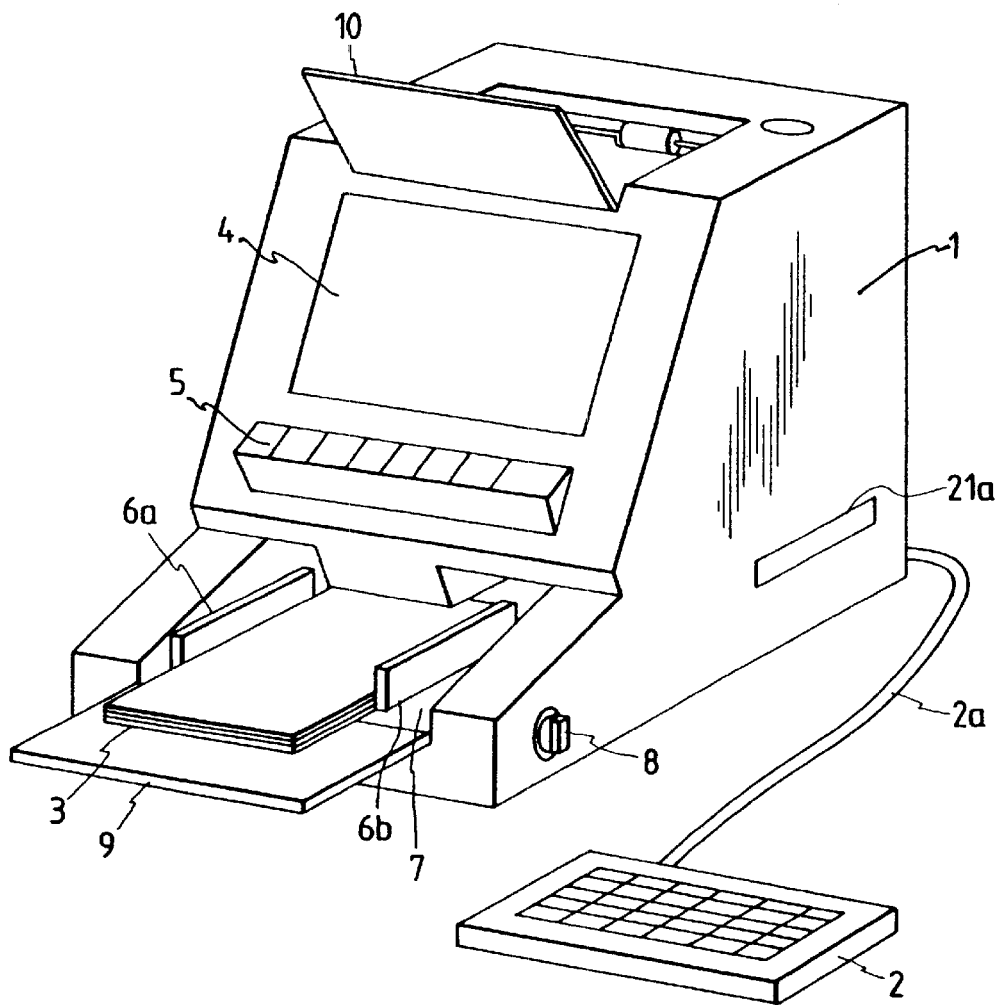
FIG. 44 is a perspective view showing an embodiment of the present invention.

FIG. 44 is a perspective view showing an embodiment of the present invention.

The embodiment comprises: a keyboard 2 to input operation commands to control an electronic filing system 1 or to input characters or numerals; a signal line 2a connecting the electronic filing system main body 1 with the keyboard 2; a plate-shaped display device 4 which is constructed by a liquid crystal, an electroluminescence, a plasma, a fluorescent display tube, or the like; a key group 5; side plates 6a and 6b which restrict the lateral direction of sheet-like originals 3 and are attached so as to be movable in the lateral direction on an original setting plate 7; a switching control 8; a tray 9 to support the originals 3; and a discharge tray 10.

The switching control 8 is shown and used as an example of means for selecting either one of the manual paper feed mode and the continuous paper feed mode.

Figure 45:
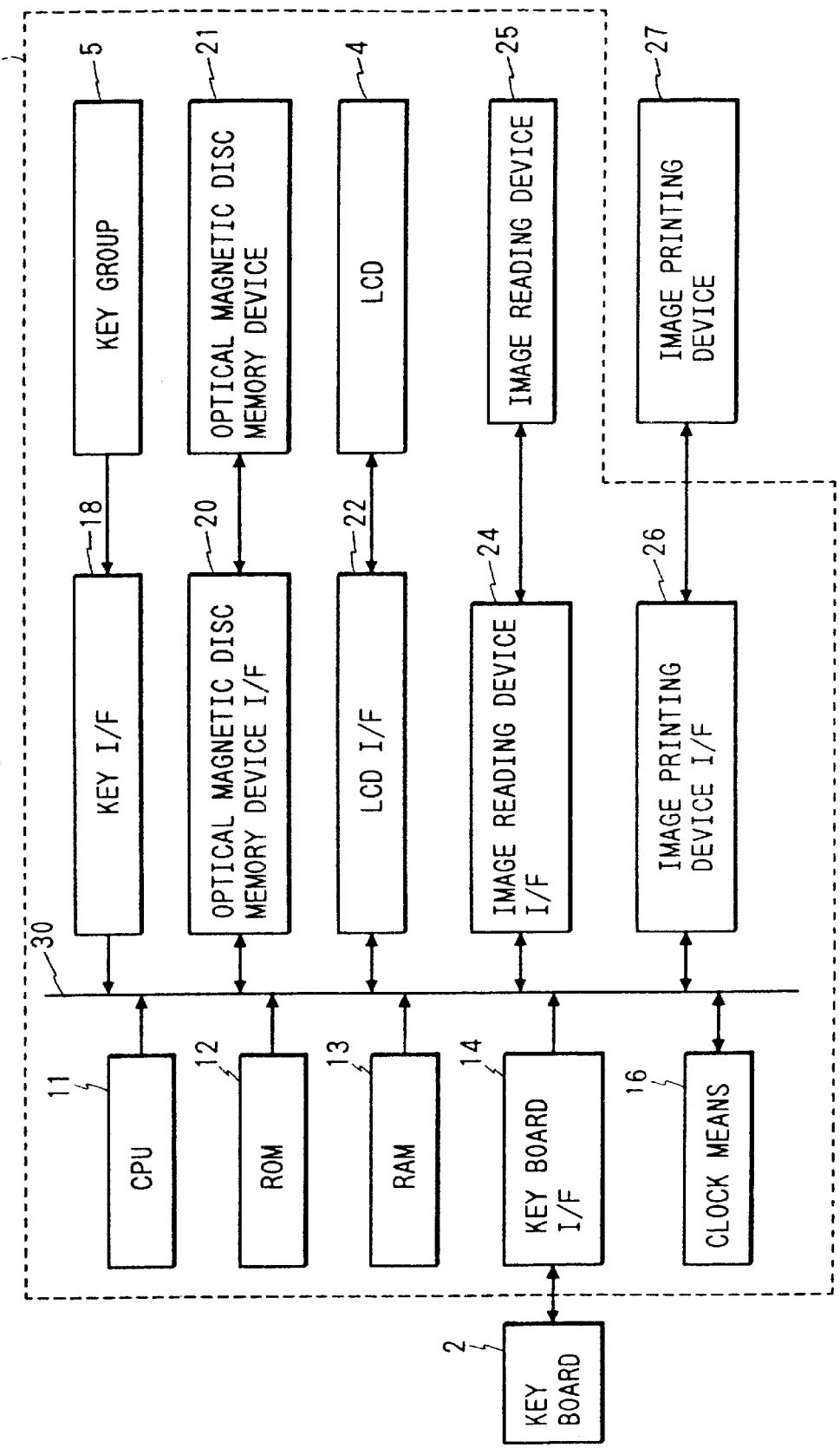
FIG. 45 is a block diagram showing an arrangement of an electronic filing system in the embodiment.

FIG. 45 is a block diagram mainly showing an internal arrangement of the electronic filing system 1 in the embodiment.

The electronic filing system 1 has therein: a CPU 11 to control the whole electronic filing system 1; an ROM 12 in which programs for flowcharts, which will be explained hereinlater, and the like have been stored; an RAM 13 which is used as a work memory or the like; a keyboard I/F 14 for the keyboard 2; a switching control I/F 15 for the switching control 8; clock means 16 for counting a time regarding year, month, day, hour, minute, and second; a key I/F 18 for the key group 5; a magnetooptic disc memory device 21 to store image data and the like to a magnetooptic disc provided in the main body 1; an I/F 20 for the magnetooptic disc memory device; an LCD as an example of the display device 4; an LCD I/F 22; an image reading device 25 such as a CCD or the like; an I/F 24 for the image reading device; and an I/F 26 for an image printing device. The electronic filing system 1 is connected to the keyboard 2 and an image printing device 27.

The operation of the embodiment will now be described.

Figure 46:
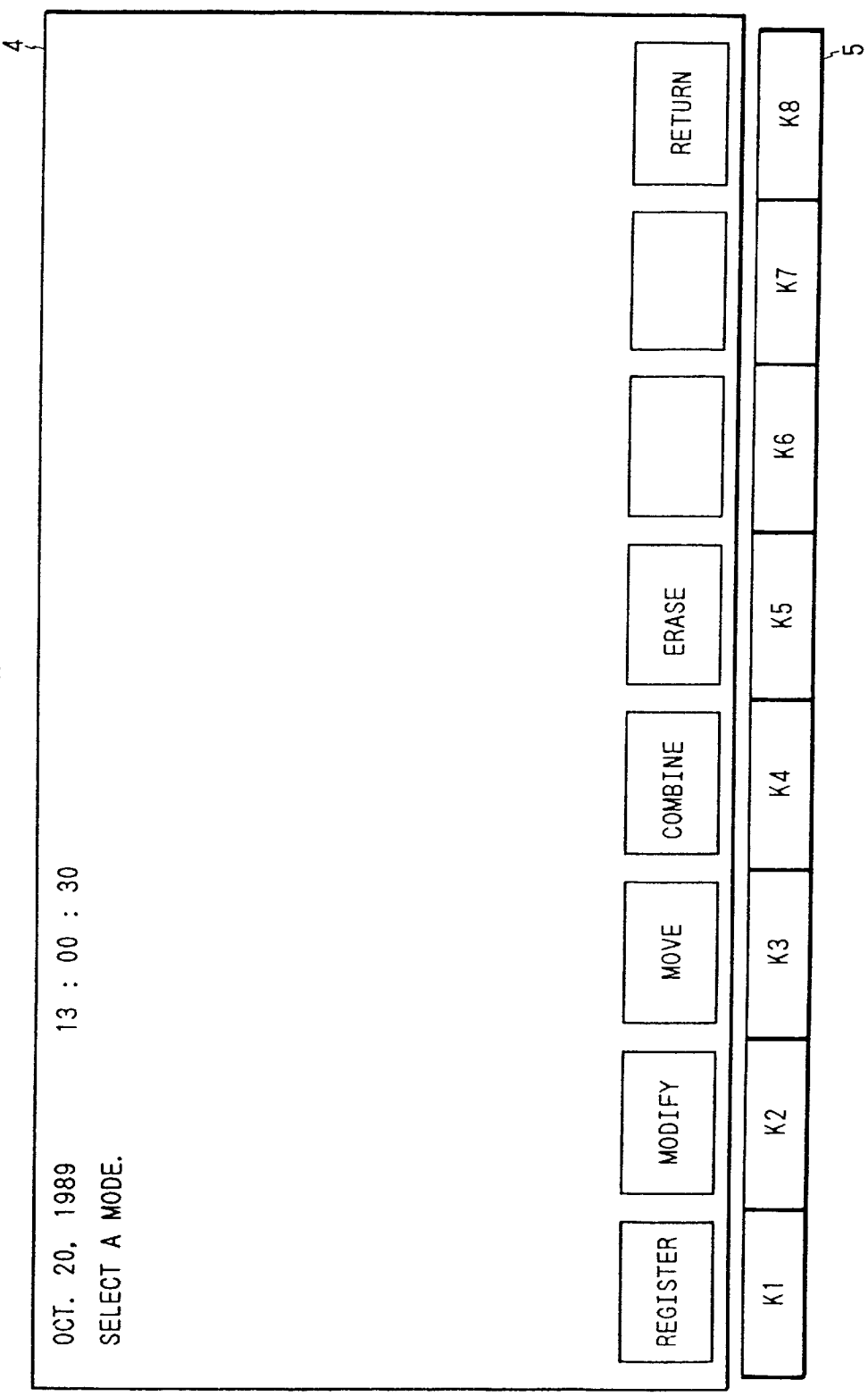
FIG. 46 is a diagram showing an example of a stamp mode selecting picture frame in the embodiment.

FIG. 46 is a diagram showing a mode selecting picture frame of the embodiment.

Figure 49:
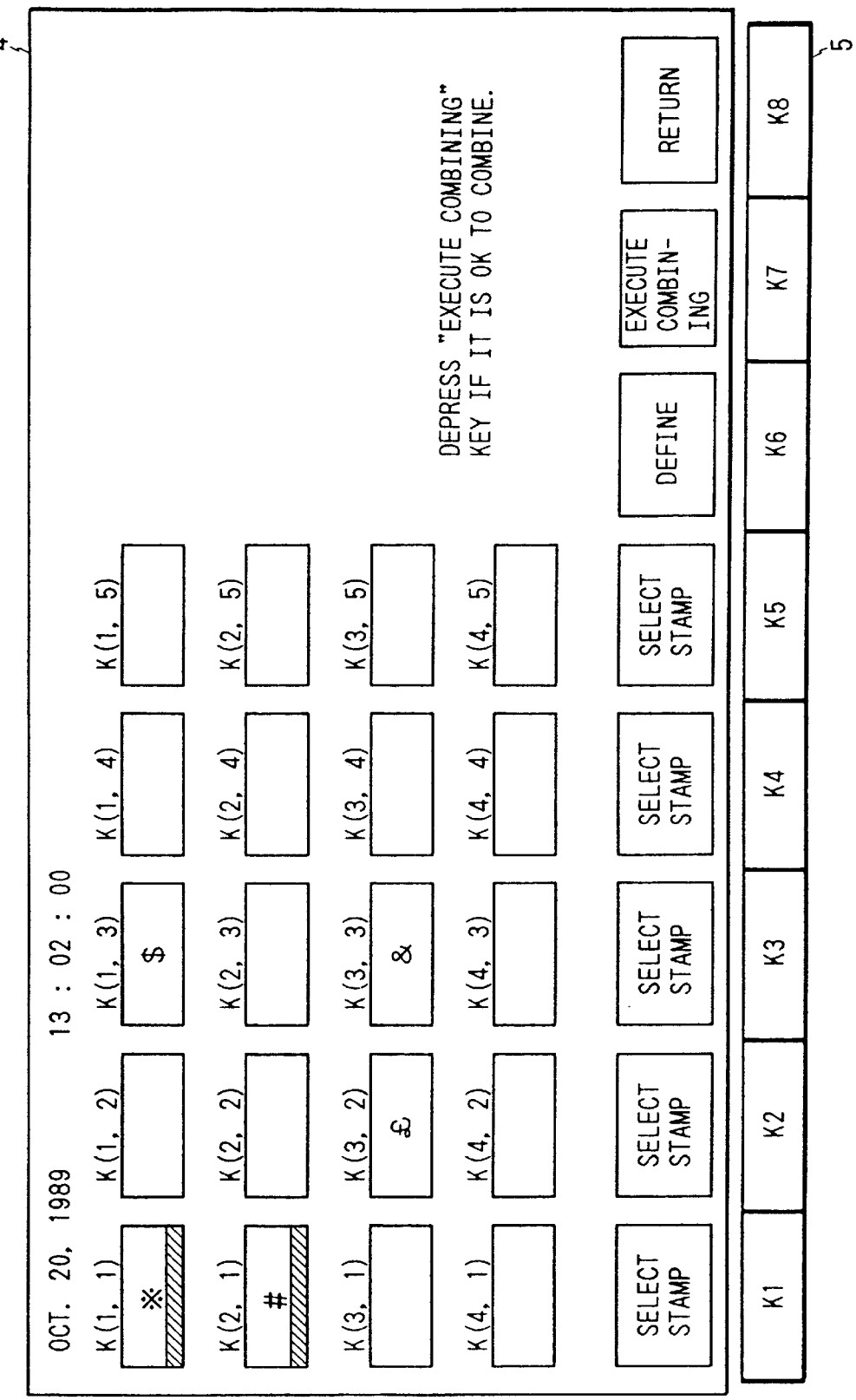
Figure 50:
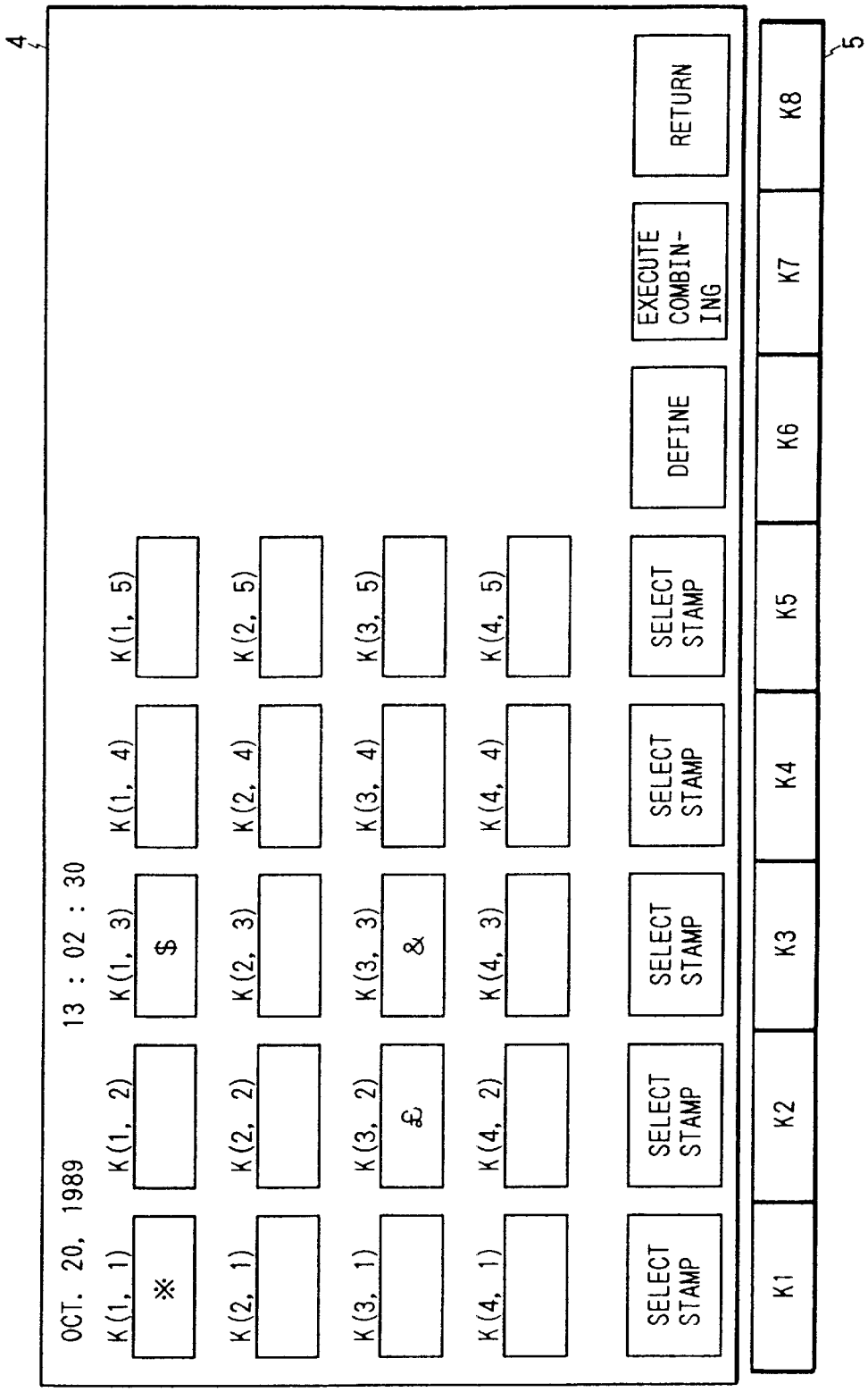
Figure 51:
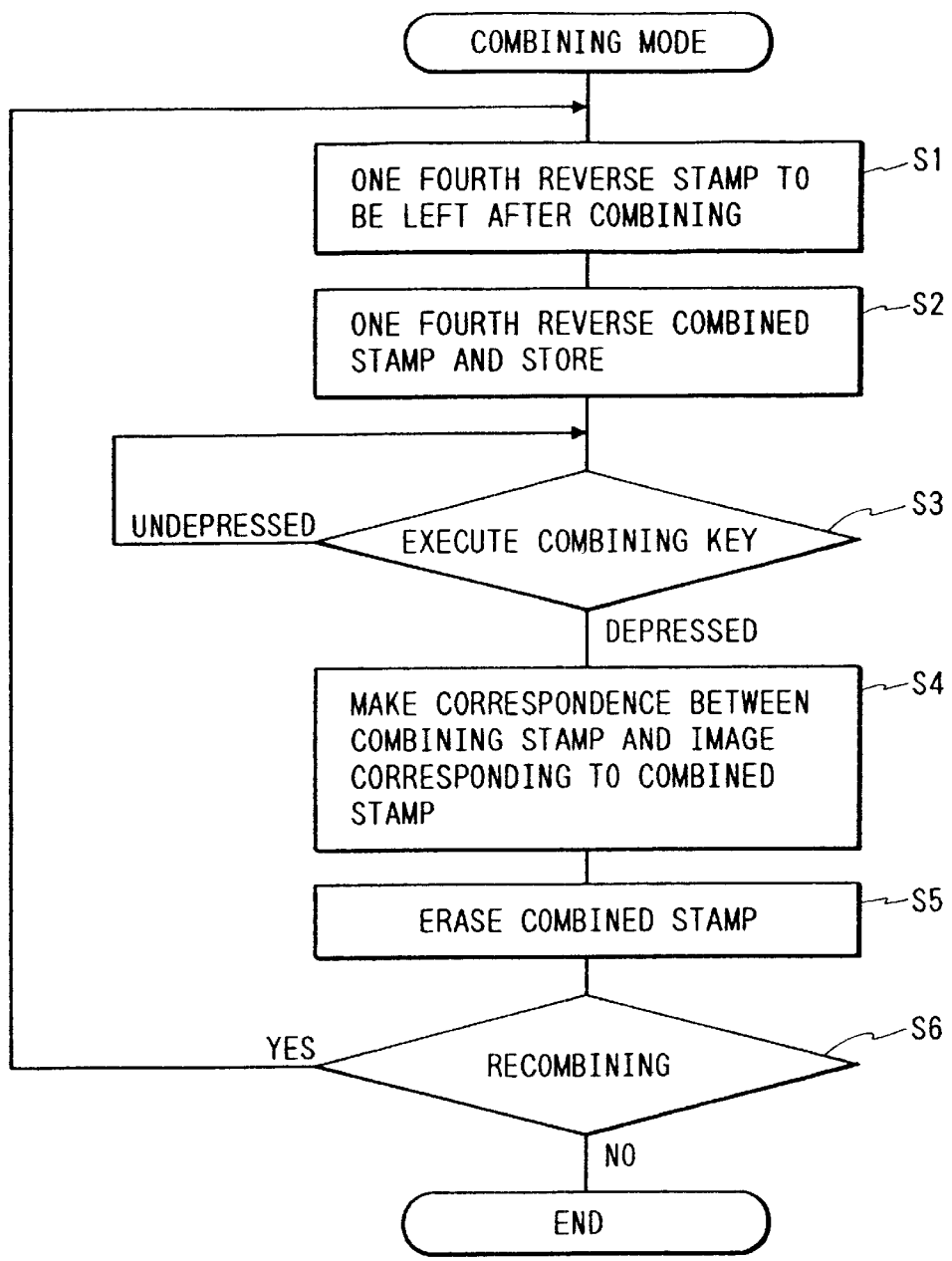
FIG. 51 is a flowchart showing the combining operation.

FIGS. 47–50 are diagrams showing display examples of the display device 4 showing respective states in a combining mode in the embodiment. FIG. 51 is a flowchart showing the operation in the combining mode.

First, when a power source of the electronic filing system 1 is turned on and the present date displayed on the display device 4 is checked and a disc is set, an initial picture frame is displayed. By pressing a "management key" displayed in the initial picture frame, a "stamp key", a "disc key", and the like are displayed. By pressing the "stamp key", a stamp mode selecting picture frame as shown in FIG. 46 is displayed.

Figure 47:
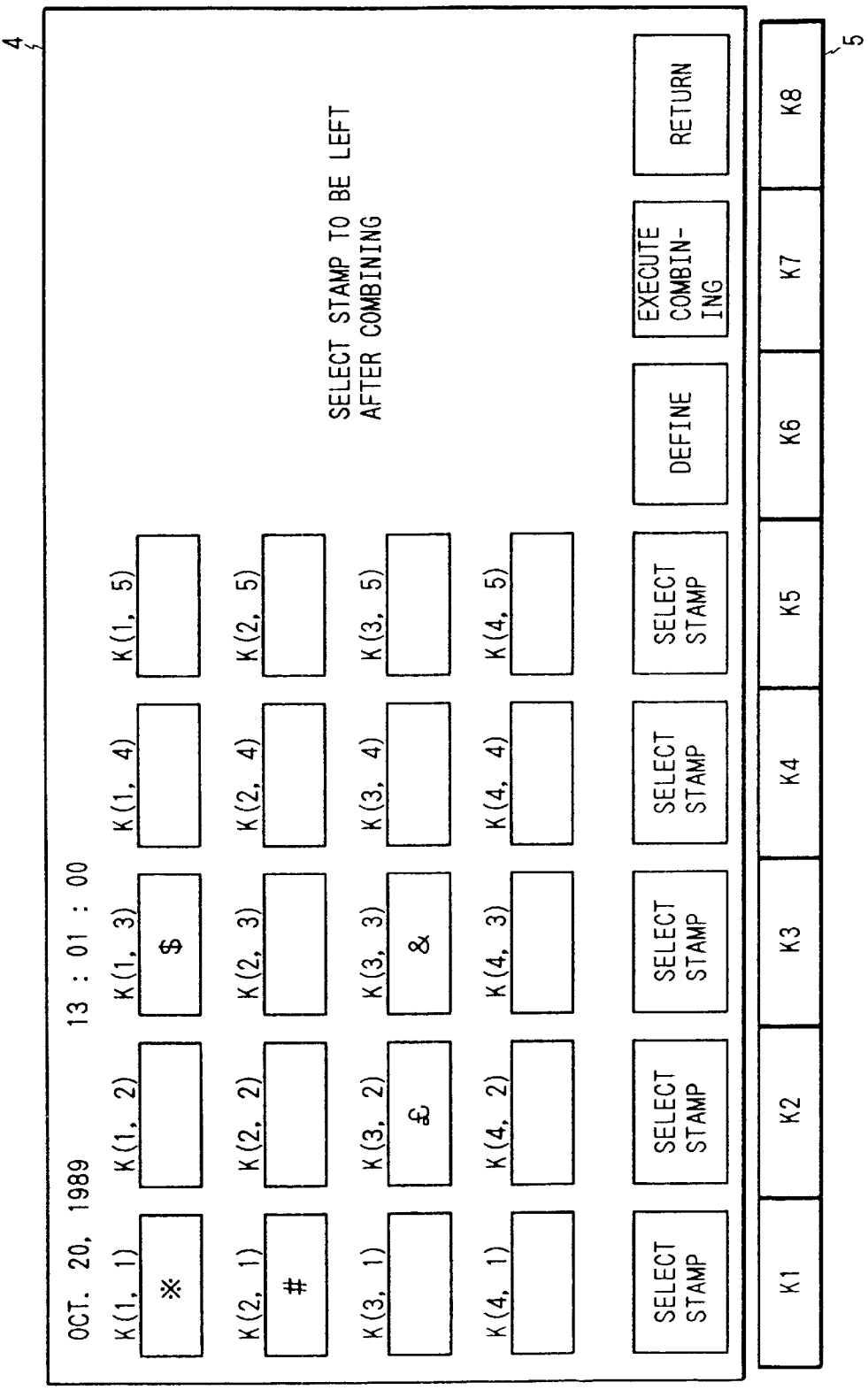
FIGS. 47–50 are explanatory diagrams of the combining operation in the embodiment.

In the stamp mode selecting picture frame, by pressing a "combine" key, "select stamp" keys are displayed together with stamps K(1, 1) to K(4, 5) as shown in FIG. 47. In the embodiment, "stamp" denotes a retrieval image indicative of retrieval information. A plurality of stamps can be assigned as retrieval information to one image. As a stamp, any one of the mark of an automobile, the mark of a mountain, the mark of a book, the mark of a pencile, a character, and the like can be freely selected.

A comment "SELECT STAMP TO BE LEFT AFTER COMBINING" is displayed at a right lower position in the screen of the display device 4 shown in FIG. 47. By pressing a stamp selecting key, the stamp "combining stamp" to be left after the combining process is selected. In this case, by pressing either one of five stamp selecting keys $K_1$ to $K_5$ once the stamp at the top stage among the stamps of four stages is selected, so that the lower portion corresponding to ¼ of the selected combining stamp is reversed from white to black (S1). By pressing the stamp selecting key once, twice, . . . , the stamps at the second stage, third stage, . . . are sequentially selected.

Figure 48:
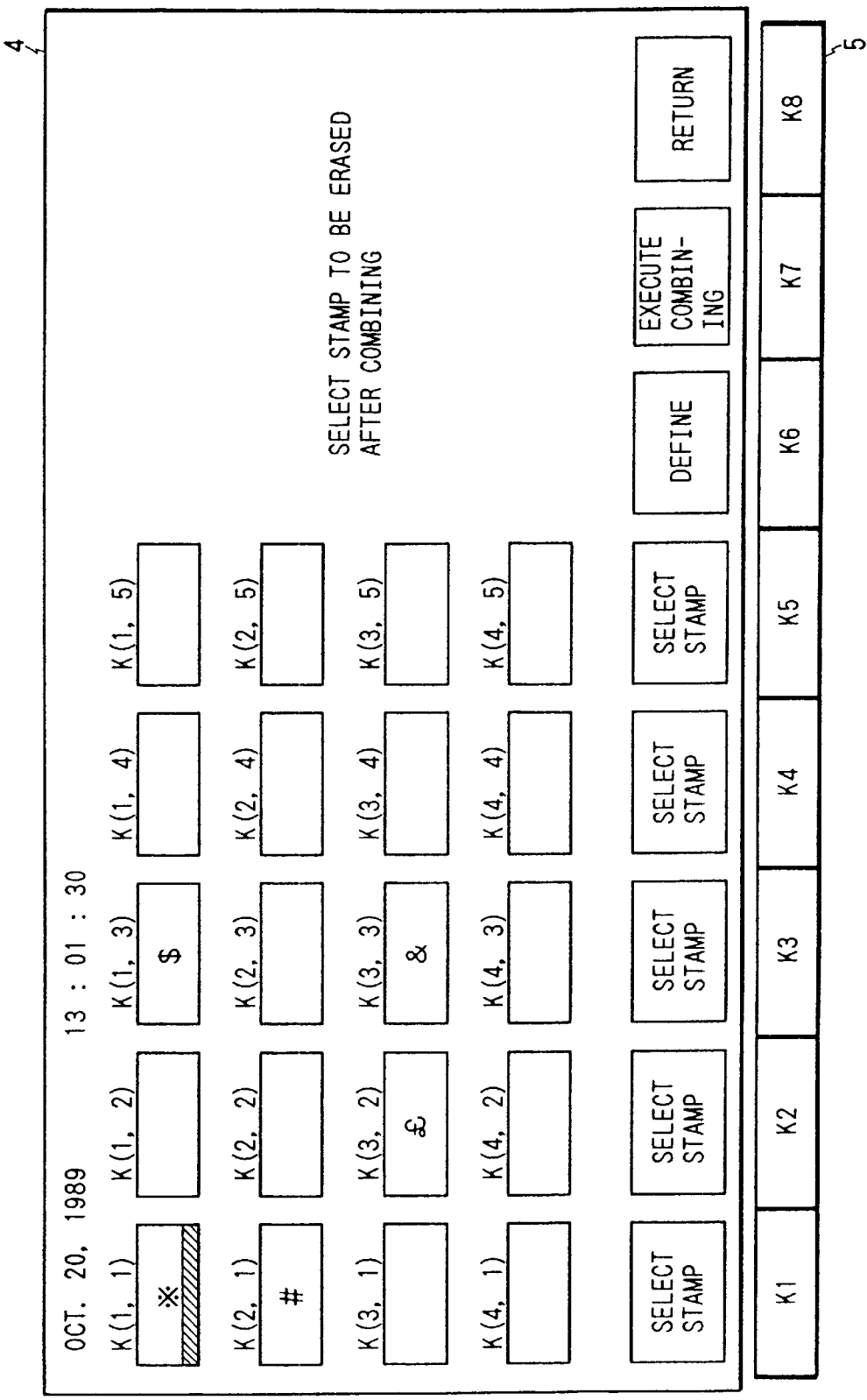

For instance, by selecting the stamp K(1, 1) (stamp indicated by a symbol "*") as shown in FIG. 48, the lower portion of ¼ of the region of the stamp K(1, 1) is reversed from white to black.

The stamp (combined stamp) to be erased after the combining process is selected. For example, as shown in FIG. 49, the stamp K(2, 1) is selected (S2).

That is; in the embodiment, the image stored in the magnetooptic disc associated with the stamp K(2, 1) (stamp indicated by a symbol "#") is combined in correspondence to the stamp K(1, 1) (stamp of '*'). At this time, a comment "DEPRESS "EXECUTE COMBINING" KEY IF IT IS OK TO COMBINE" is displayed on the display device 4. When the "execute combining" key is pressed (S3), the retrieval information stored on the magnetooptic disc is rewritten so that the image which corresponds to the combined stamp and has been stored on the magnetooptic disc is made correspond to the combining stamp (S4). That is, the retrieval information associated with the combined stamp is made associate with the combining stamp. The stamp (stamp shown by #) displayed at the stamp position K(2, 1) is erased (S5). A picture frame after the combining process is displayed as shown in FIG. 50. If it is unnecessary to again execute the combining operation (S6), namely, when the return key is pressed, the stamp mode picture frame of FIG. 46 is again displayed and the combining mode is finished.

The stamp display position changing operation will now be described.

Figure 54:
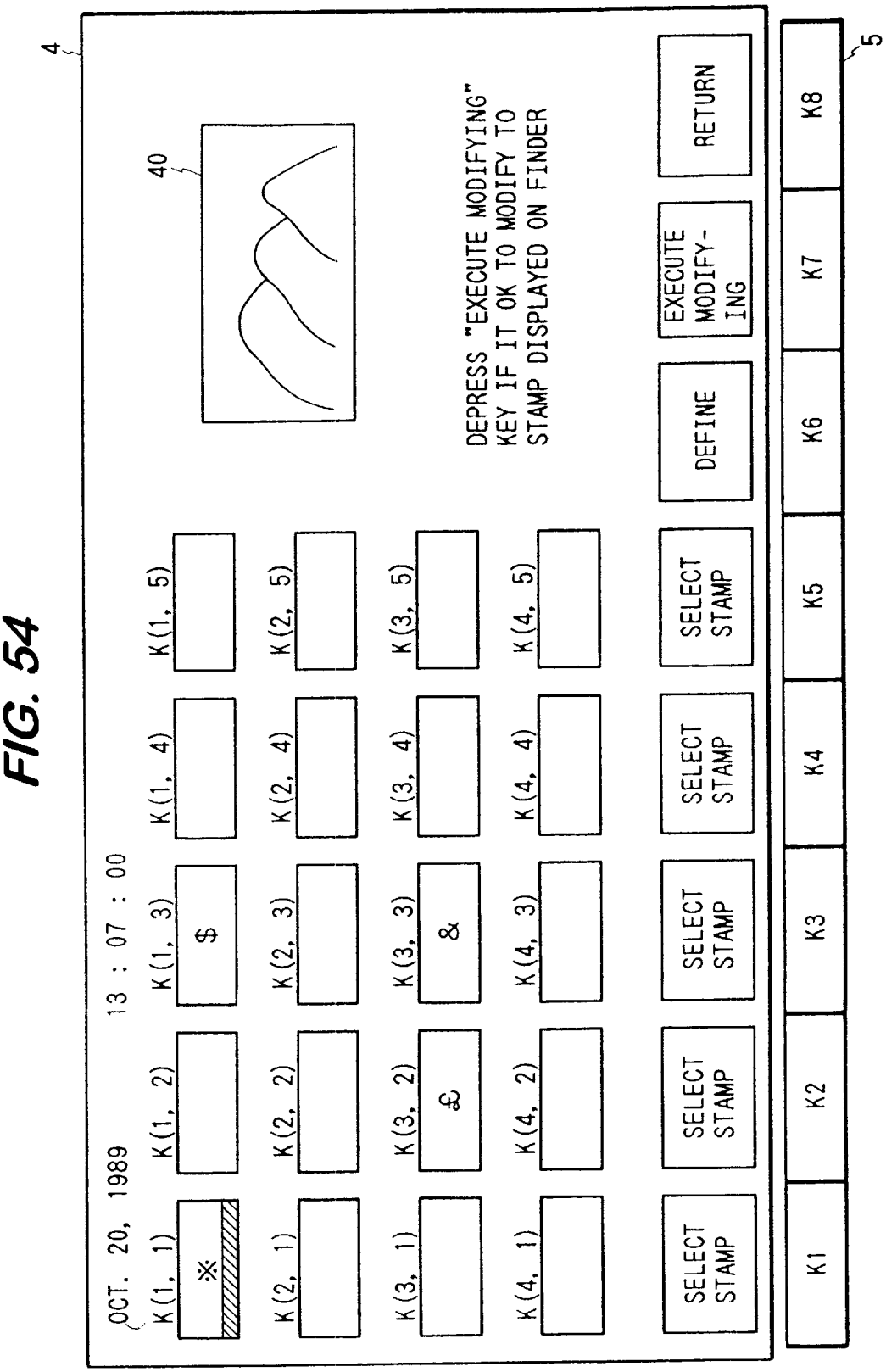
Figure 55:
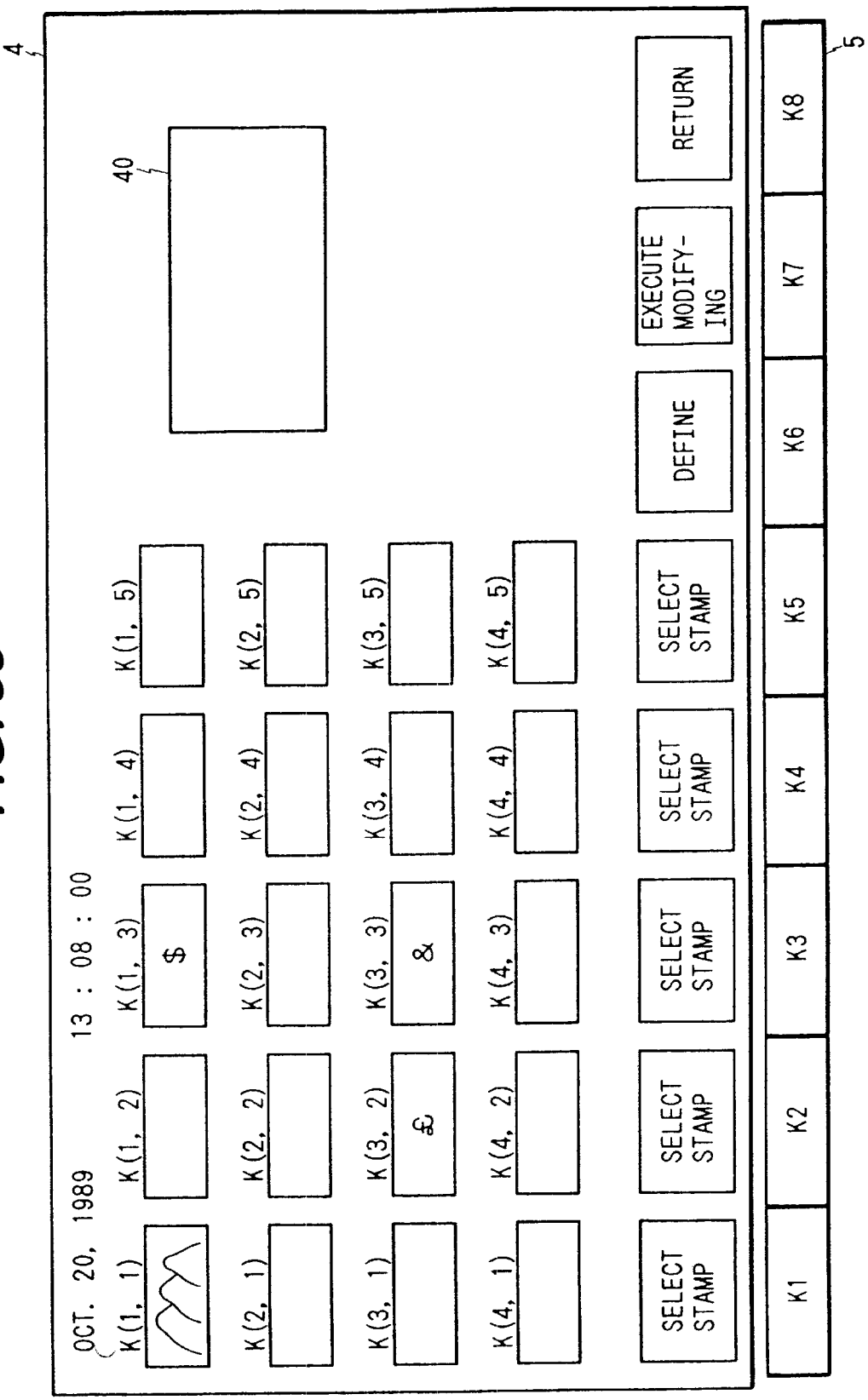
Figure 56:
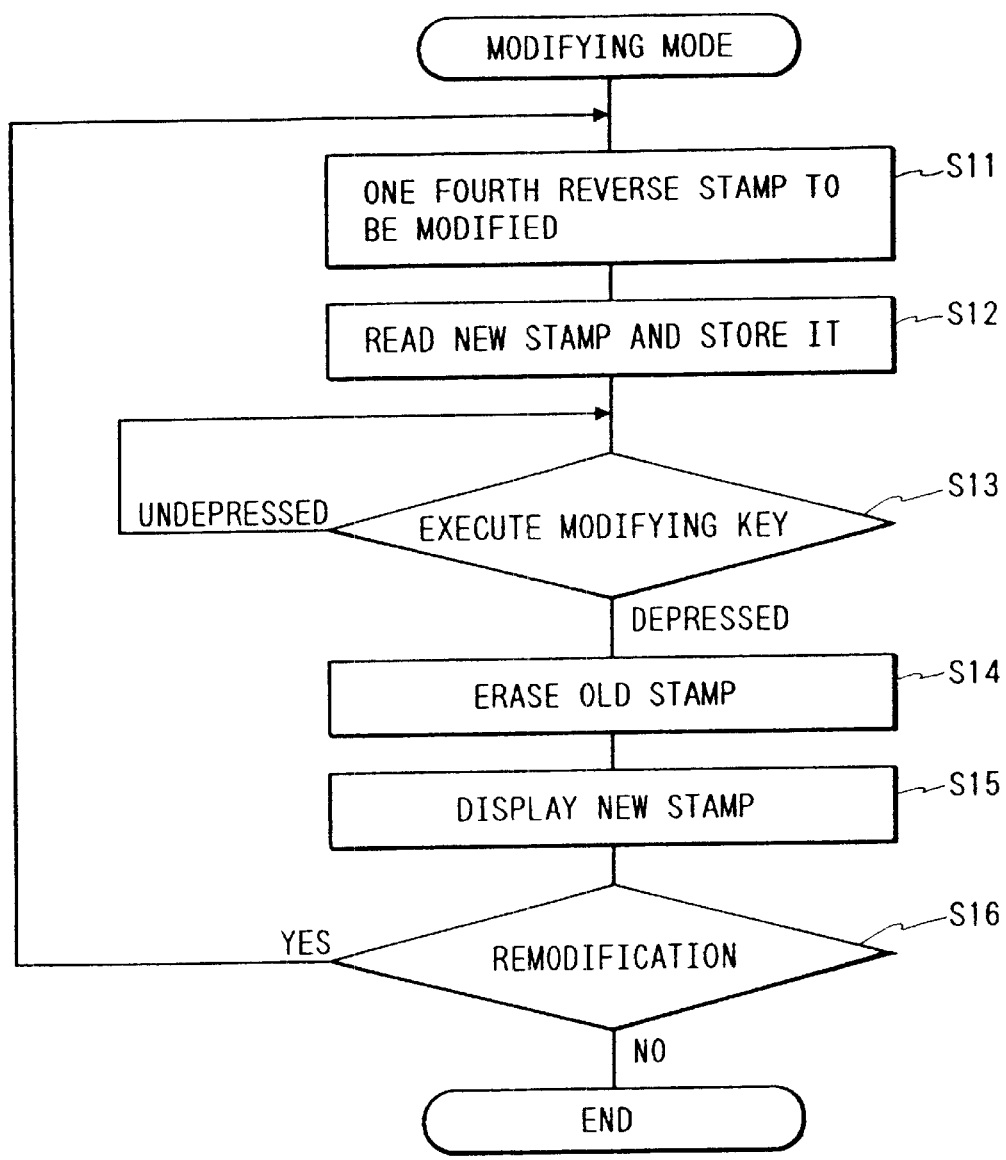
FIG. 56 is a flowchart showing the stamp modifying operation.

FIGS. 52–55 are explanatory diagrams of the stamp modification in the invention. FIG. 56 is a flowchart showing the stamp modifying operation shown in FIGS. 52–55.

Figure 52:
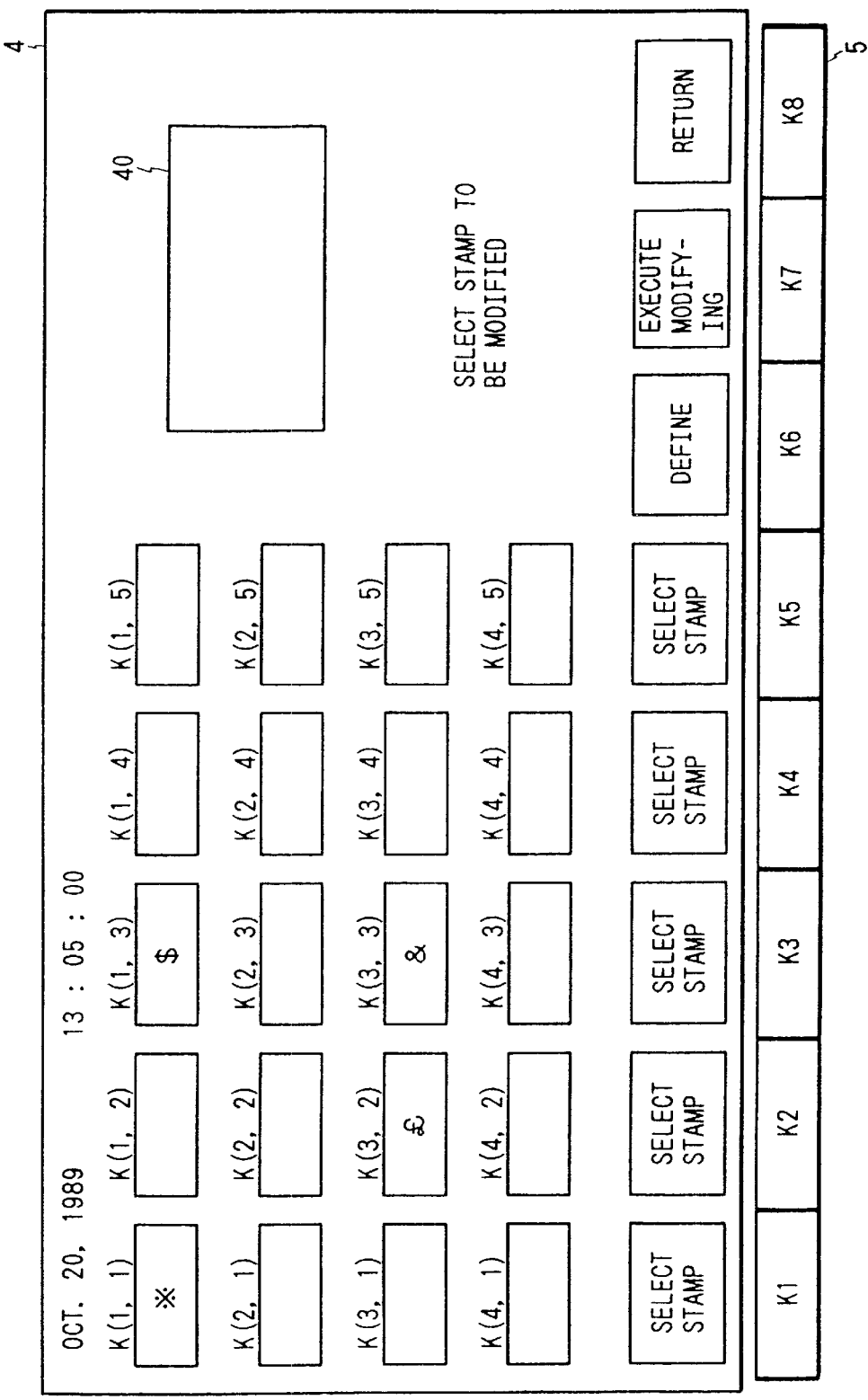
FIGS. 52–55 are explanatory diagrams of the stamp modifying operation in the embodiment.

When the modifying key K2 is pressed in the stamp mode selecting picture frame shown in FIG. 46, a picture frame shown in FIG. 52 is displayed and a comment "SELECT STAMP TO BE MODIFIED" is displayed at the right lower position in the picture frame.

Figure 53:
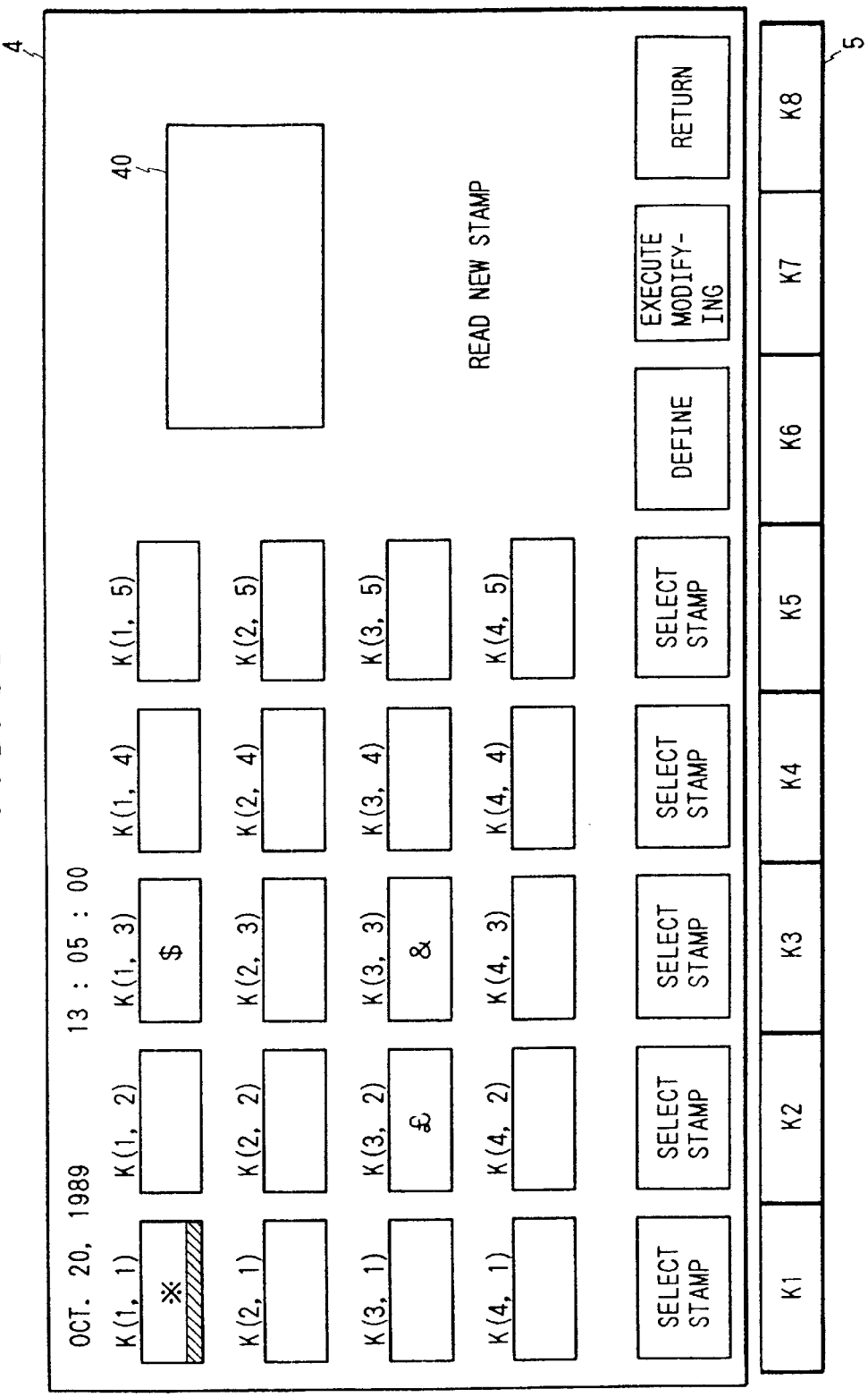

At this time, to modify the stamp K(1, 1) (stamp shown by *) to another stamp, the stamp selecting key locating below the stamp K(1, 1) is pressed once. Thus, the lower portion of ¼ of the region of the stamp K(1, 1) is reversed from white to black (S11) and a comment "READ NEW STAMP" is displayed as shown in FIG. 53.

An original of a predetermined size on which a desired image has been drawn is set onto the original setting plate 7 and a desired stamp is read by using the image reading device 25 (S12). Due to this, the stamp illustrating, for instance, mountains is displayed on a finder 40 of the image display device 4. At this time, as shown in FIG. 54, a comment "DEPRESS "EXECUTE MODIFYING" KEY IF IT IS OK TO MODIFY TO STAMP DISPLAYED ON FINDER" is displayed. By pressing the "execute modifying" key (S13), the old stamp (stamp shown by *) is erased (S14) and the new stamp (stamp having the mark of mountains) is displayed at the stamp position K(1, 1) (S15). The stamp which was newly read is stored to the magnetooptic disc and the retrieval information is rewritten. This state is illustrated in FIG. 55. After that, if the stamp modifying operation is not executed, that is, when the return key is pressed (S16), the stamp mode picture frame of FIG. 46 is again displayed and the stamp modifying mode is finished.

The operation to move the stamp display position will now be described.

Figure 59:
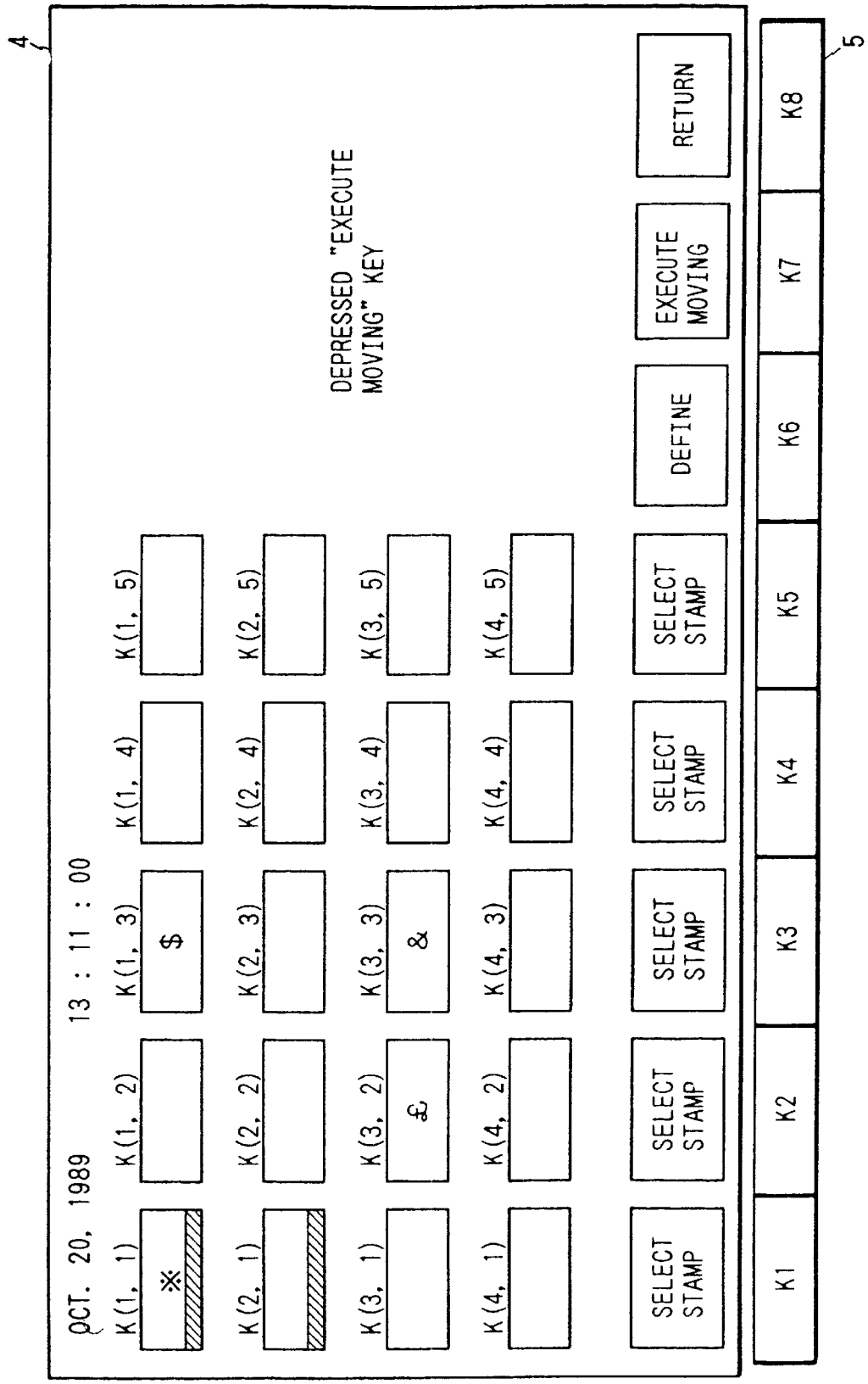
Figure 60:
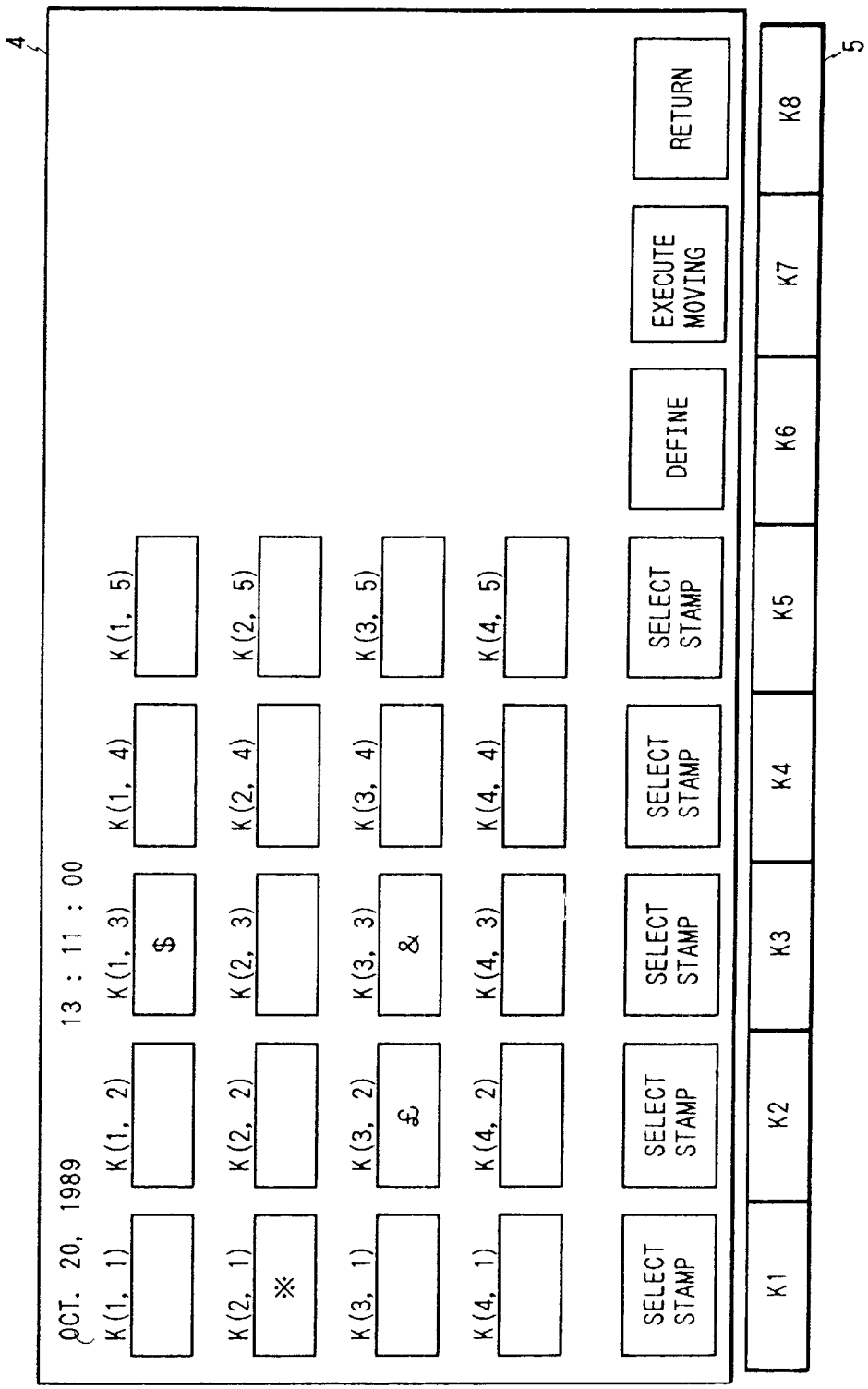
Figure 61:
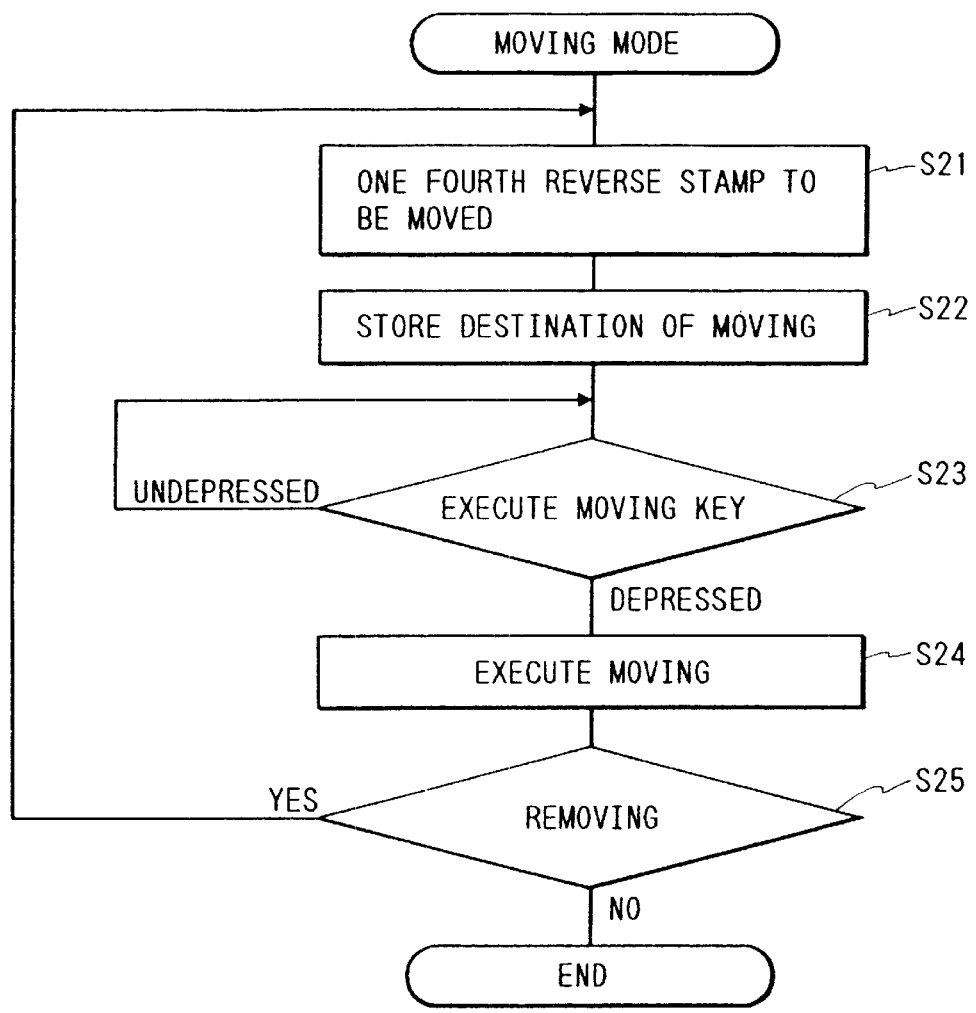
FIG. 61 is a flowchart showing the stamp display position moving operation.

FIGS. 57–60 are explanatory diagrams of the stamp display position moving operation in the invention. FIG. 61 is a flowchart showing the stamp moving operation shown in FIGS. 57–60.

Figure 57:
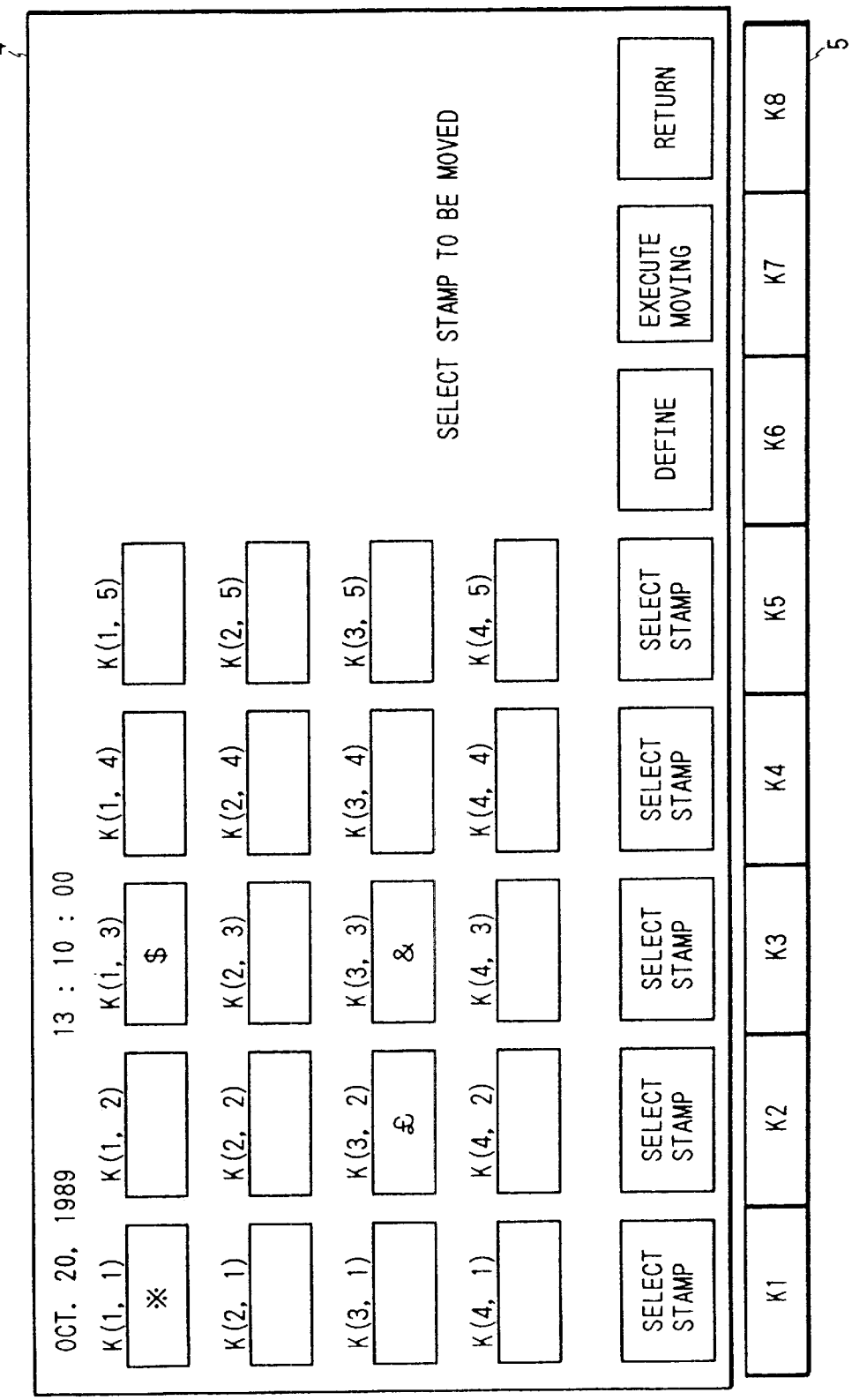
FIGS. 57–60 are explanatory diagrams of the stamp display position moving operation in the embodiment.

First, when the moving key K3 is pressed in the stamp mode selecting picture frame shown in FIG. 46, a comment "SELECT STAMP TO BE MOVED" is displayed as shown in FIG. 57. The operator selects the stamp to be moved by using the stamp selecting key. In the case of the embodiment, it is assumed that the stamp K(1, 1) is moved.

Figure 58:
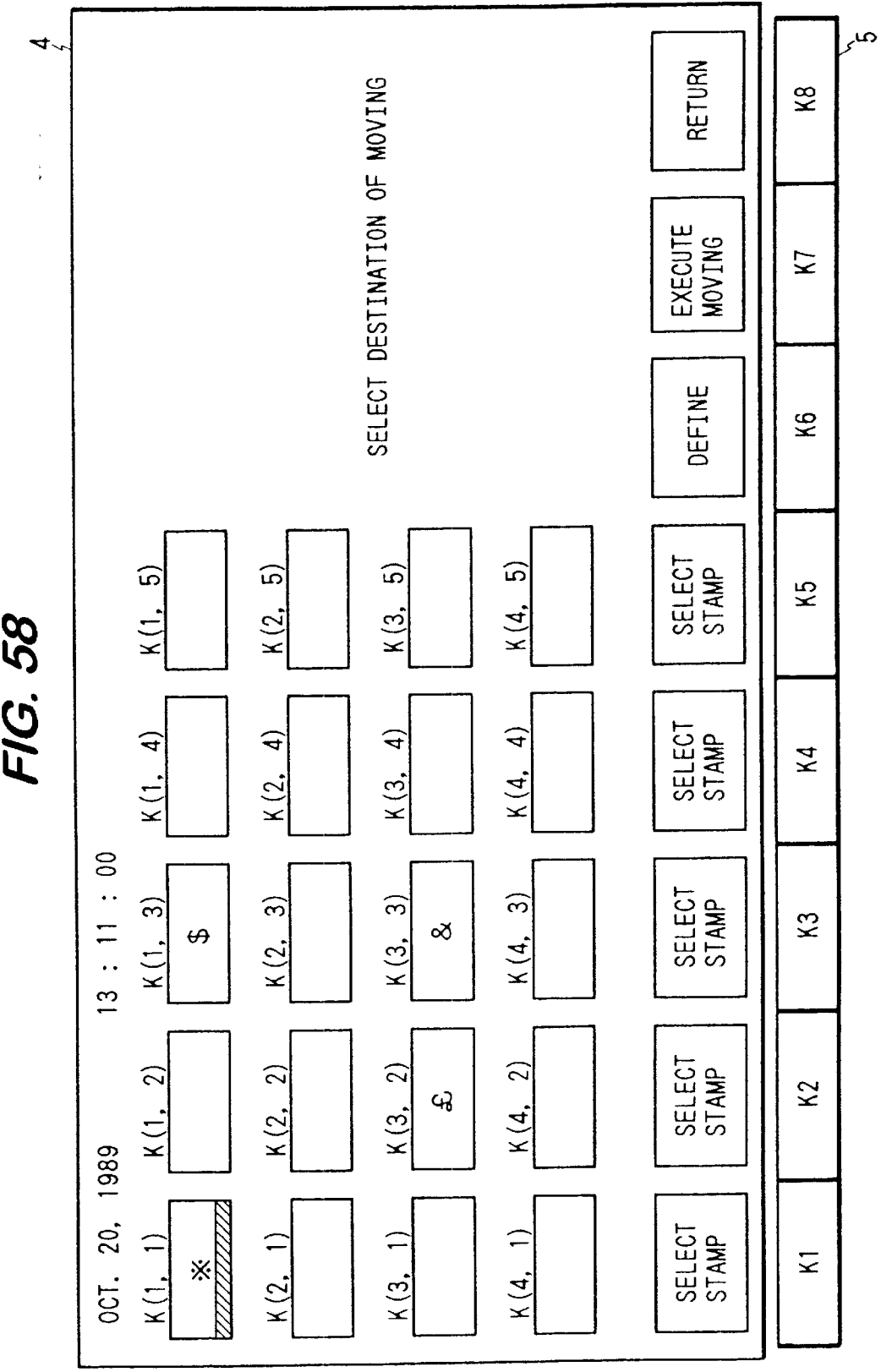

Thus, the lower portion of ¼ of the region of the stamp K(1, 1) is reversed from white to black (S21). At this time, a message "SELECT DESTINATION OF MOVING" is displayed on the display device 4 as shown in FIG. 58. By pressing the stamp selecting key, the stamp position at which no stamp is displayed is selected. In the embodiment, as shown in FIG. 59, the stamp position K(2, 1) is selected (S22) and the "execute moving" key K7 is pressed (S23). Thus, the movement of the stamp display position is executed (S24). As shown in FIG. 60, the mark "*" at the stamp position K(1, 1) is erased and the stamp having the mark * is displayed at the stamp position K(2, 1) and the retrieval information on the magnetooptic disc is rewritten. Further, if the moving mode is not executed, that is, when the return key is pressed (S25), the stamp mode picture frame of FIG. 46 is again displayed and the moving mode is finished.

In the embodiment, the lower portion of ¼ of the region of the stamp has been reversed from white to black. However, it is also possible to construct in a manner such that the define key K6 is pressed after that and the full reversal (100% reversal) can be also performed in place of the one-fourth white/black reversal. On the other hand, in the embodiment, the stamp to be moved has been first selected and the stamp position of the destination of the moving is then selected. However, on the contrary, it is also possible to select the position at which the stamp to be moved is displayed after the stamp display position (stamp position of the destination of the moving) where no stamp is displayed was selected.

It is also possible to construct in a manner such that the stamp display position at which a predetermined stamp is displayed is first selected, the stamp display position at which another stamp is displayed is then selected, and when the "execute modifying" key is then pressed, the display positions of the two stamps are exchanged.

The erasing operation of the stamp will now be described.

FIGS. 62–65 are explanatory diagrams of the stamp erasing operation in the invention. FIG. 66 is a flowchart showing the stamp erasing operation.

Figure 62:
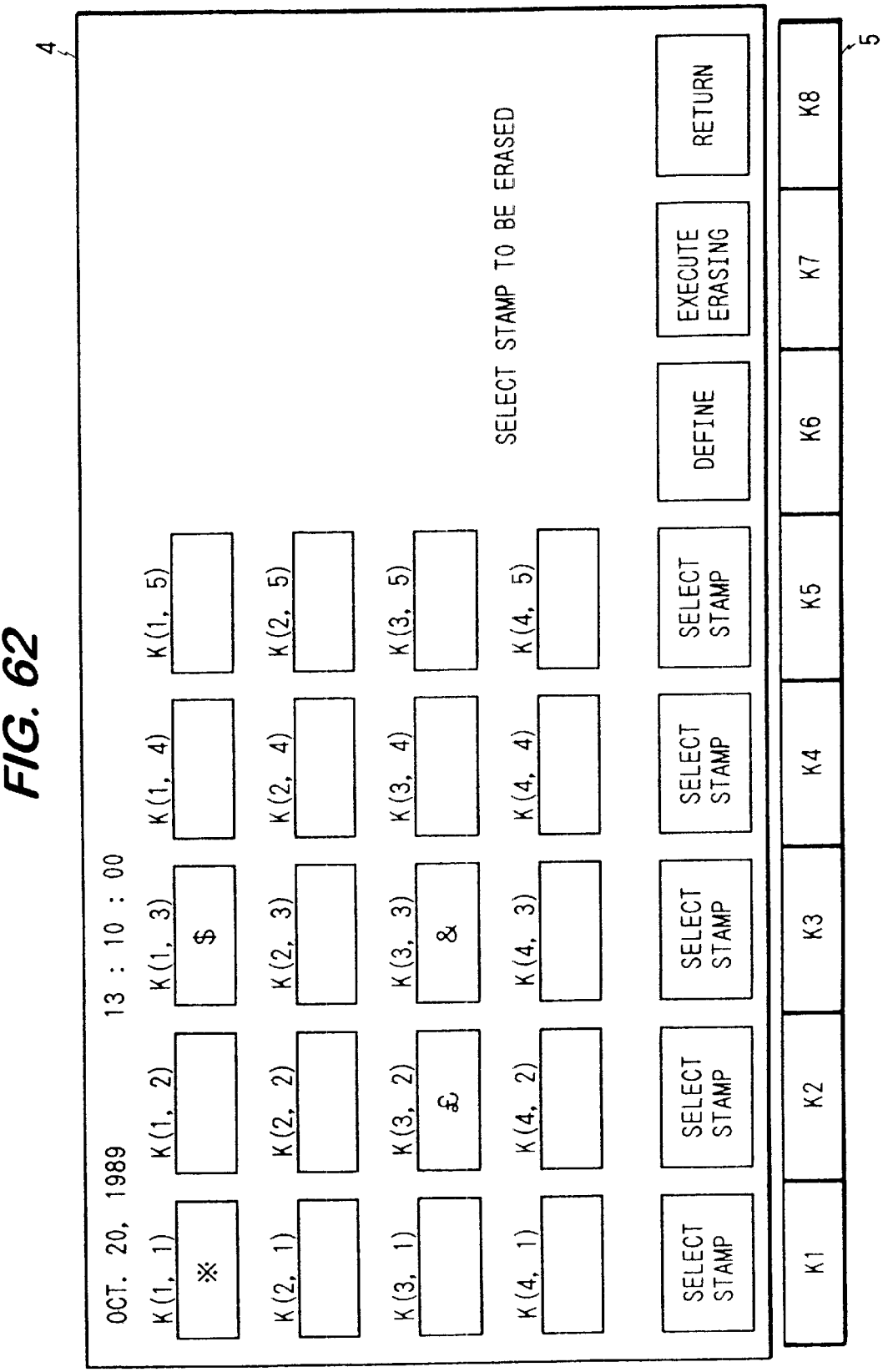
FIGS. 62–65 are explanatory diagrams of the stamp erasing operation in the embodiment.
Figure 63:
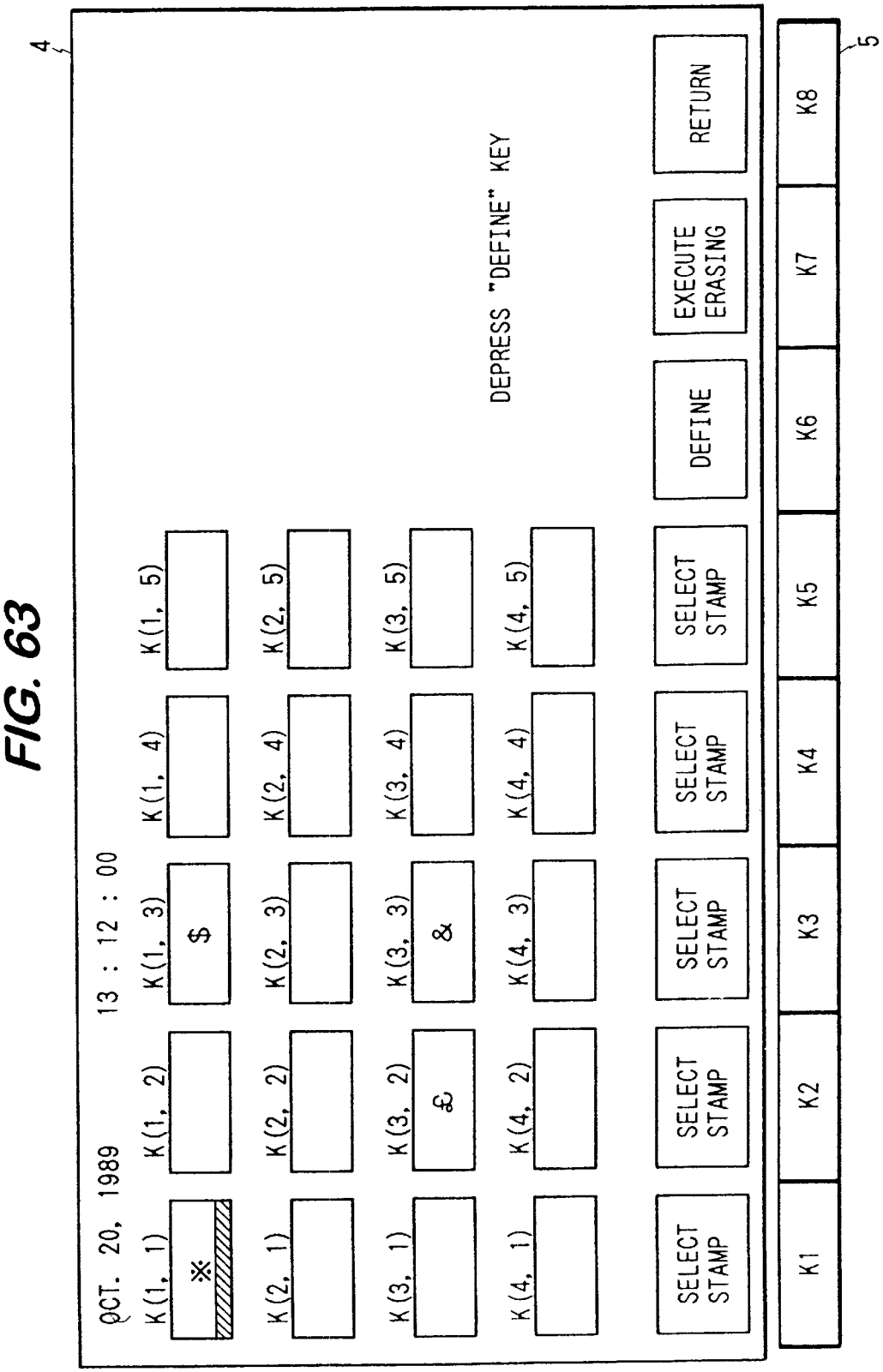
Figure 64:
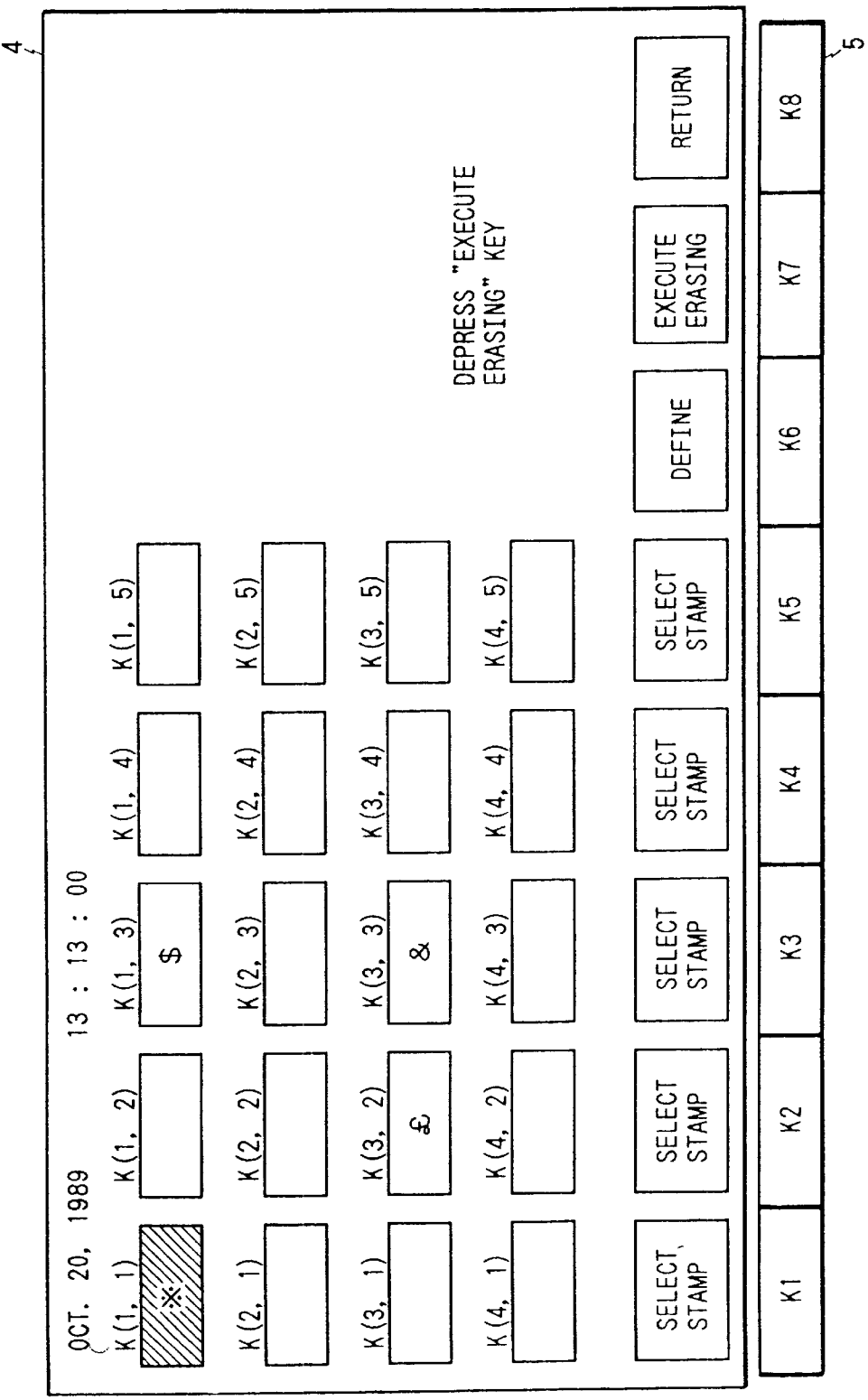
Figure 65:
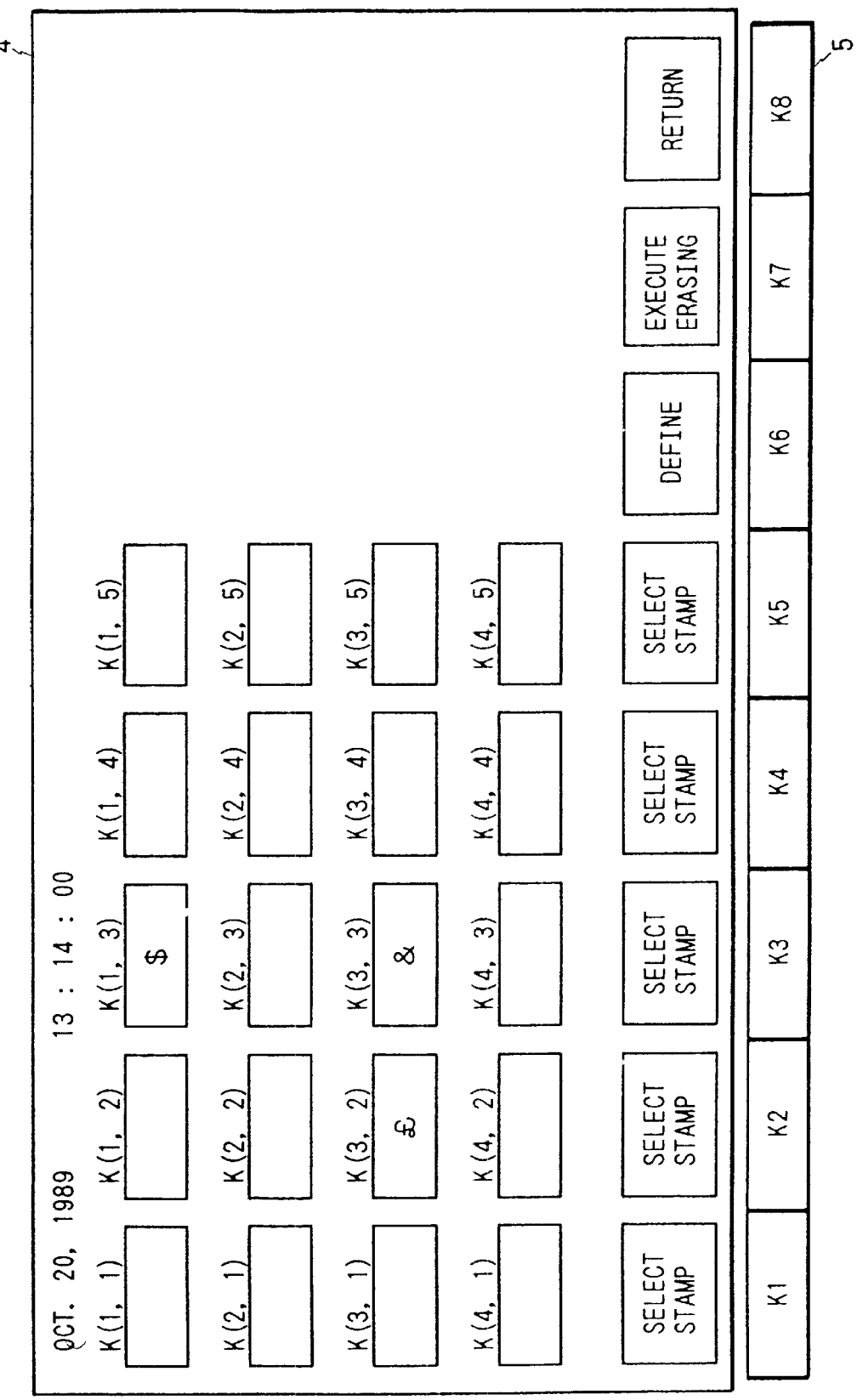

First, when the erasing key K5 is pressed in the stamp mode selecting picture frame shown in FIG. 46, as shown in FIG. 62, a message "SELECT STAMP TO BE ERASED" is displayed at the right lower position in the picture frame on the display device 4. In the example shown in FIG. 62, the stamp K(1, 1) (mark *) is selected. Therefore, the lower portion of ¼ of the region of the stamp K(1, 1) is reversed from white to black (S31). At this time, a comment "DEPRESS DEFINE KEY" is displayed on the display device 4 for confirmation as shown in FIG. 63. By pressing the define key K6 (S32), as shown in FIG. 64, the stamp whose lower ¼ portion was reversed from white to black is fully reversed (S33). By pressing the "execute erasing" key K7 (S34), the erasing operation is executed (S35). As shown in FIG. 65, the mark * is erased from the stamp display position K(1, 1) and the retrieval information on the magnetooptic disc is rewritten. If the erasing mode is not again executed, that is, by pressing the return key (S36), the stamp mode picture frame of FIG. 46 is again displayed and the erasing mode is finished.

The erasing mode is cancelled by pressing the return key K8 during the erasing operation. On the other hand, by pressing the define key K6, a predetermined stamp is fully reversed. After that, by selecting the stamp which was fully reversed by pressing the stamp selecting key, the full-reverse mode is returned to the ¼-reverse mode.

On the other hand, in the case of erasing a plurality of stamps, the first stamp to be erased is selected by the stamp selecting key and the define key is pressed. After that, the second stamp to be erased is selected and the define key is pressed. After a plurality of stamps to be erased were selected as mentioned above, all of the selected stamps can be also erased by pressing the "execute erasing" key only once.

As described above, there is an effect such that the retrieval image displayed on the CRT or the like can be made further easy to use.

The present invention is not limited to the foregoing embodiments but many modifications and variations are possible within the spirit and scope of the appended claims of the invention.

What is claimed is:

1. A control method for an image filing apparatus that includes a display unit for displaying a plurality of icons representing retrieval information used to retrieve images stored in a memory medium, a selection unit for selecting a desired icon from the displayed plurality of icons, and a retrieval unit for retrieving an image from the memory medium associated with the desired icon selected by the selection unit, said method comprising:

a display step of displaying the plurality of icons in an array on a display of the display unit;

a first designation step of designating a first icon from the plurality of icons displayed by the display unit, the first icon representing a first retrieval data corresponding to a first image;

a second designation step of designating a second icon from the plurality of icons displayed by the display unit, the second icon representing a second retrieval data corresponding to a second image; and an icon replacement step of replacing the first icon with the second icon in the plurality of icons displayed by the display unit, such that the second icon represents both the first retrieval data corresponding to the first image and the second retrieval data corresponding to the second image, wherein, when a user selects the second icon from the plurality of icons using the selection unit, the retrieval unit retrieves both the first image and the second image from the memory medium.

2. A method according to claim 1, wherein said first and second designation steps each include a guidance step of displaying guidance information on the display of the display unit for guiding the user in designating the first and second icons.

3. A control method for an image filing apparatus that includes a display unit for displaying a plurality of icons representing retrieval information used to retrieve images stored in a memory medium, a selection unit for selecting a desired icon from the displayed plurality of icons, a retrieval unit for retrieving an image from the memory medium associated with the desired icon selected by the selection unit, and an input unit for inputting a new icon to the apparatus, said method comprising:

a display step of displaying the plurality of icons in an array on a display of the display unit;

a designation step of designating a first icon, which represents retrieval data corresponding to a stored image;

an input step of inputting a new icon to the apparatus;

an icon replacement step of replacing the first icon with the new icon, such that the new icon represents the retrieval data corresponding to the stored image, wherein, when a user selects the new icon using the selection unit, the retrieval unit retrieves the stored image from the memory medium.

4. A method according to claim 3, further comprising a second display step of displaying the new icon at a predetermined position on the display of the display unit.

5. A computer-readable storage medium storing a program for implementing a method for controlling an image filing apparatus that includes a display unit for displaying a plurality of icons representing retrieval information used to retrieve images stored in a memory medium, a selection unit for selecting a desired icon from the displayed plurality of icons, and a retrieval unit for retrieving an image from the memory medium associated with the desired icon selected by the selection unit, the program comprising:

program code for a display step of displaying the plurality of icons in an array on a display of the display unit;

program code for a first designation step of designating a first icon from the plurality of icons displayed by the display unit, the first icon representing a first retrieval data corresponding to a first image;

program code for a second designation step of designating a second icon from the plurality of icons displayed by the display unit, the second icon representing a second retrieval data corresponding to a second image; and program code for an icon replacement step of replacing the first icon with the second icon in the plurality of icons displayed by the display unit, such that the second icon represents both the first retrieval data corresponding to the first image and the second retrieval data corresponding to the second image, wherein, when a user selects the second icon from the plurality of icons using the selection unit, the retrieval unit retrieves both the first image and the second image from the memory medium.

6. A computer-readable storage medium storing a program for implementing a control method for controlling an image filing apparatus that includes a display unit for displaying a plurality of icons representing retrieval information used to retrieve images stored in a memory medium, a selection unit for selecting a desired icon from the displayed plurality of icons, a retrieval unit for retrieving an image from the memory medium associated with the desired icon selected by the selection unit, and an input unit for inputting a new icon to the apparatus, the program comprising:

program code for a display step of displaying the plurality of icons in an array on a display of the display unit;

program code for a designation step of designating a first icon, which represents retrieval data corresponding to a stored image;

program code for an input step of inputting a new icon to the apparatus;

program code for an icon replacement step of replacing the first icon with the new icon, such that the new icon represents the retrieval data corresponding to the stored image, wherein, when a user selects the new icon using the selection unit, the retrieval unit retrieves the stored image from the memory medium.

* * * * *

UNITED STATES PATENT AND TRADEMARK OFFICE
CERTIFICATE OF CORRECTION

PATENT NO. : 6,462,761 B1
DATED : October 8, 2002
INVENTOR(S) : Kamon Hasuo

It is certified that error appears in the above-identified patent and that said Letters Patent is hereby corrected as shown below:

<u>Title page,</u>
Item [56], References Cited, FOREIGN PATENT DOCUMENTS,
"61026147" should read -- 61-26147 --.
"62226375" should read -- 62-226375 --.
"63004334" should read -- 63-4334 --.

<u>Column 1,</u>
Line 4, "continuation," should read -- continuation --.
Line 42, "long" should read -- long time --.

<u>Column 4,</u>
Line 7, "on" should read -- on which --.
Line 12, "own" should read -- its own --.
Line 44, "154" should read -- 15-4 --.

<u>Column 18,</u>
Lines 1 and 4, "made" should read -- made to --.

Signed and Sealed this

Twentieth Day of May, 2003

JAMES E. ROGAN
*Director of the United States Patent and Trademark Office*